(12) United States Patent
Yu et al.

(10) Patent No.: US 11,568,236 B2
(45) Date of Patent: Jan. 31, 2023

(54) FRAMEWORK AND METHODS OF DIVERSE EXPLORATION FOR FAST AND SAFE POLICY IMPROVEMENT

(71) Applicant: The Research Foundation for the State University of New York, Binghamton, NY (US)

(72) Inventors: Lei Yu, Vestal, NY (US); Andrew Cohen, Binghamton, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 953 days.

(21) Appl. No.: 16/256,529

(22) Filed: Jan. 24, 2019

(65) Prior Publication Data

US 2019/0228309 A1 Jul. 25, 2019

Related U.S. Application Data

(60) Provisional application No. 62/621,856, filed on Jan. 25, 2018.

(51) Int. Cl.
*G06N 20/00* (2019.01)
*G06N 3/08* (2006.01)
*G05B 13/04* (2006.01)
*G05B 13/02* (2006.01)
*G06N 7/00* (2006.01)

(52) U.S. Cl.
CPC .......... *G06N 3/08* (2013.01); *G05B 13/0265* (2013.01); *G05B 13/048* (2013.01); *G06N 7/005* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 5,486,112 A | 1/1996 | Troudet et al. | |
| 5,608,843 A | 3/1997 | Baird, III | |
| 5,722,418 A | 3/1998 | Bro | |
| 5,946,673 A | 8/1999 | Francone et al. | |
| 6,169,981 B1 | 1/2001 | Werbos | |
| 6,473,851 B1 | 10/2002 | Plutowski | |
| 6,480,876 B2 | 11/2002 | Rehg et al. | |
| 6,513,022 B1 | 1/2003 | Morgan | |
| 6,532,454 B1 | 3/2003 | Werbos | |

(Continued)

OTHER PUBLICATIONS

U.S. Appl. No. 10/473,909, filed Nov. 12, 2019, Yabugaki et al.

(Continued)

*Primary Examiner* — David R Vincent
(74) *Attorney, Agent, or Firm* — Hoffberg & Associates; Steven M. Hoffberg

(57) ABSTRACT

The present technology addresses the problem of quickly and safely improving policies in online reinforcement learning domains. As its solution, an exploration strategy comprising diverse exploration (DE) is employed, which learns and deploys a diverse set of safe policies to explore the environment. DE theory explains why diversity in behavior policies enables effective exploration without sacrificing exploitation. An empirical study shows that an online policy improvement algorithm framework implementing the DE strategy can achieve both fast policy improvement and safe online performance.

24 Claims, 7 Drawing Sheets

(56) References Cited

U.S. PATENT DOCUMENTS

| | | |
|---|---|---|
| 6,581,048 B1 | 6/2003 | Werbos |
| 6,672,431 B2 | 1/2004 | Brand et al. |
| 6,675,189 B2 | 1/2004 | Rehg et al. |
| 6,775,415 B1 | 8/2004 | Clausen et al. |
| 6,882,992 B1 | 4/2005 | Werbos |
| 6,912,515 B2 | 6/2005 | Jackson et al. |
| 6,917,925 B2 | 7/2005 | Berenji et al. |
| 6,990,670 B1 | 1/2006 | Hodjat |
| 7,010,788 B1 | 3/2006 | Rehg et al. |
| 7,058,550 B2 | 6/2006 | Kouritzin |
| 7,073,175 B2 | 7/2006 | Rehg et al. |
| 7,174,354 B2 | 2/2007 | Andreasson |
| 7,231,343 B1 | 6/2007 | Treadgold et al. |
| 7,308,322 B1 | 12/2007 | Discenzo et al. |
| 7,346,520 B2 | 3/2008 | Etzioni et al. |
| 7,395,252 B2 | 7/2008 | Anderson et al. |
| 7,403,904 B2 | 7/2008 | Abe et al. |
| 7,433,841 B2 | 10/2008 | Byde et al. |
| 7,454,388 B2 | 11/2008 | Thaler |
| 7,532,574 B1 | 5/2009 | Madhwaraj et al. |
| 7,594,245 B2 | 9/2009 | Sezan et al. |
| 7,630,986 B1 | 12/2009 | Herz et al. |
| 7,640,488 B2 | 12/2009 | Bar-Yossef et al. |
| 7,664,714 B2 | 2/2010 | Tsujino et al. |
| 7,672,739 B2 | 3/2010 | Ganesan et al. |
| 7,689,432 B2 | 3/2010 | Gross |
| 7,702,660 B2 | 4/2010 | Chan et al. |
| 7,707,131 B2 | 4/2010 | Chickering et al. |
| 7,725,419 B2 | 5/2010 | Lee et al. |
| 7,734,471 B2 | 6/2010 | Paek et al. |
| 7,783,512 B2 | 8/2010 | Gross |
| 7,805,580 B2 | 9/2010 | Hirzel et al. |
| 7,958,064 B2 | 6/2011 | Zhu et al. |
| 7,958,509 B2 | 6/2011 | Aridor et al. |
| 7,958,552 B2 | 6/2011 | Arnold et al. |
| 7,962,629 B2 | 6/2011 | Bigioi et al. |
| 7,970,739 B2 | 6/2011 | Carmel et al. |
| 7,971,180 B2 | 6/2011 | Kreamer et al. |
| 7,974,863 B2 | 7/2011 | Etzioni et al. |
| 7,979,368 B2 | 7/2011 | Kapoor et al. |
| 8,001,063 B2 | 8/2011 | Tesauro et al. |
| 8,006,223 B2 | 8/2011 | Boulineau et al. |
| 8,010,469 B2 | 8/2011 | Kapoor et al. |
| 8,032,404 B2 | 10/2011 | Lee et al. |
| 8,036,877 B2 | 10/2011 | Treadgold et al. |
| 8,046,797 B2 | 10/2011 | Bentolila et al. |
| 8,050,948 B2 | 11/2011 | Purang et al. |
| 8,050,949 B2 | 11/2011 | Purang et al. |
| 8,055,606 B2 | 11/2011 | Kreamer et al. |
| 8,055,607 B2 | 11/2011 | Chan et al. |
| 8,069,125 B2 | 11/2011 | Jung et al. |
| 8,099,189 B2 | 1/2012 | Kaznov et al. |
| 8,126,765 B2 | 2/2012 | Dube et al. |
| 8,135,657 B2 | 3/2012 | Kapoor et al. |
| 8,150,796 B2 | 4/2012 | Jung et al. |
| 8,176,011 B2 | 5/2012 | Carmel et al. |
| 8,195,593 B2 | 6/2012 | Jung et al. |
| 8,212,688 B2 | 7/2012 | Morioka et al. |
| 8,239,992 B2 | 8/2012 | Schnittman et al. |
| 8,249,955 B2 | 8/2012 | Gross |
| 8,250,014 B2 | 8/2012 | Schneegaß et al. |
| 8,253,368 B2 | 8/2012 | Landry et al. |
| 8,260,655 B2 | 9/2012 | Dance et al. |
| 8,275,635 B2 | 9/2012 | Stivoric et al. |
| 8,285,581 B2 | 10/2012 | Abe et al. |
| 8,290,806 B2 | 10/2012 | Lee et al. |
| 8,301,406 B2 | 10/2012 | Lee et al. |
| 8,356,004 B2 | 1/2013 | Jung et al. |
| 8,356,317 B2 | 1/2013 | Errico et al. |
| 8,368,339 B2 | 2/2013 | Jones et al. |
| 8,374,721 B2 | 2/2013 | Halloran et al. |
| 8,378,613 B2 | 2/2013 | Landry et al. |
| 8,380,350 B2 | 2/2013 | Ozick et al. |
| 8,382,590 B2 | 2/2013 | Stivoric et al. |
| 8,382,906 B2 | 2/2013 | Konandreas et al. |
| 8,386,081 B2 | 2/2013 | Landry et al. |
| 8,387,193 B2 | 3/2013 | Ziegler et al. |
| 8,390,251 B2 | 3/2013 | Cohen et al. |
| 8,392,021 B2 | 3/2013 | Konandreas et al. |
| 8,396,550 B2 | 3/2013 | Rom |
| 8,396,592 B2 | 3/2013 | Jones et al. |
| 8,398,546 B2 | 3/2013 | Pacione et al. |
| 8,402,540 B2 | 3/2013 | Kapoor et al. |
| 8,412,377 B2 | 4/2013 | Casey et al. |
| 8,417,360 B2 | 4/2013 | Sustaeta et al. |
| 8,417,383 B2 | 4/2013 | Ozick et al. |
| 8,417,481 B2 | 4/2013 | Cook et al. |
| 8,418,303 B2 | 4/2013 | Kapoor et al. |
| 8,422,444 B2 | 4/2013 | Gunawardena et al. |
| 8,428,778 B2 | 4/2013 | Landry et al. |
| 8,429,001 B2 | 4/2013 | Dance et al. |
| 8,429,096 B1 | 4/2013 | Soundararajan et al. |
| 8,429,097 B1 | 4/2013 | Sivasubramanian et al. |
| 8,433,622 B2 | 4/2013 | Gross |
| 8,438,695 B2 | 5/2013 | Gilbert, Jr. et al. |
| 8,442,861 B2 | 5/2013 | Dance et al. |
| 8,447,419 B1 | 5/2013 | de Anda Fast |
| 8,447,713 B1 | 5/2013 | Gansner |
| 8,456,125 B2 | 6/2013 | Landry et al. |
| 8,458,715 B1 | 6/2013 | Khosla et al. |
| 8,461,803 B2 | 6/2013 | Cohen et al. |
| 8,463,438 B2 | 6/2013 | Jones et al. |
| 8,474,090 B2 | 7/2013 | Jones et al. |
| 8,478,442 B2 | 7/2013 | Casey et al. |
| 8,479,302 B1 | 7/2013 | Lin |
| 8,484,146 B2 | 7/2013 | Movellan et al. |
| 8,494,980 B2 | 7/2013 | Hans et al. |
| 8,495,680 B2 | 7/2013 | Bentolila et al. |
| 8,504,504 B2 | 8/2013 | Liu |
| 8,515,578 B2 | 8/2013 | Chiappetta et al. |
| 8,516,651 B2 | 8/2013 | Jones et al. |
| 8,521,337 B1 | 8/2013 | Johnson |
| 8,528,157 B2 | 9/2013 | Schnittman et al. |
| 8,565,920 B2 | 10/2013 | Casey et al. |
| 8,566,143 B2 | 10/2013 | Etzioni et al. |
| 8,572,010 B1 | 10/2013 | Francis |
| 8,584,305 B2 | 11/2013 | Won et al. |
| 8,594,840 B1 | 11/2013 | Chiappetta et al. |
| 8,598,829 B2 | 12/2013 | Landry et al. |
| 8,600,553 B2 | 12/2013 | Svendsen et al. |
| 8,607,234 B2 | 12/2013 | Memik et al. |
| 8,612,107 B2 | 12/2013 | Malikopoulos |
| 8,612,311 B2 | 12/2013 | Gross |
| 8,615,479 B2 | 12/2013 | Jung et al. |
| 8,626,565 B2 | 1/2014 | Petroff |
| 8,630,960 B2 | 1/2014 | Gross |
| 8,661,605 B2 | 3/2014 | Svendsen et al. |
| 8,670,866 B2 | 3/2014 | Ziegler et al. |
| 8,686,679 B2 | 4/2014 | Jones et al. |
| 8,708,705 B1 | 4/2014 | Baker et al. |
| 8,713,025 B2 | 4/2014 | Eder |
| 8,749,196 B2 | 6/2014 | Cohen et al. |
| 8,761,931 B2 | 6/2014 | Halloran et al. |
| 8,761,935 B2 | 6/2014 | Casey et al. |
| 8,762,379 B2 | 6/2014 | Birdwell et al. |
| 8,762,570 B2 | 6/2014 | Qian et al. |
| 8,774,923 B2 | 7/2014 | Rom |
| 8,774,966 B2 | 7/2014 | Ziegler et al. |
| 8,775,341 B1 | 7/2014 | Commons |
| 8,779,940 B2 | 7/2014 | Amir |
| 8,779,941 B2 | 7/2014 | Amir |
| 8,788,092 B2 | 7/2014 | Casey et al. |
| 8,788,439 B2 | 7/2014 | Martinez et al. |
| 8,793,020 B2 | 7/2014 | Chiappetta et al. |
| 8,793,205 B1 | 7/2014 | Fisher et al. |
| 8,793,381 B2 | 7/2014 | Baughman et al. |
| 8,799,912 B2 | 8/2014 | Memik et al. |
| 8,812,419 B1 | 8/2014 | Teller et al. |
| 8,819,686 B2 | 8/2014 | Memik et al. |
| 8,839,255 B2 | 9/2014 | Memik et al. |
| 8,839,477 B2 | 9/2014 | Schnittman et al. |
| 8,850,465 B2 | 9/2014 | Bentolila et al. |
| 8,854,001 B2 | 10/2014 | Cohen et al. |
| 8,855,813 B2 | 10/2014 | Ziegler et al. |

(56) References Cited

U.S. PATENT DOCUMENTS

| | | |
|---|---|---|
| 8,860,602 B2 | 10/2014 | Nohara et al. |
| 8,873,813 B2 | 10/2014 | Tadayon et al. |
| 8,874,264 B1 | 10/2014 | Chiappetta et al. |
| 8,874,477 B2 | 10/2014 | Hoffberg |
| 8,909,590 B2 | 12/2014 | Newnham et al. |
| 8,914,300 B2 | 12/2014 | Sustaeta et al. |
| 8,914,314 B2 | 12/2014 | Newnham et al. |
| 8,918,866 B2 | 12/2014 | Luo et al. |
| 8,924,318 B2 | 12/2014 | Newnham et al. |
| 8,924,975 B2 | 12/2014 | Memik et al. |
| 8,942,659 B2 | 1/2015 | Gulati et al. |
| 8,943,008 B2 | 1/2015 | Ponulak et al. |
| 8,949,899 B2 | 2/2015 | Errico et al. |
| 8,954,192 B2 | 2/2015 | Ozick et al. |
| 8,965,819 B2 | 2/2015 | Tirunagari |
| 8,978,196 B2 | 3/2015 | Svendsen et al. |
| 8,985,127 B2 | 3/2015 | Konandreas et al. |
| 8,990,133 B1 | 3/2015 | Ponulak et al. |
| 8,996,177 B2 | 3/2015 | Coenen |
| 9,002,757 B2 | 4/2015 | Kojima |
| 9,007,908 B2 | 4/2015 | Niyato et al. |
| 9,008,835 B2 | 4/2015 | Dubrovsky et al. |
| 9,008,840 B1 | 4/2015 | Ponulak et al. |
| 9,015,092 B2 | 4/2015 | Sinyavskiy et al. |
| 9,015,093 B1 | 4/2015 | Commons |
| 9,038,233 B2 | 5/2015 | Jones et al. |
| 9,050,200 B2 | 6/2015 | Digiovanna et al. |
| 9,053,394 B2 | 6/2015 | Bruemmer et al. |
| 9,053,431 B1 | 6/2015 | Commons |
| 9,081,760 B2 | 7/2015 | Barbosa et al. |
| 9,082,079 B1 | 7/2015 | Coenen |
| 9,090,255 B2 | 7/2015 | Gupta et al. |
| 9,092,802 B1 | 7/2015 | Akella |
| 9,104,186 B2 | 8/2015 | Sinyavskiy et al. |
| 9,105,077 B2 | 8/2015 | Wersborg et al. |
| 9,113,371 B2 | 8/2015 | Sun et al. |
| 9,128,486 B2 | 9/2015 | Chiappetta et al. |
| 9,128,739 B1 | 9/2015 | Juels et al. |
| 9,144,360 B2 | 9/2015 | Ozick et al. |
| 9,144,361 B2 | 9/2015 | Landry et al. |
| 9,146,546 B2 | 9/2015 | Sinyavskiy et al. |
| 9,149,170 B2 | 10/2015 | Ozick et al. |
| 9,156,165 B2 | 10/2015 | Ponulak |
| 9,177,257 B2 | 11/2015 | Kozloski et al. |
| 9,179,470 B2 | 11/2015 | Gulati et al. |
| 9,186,793 B1 | 11/2015 | Meier |
| 9,189,730 B1 | 11/2015 | Coenen et al. |
| 9,195,934 B1 | 11/2015 | Hunt et al. |
| 9,202,253 B2 | 12/2015 | Macoviak et al. |
| 9,210,044 B2 | 12/2015 | Kacin et al. |
| 9,211,077 B2 | 12/2015 | Jung et al. |
| 9,213,936 B2 | 12/2015 | Visel |
| 9,213,937 B2 | 12/2015 | Ponulak |
| 9,215,598 B2 | 12/2015 | Vuyyuru et al. |
| 9,224,180 B2 | 12/2015 | Macoviak et al. |
| 9,225,772 B2 | 12/2015 | Lui et al. |
| 9,229,454 B1 | 1/2016 | Chiappetta et al. |
| 9,256,215 B2 | 2/2016 | Sinyavskiy et al. |
| 9,256,369 B2 | 2/2016 | Nazm Bojnordi et al. |
| 9,262,772 B2 | 2/2016 | Stivoric et al. |
| 9,277,264 B2 | 3/2016 | Bentolila et al. |
| 9,286,572 B2 | 3/2016 | de Anda Fast |
| 9,296,101 B2 | 3/2016 | Laurent et al. |
| 9,298,172 B2 | 3/2016 | Tesauro et al. |
| 9,311,600 B1 | 4/2016 | Ring |
| 9,314,924 B1 | 4/2016 | Laurent et al. |
| 9,317,038 B2 | 4/2016 | Ozick et al. |
| 9,342,786 B2 | 5/2016 | Krause et al. |
| 9,349,100 B2 | 5/2016 | Kozloski et al. |
| 9,354,778 B2 | 5/2016 | Cornaby et al. |
| 9,355,441 B2 | 5/2016 | Wersborg et al. |
| 9,358,685 B2 | 6/2016 | Meier et al. |
| 9,367,798 B2 | 6/2016 | Coenen et al. |
| 9,367,820 B2 | 6/2016 | Newnham et al. |
| 9,373,163 B2 | 6/2016 | Wersborg et al. |
| 9,384,443 B2 | 7/2016 | Passot et al. |
| 9,392,920 B2 | 7/2016 | Halloran et al. |
| 9,395,707 B2 | 7/2016 | Anderson et al. |
| 9,396,183 B2 | 7/2016 | Barbosa et al. |
| 9,396,486 B2 | 7/2016 | Stivoric et al. |
| 9,405,975 B2 | 8/2016 | Izhikevich |
| 9,412,041 B1 | 8/2016 | Fisher et al. |
| 9,412,075 B2 | 8/2016 | Padala et al. |
| 9,418,368 B2 | 8/2016 | Jung et al. |
| 9,432,298 B1 | 8/2016 | Smith |
| 9,436,909 B2 | 9/2016 | Piekniewski et al. |
| 9,436,917 B2 | 9/2016 | Mermoud et al. |
| 9,440,352 B2 | 9/2016 | Meier et al. |
| 9,443,428 B2 | 9/2016 | Amir |
| 9,446,515 B1 | 9/2016 | Meier |
| 9,471,565 B2 | 10/2016 | Barbosa et al. |
| 9,471,777 B1 | 10/2016 | Juels et al. |
| 9,480,381 B2 | 11/2016 | Schnittman et al. |
| 9,484,046 B2 | 11/2016 | Knudson et al. |
| 9,489,623 B1 | 11/2016 | Sinyavskiy et al. |
| 9,492,048 B2 | 11/2016 | Won et al. |
| 9,495,684 B2 | 11/2016 | Jung et al. |
| 9,525,696 B2 | 12/2016 | Kapoor et al. |
| 9,552,546 B1 | 1/2017 | Piekniewski |
| 9,569,736 B1 | 2/2017 | Ghesu et al. |
| 9,579,789 B2 | 2/2017 | Passot et al. |
| 9,599,990 B2 | 3/2017 | Halloran et al. |
| 9,604,359 B1 | 3/2017 | Grotmol et al. |
| 9,622,133 B1 | 4/2017 | Guvenc |
| 9,622,635 B2 | 4/2017 | Jones et al. |
| 9,630,318 B2 | 4/2017 | Ibarz Gabardos et al. |
| 9,635,181 B1 | 4/2017 | McGann et al. |
| 9,661,019 B2 | 5/2017 | Liu |
| 9,679,258 B2 | 6/2017 | Mnih et al. |
| 9,682,067 B2 | 6/2017 | Barkai et al. |
| 9,687,984 B2 | 6/2017 | Smith et al. |
| 9,705,817 B2 | 7/2017 | Lui et al. |
| 9,708,899 B2 | 7/2017 | Prange et al. |
| 9,716,792 B2 | 7/2017 | McGann et al. |
| 9,723,151 B2 | 8/2017 | McGann et al. |
| 9,727,557 B2 | 8/2017 | Barbosa et al. |
| 9,729,639 B2 | 8/2017 | Sustaeta et al. |
| 9,730,098 B2 | 8/2017 | Noriega |
| 9,731,417 B2 | 8/2017 | Bruemmer et al. |
| 9,754,221 B1 | 9/2017 | Nagaraja |
| 9,764,468 B2 | 9/2017 | Izhikevich et al. |
| 9,775,554 B2 | 10/2017 | Jung et al. |
| 9,789,605 B2 | 10/2017 | Meier et al. |
| 9,792,397 B1 | 10/2017 | Nagaraja |
| 9,792,531 B2 | 10/2017 | Georgescu et al. |
| 9,792,546 B2 | 10/2017 | Passot et al. |
| 9,800,608 B2 | 10/2017 | Korsunsky et al. |
| 9,811,849 B2 | 11/2017 | Bursey |
| 9,812,127 B1 | 11/2017 | Perez et al. |
| 9,817,957 B1 | 11/2017 | Molina-Markham et al. |
| 9,818,297 B2 | 11/2017 | El-Tantawy et al. |
| 9,823,842 B2 | 11/2017 | Gopalan et al. |
| 9,826,016 B2 | 11/2017 | Petrangeli et al. |
| 9,828,107 B1 | 11/2017 | Ruymgaart et al. |
| 9,840,003 B2 | 12/2017 | Szatmary et al. |
| 9,842,314 B2 | 12/2017 | Polli et al. |
| 9,858,592 B2 | 1/2018 | Osogami |
| 2002/0091747 A1 | 7/2002 | Rehg et al. |
| 2002/0091748 A1 | 7/2002 | Rehg et al. |
| 2002/0178127 A1 | 11/2002 | Byde et al. |
| 2002/0184166 A1 | 12/2002 | Jackson et al. |
| 2002/0198854 A1 | 12/2002 | Berenji et al. |
| 2003/0004912 A1 | 1/2003 | Pant et al. |
| 2003/0101449 A1 | 5/2003 | Bentolila et al. |
| 2003/0101451 A1 | 5/2003 | Bentolila et al. |
| 2003/0204368 A1 | 10/2003 | Ertin et al. |
| 2003/0221915 A1 | 12/2003 | Brand et al. |
| 2004/0015386 A1 | 1/2004 | Abe et al. |
| 2004/0073764 A1 | 4/2004 | Andreasson |
| 2005/0049830 A1 | 3/2005 | Kouritzin |
| 2005/0054381 A1 | 3/2005 | Lee et al. |
| 2005/0071223 A1 | 3/2005 | Jain et al. |
| 2005/0083858 A1 | 4/2005 | Loa et al. |
| 2005/0113650 A1 | 5/2005 | Pacione et al. |

(56) References Cited

U.S. PATENT DOCUMENTS

| | | |
|---|---|---|
| 2005/0143138 A1 | 6/2005 | Lee et al. |
| 2006/0184465 A1 | 8/2006 | Tsujino et al. |
| 2006/0192850 A1 | 8/2006 | Verhaegh et al. |
| 2006/0206337 A1 | 9/2006 | Paek et al. |
| 2006/0224535 A1 | 10/2006 | Chickering et al. |
| 2006/0247973 A1 | 11/2006 | Mueller et al. |
| 2006/0271441 A1 | 11/2006 | Mueller et al. |
| 2007/0011119 A1 | 1/2007 | Thaler |
| 2007/0087756 A1 | 4/2007 | Hoffberg |
| 2007/0094187 A1 | 4/2007 | Anderson et al. |
| 2007/0143765 A1 | 6/2007 | Aridor et al. |
| 2007/0192863 A1 | 8/2007 | Kapoor et al. |
| 2007/0198444 A1 | 8/2007 | Movellan et al. |
| 2007/0203871 A1 | 8/2007 | Tesauro et al. |
| 2007/0260346 A1 | 11/2007 | Ganesan et al. |
| 2008/0091526 A1 | 4/2008 | Shoemaker |
| 2008/0097644 A1 | 4/2008 | Kaznov et al. |
| 2008/0133517 A1 | 6/2008 | Kapoor et al. |
| 2008/0133518 A1 | 6/2008 | Kapoor et al. |
| 2008/0134330 A1 | 6/2008 | Kapoor et al. |
| 2008/0140591 A1 | 6/2008 | Agarwal et al. |
| 2008/0147852 A1 | 6/2008 | Zhu et al. |
| 2008/0154737 A1 | 6/2008 | Linkswiler |
| 2008/0162390 A1 | 7/2008 | Kapoor et al. |
| 2008/0168249 A1 | 7/2008 | Hirzel et al. |
| 2008/0208946 A1 | 8/2008 | Boritz et al. |
| 2008/0229415 A1 | 9/2008 | Kapoor et al. |
| 2008/0243439 A1 | 10/2008 | Runkle et al. |
| 2008/0249844 A1 | 10/2008 | Abe et al. |
| 2008/0262990 A1 | 10/2008 | Kapoor et al. |
| 2008/0262991 A1 | 10/2008 | Kapoor et al. |
| 2008/0287821 A1 | 11/2008 | Jung et al. |
| 2008/0312979 A1 | 12/2008 | Lee et al. |
| 2008/0312980 A1 | 12/2008 | Boulineau et al. |
| 2008/0313008 A1 | 12/2008 | Lee et al. |
| 2008/0313110 A1 | 12/2008 | Kreamer et al. |
| 2008/0313595 A1 | 12/2008 | Boulineau et al. |
| 2008/0313596 A1 | 12/2008 | Kreamer et al. |
| 2008/0318678 A1 | 12/2008 | Stivoric et al. |
| 2008/0319781 A1 | 12/2008 | Stivoric et al. |
| 2008/0319786 A1 | 12/2008 | Stivoric et al. |
| 2008/0319787 A1 | 12/2008 | Stivoric et al. |
| 2008/0319796 A1 | 12/2008 | Stivoric et al. |
| 2008/0319855 A1 | 12/2008 | Stivoric et al. |
| 2008/0320029 A1 | 12/2008 | Stivoric et al. |
| 2008/0320030 A1 | 12/2008 | Stivoric et al. |
| 2009/0006457 A1 | 1/2009 | Stivoric et al. |
| 2009/0006458 A1 | 1/2009 | Stivoric et al. |
| 2009/0012922 A1 | 1/2009 | Tesauro et al. |
| 2009/0018407 A1 | 1/2009 | Jung et al. |
| 2009/0024050 A1 | 1/2009 | Jung et al. |
| 2009/0030746 A1 | 1/2009 | Etzioni et al. |
| 2009/0089078 A1 | 4/2009 | Bursey |
| 2009/0099985 A1 | 4/2009 | Tesauro et al. |
| 2009/0156907 A1 | 6/2009 | Jung et al. |
| 2009/0156955 A1 | 6/2009 | Jung et al. |
| 2009/0157323 A1 | 6/2009 | Jung et al. |
| 2009/0157419 A1 | 6/2009 | Bursey |
| 2009/0157481 A1 | 6/2009 | Jung et al. |
| 2009/0157482 A1 | 6/2009 | Jung et al. |
| 2009/0157625 A1 | 6/2009 | Jung et al. |
| 2009/0157660 A1 | 6/2009 | Jung et al. |
| 2009/0157751 A1 | 6/2009 | Jung et al. |
| 2009/0157813 A1 | 6/2009 | Jung et al. |
| 2009/0163777 A1 | 6/2009 | Jung et al. |
| 2009/0164131 A1 | 6/2009 | Jung et al. |
| 2009/0164132 A1 | 6/2009 | Jung et al. |
| 2009/0164302 A1 | 6/2009 | Jung et al. |
| 2009/0164401 A1 | 6/2009 | Jung et al. |
| 2009/0164403 A1 | 6/2009 | Jung et al. |
| 2009/0164458 A1 | 6/2009 | Jung et al. |
| 2009/0164503 A1 | 6/2009 | Jung et al. |
| 2009/0164549 A1 | 6/2009 | Jung et al. |
| 2009/0171164 A1 | 7/2009 | Jung et al. |
| 2009/0172540 A1 | 7/2009 | Jung et al. |
| 2009/0177521 A1 | 7/2009 | Dube et al. |
| 2009/0254971 A1 | 10/2009 | Herz et al. |
| 2009/0276457 A1 | 11/2009 | Carmel et al. |
| 2009/0306866 A1 | 12/2009 | Malikopoulos |
| 2009/0318773 A1 | 12/2009 | Jung et al. |
| 2009/0322561 A1 | 12/2009 | Morioka et al. |
| 2009/0327011 A1 | 12/2009 | Petroff |
| 2009/0327172 A1 | 12/2009 | Liu et al. |
| 2010/0023307 A1 | 1/2010 | Lee et al. |
| 2010/0030578 A1 | 2/2010 | Siddique et al. |
| 2010/0082142 A1 | 4/2010 | Usadi et al. |
| 2010/0082513 A1 | 4/2010 | Liu |
| 2010/0137734 A1 | 6/2010 | Digiovanna et al. |
| 2010/0138271 A1 | 6/2010 | Henkin et al. |
| 2010/0138451 A1 | 6/2010 | Henkin et al. |
| 2010/0138452 A1 | 6/2010 | Henkin et al. |
| 2010/0145161 A1 | 6/2010 | Niyato et al. |
| 2010/0241243 A1 | 9/2010 | Hans et al. |
| 2010/0302961 A1 | 12/2010 | Timmers |
| 2010/0333167 A1 | 12/2010 | Luo et al. |
| 2011/0019693 A1 | 1/2011 | Fu et al. |
| 2011/0099130 A1 | 4/2011 | Blumberg et al. |
| 2011/0213435 A1 | 9/2011 | Rom |
| 2011/0213869 A1 | 9/2011 | Korsunsky et al. |
| 2011/0214157 A1 | 9/2011 | Korsunsky et al. |
| 2011/0219035 A1 | 9/2011 | Korsunsky et al. |
| 2011/0219056 A1 | 9/2011 | Carmel et al. |
| 2011/0231320 A1 | 9/2011 | Irving |
| 2011/0231510 A1 | 9/2011 | Korsunsky et al. |
| 2011/0231564 A1 | 9/2011 | Korsunsky et al. |
| 2011/0238855 A1 | 9/2011 | Korsunsky et al. |
| 2011/0251917 A1 | 10/2011 | Etzioni et al. |
| 2011/0302000 A1 | 12/2011 | Dance et al. |
| 2012/0002567 A1 | 1/2012 | Sun et al. |
| 2012/0011530 A1 | 1/2012 | Bentolila et al. |
| 2012/0016435 A1 | 1/2012 | Rom |
| 2012/0017262 A1 | 1/2012 | Kapoor et al. |
| 2012/0030150 A1 | 2/2012 | McAuley et al. |
| 2012/0041914 A1 | 2/2012 | Tirunagari |
| 2012/0072039 A1 | 3/2012 | Anderson et al. |
| 2012/0179511 A1 | 7/2012 | Lee et al. |
| 2012/0240185 A1 | 9/2012 | Kapoor et al. |
| 2012/0316793 A1 | 12/2012 | Jung et al. |
| 2013/0031036 A1 | 1/2013 | Kojima |
| 2013/0066750 A1 | 3/2013 | Siddique et al. |
| 2013/0080358 A1 | 3/2013 | Newnham et al. |
| 2013/0080377 A1 | 3/2013 | Newnham et al. |
| 2013/0080641 A1 | 3/2013 | Lui et al. |
| 2013/0085678 A1 | 4/2013 | Jung et al. |
| 2013/0095774 A1 | 4/2013 | Gulati et al. |
| 2013/0097664 A1 | 4/2013 | Herz et al. |
| 2013/0110750 A1 | 5/2013 | Newnham et al. |
| 2013/0122819 A1 | 5/2013 | Vuyyuru et al. |
| 2013/0151448 A1 | 6/2013 | Ponulak |
| 2013/0151449 A1 | 6/2013 | Ponulak |
| 2013/0151450 A1 | 6/2013 | Ponulak |
| 2013/0158367 A1 | 6/2013 | Pacione et al. |
| 2013/0158368 A1 | 6/2013 | Pacione et al. |
| 2013/0178952 A1 | 7/2013 | Wersborg et al. |
| 2013/0178953 A1 | 7/2013 | Wersborg et al. |
| 2013/0184838 A1 | 7/2013 | Tchoryk, Jr. et al. |
| 2013/0215116 A1 | 8/2013 | Siddique et al. |
| 2013/0219081 A1 | 8/2013 | Qian et al. |
| 2013/0223724 A1 | 8/2013 | Wersborg et al. |
| 2013/0325776 A1 | 12/2013 | Ponulak et al. |
| 2013/0346614 A1 | 12/2013 | Baughman et al. |
| 2014/0011850 A1 | 1/2014 | Barkai et al. |
| 2014/0018985 A1 | 1/2014 | Gupta et al. |
| 2014/0025613 A1 | 1/2014 | Ponulak |
| 2014/0032449 A1 | 1/2014 | Kacin et al. |
| 2014/0046777 A1 | 2/2014 | Markey et al. |
| 2014/0058755 A1 | 2/2014 | Macoviak et al. |
| 2014/0079297 A1 | 3/2014 | Tadayon et al. |
| 2014/0089001 A1 | 3/2014 | Macoviak et al. |
| 2014/0094999 A1 | 4/2014 | Petroff |
| 2014/0097979 A1 | 4/2014 | Nohara et al. |
| 2014/0100777 A1 | 4/2014 | Petroff |
| 2014/0100912 A1 | 4/2014 | Bursey |
| 2014/0115008 A1 | 4/2014 | Stivoric et al. |

(56) References Cited

U.S. PATENT DOCUMENTS

| | | |
|---|---|---|
| 2014/0122496 A1 | 5/2014 | Stivoric et al. |
| 2014/0122536 A1 | 5/2014 | Stivoric et al. |
| 2014/0122537 A1 | 5/2014 | Stivoric et al. |
| 2014/0156698 A1 | 6/2014 | Stivoric et al. |
| 2014/0180018 A1 | 6/2014 | Stivoric et al. |
| 2014/0180024 A1 | 6/2014 | Stivoric et al. |
| 2014/0180025 A1 | 6/2014 | Stivoric et al. |
| 2014/0180598 A1 | 6/2014 | Stivoric et al. |
| 2014/0180720 A1 | 6/2014 | Stivoric et al. |
| 2014/0180975 A1 | 6/2014 | Martinez et al. |
| 2014/0180978 A1 | 6/2014 | Martinez et al. |
| 2014/0180993 A1 | 6/2014 | Stivoric et al. |
| 2014/0181108 A1 | 6/2014 | Stivoric et al. |
| 2014/0187872 A1 | 7/2014 | Stivoric et al. |
| 2014/0187873 A1 | 7/2014 | Stivoric et al. |
| 2014/0188874 A1 | 7/2014 | Stivoric et al. |
| 2014/0201126 A1 | 7/2014 | Zadeh et al. |
| 2014/0213854 A1 | 7/2014 | Stivoric et al. |
| 2014/0213938 A1 | 7/2014 | Stivoric et al. |
| 2014/0214552 A1 | 7/2014 | Stivoric et al. |
| 2014/0214836 A1 | 7/2014 | Stivoric et al. |
| 2014/0214873 A1 | 7/2014 | Stivoric et al. |
| 2014/0214874 A1 | 7/2014 | Stivoric et al. |
| 2014/0214903 A1 | 7/2014 | Stivoric et al. |
| 2014/0220525 A1 | 8/2014 | Stivoric et al. |
| 2014/0221730 A1 | 8/2014 | Stivoric et al. |
| 2014/0221773 A1 | 8/2014 | Stivoric et al. |
| 2014/0221775 A1 | 8/2014 | Stivoric et al. |
| 2014/0221776 A1 | 8/2014 | Stivoric et al. |
| 2014/0221784 A1 | 8/2014 | Pacione et al. |
| 2014/0221785 A1 | 8/2014 | Pacione et al. |
| 2014/0221789 A1 | 8/2014 | Pacione et al. |
| 2014/0221790 A1 | 8/2014 | Pacione et al. |
| 2014/0221791 A1 | 8/2014 | Pacione et al. |
| 2014/0222732 A1 | 8/2014 | Stivoric et al. |
| 2014/0222733 A1 | 8/2014 | Stivoric et al. |
| 2014/0222734 A1 | 8/2014 | Stivoric et al. |
| 2014/0222735 A1 | 8/2014 | Stivoric et al. |
| 2014/0222739 A1 | 8/2014 | Ponulak |
| 2014/0222804 A1 | 8/2014 | Stivoric et al. |
| 2014/0222847 A1 | 8/2014 | Stivoric et al. |
| 2014/0222848 A1 | 8/2014 | Stivoric et al. |
| 2014/0222849 A1 | 8/2014 | Stivoric et al. |
| 2014/0222850 A1 | 8/2014 | Stivoric et al. |
| 2014/0222851 A1 | 8/2014 | Stivoric et al. |
| 2014/0223562 A1 | 8/2014 | Liu |
| 2014/0249676 A1 | 9/2014 | Florencio et al. |
| 2014/0257055 A1 | 9/2014 | Pacione et al. |
| 2014/0257540 A1 | 9/2014 | Pacione et al. |
| 2014/0257577 A1 | 9/2014 | Prange et al. |
| 2014/0272847 A1 | 9/2014 | Grimes et al. |
| 2014/0277718 A1 | 9/2014 | Izhikevich et al. |
| 2014/0277744 A1 | 9/2014 | Coenen |
| 2014/0277765 A1 | 9/2014 | Karimi et al. |
| 2014/0308636 A1 | 10/2014 | Stivoric et al. |
| 2014/0308639 A1 | 10/2014 | Stivoric et al. |
| 2014/0309939 A1 | 10/2014 | Stivoric et al. |
| 2014/0309940 A1 | 10/2014 | Stivoric et al. |
| 2014/0310066 A1 | 10/2014 | Etzioni et al. |
| 2014/0310105 A1 | 10/2014 | Stivoric et al. |
| 2014/0310223 A1 | 10/2014 | Stivoric et al. |
| 2014/0310274 A1 | 10/2014 | Stivoric et al. |
| 2014/0310275 A1 | 10/2014 | Stivoric et al. |
| 2014/0310276 A1 | 10/2014 | Stivoric et al. |
| 2014/0310284 A1 | 10/2014 | Stivoric et al. |
| 2014/0310294 A1 | 10/2014 | Stivoric et al. |
| 2014/0310295 A1 | 10/2014 | Stivoric et al. |
| 2014/0310296 A1 | 10/2014 | Stivoric et al. |
| 2014/0310297 A1 | 10/2014 | Stivoric et al. |
| 2014/0310298 A1 | 10/2014 | Stivoric et al. |
| 2014/0316885 A1 | 10/2014 | Stivoric et al. |
| 2014/0317039 A1 | 10/2014 | Stivoric et al. |
| 2014/0317042 A1 | 10/2014 | Stivoric et al. |
| 2014/0317119 A1 | 10/2014 | Stivoric et al. |
| 2014/0317135 A1 | 10/2014 | Stivoric et al. |
| 2014/0324395 A1 | 10/2014 | Silverman et al. |
| 2014/0330094 A1 | 11/2014 | Pacione et al. |
| 2014/0336539 A1 | 11/2014 | Torres et al. |
| 2014/0342328 A1 | 11/2014 | Pacione et al. |
| 2014/0344282 A1 | 11/2014 | Stivoric et al. |
| 2014/0357312 A1 | 12/2014 | Davis et al. |
| 2014/0371907 A1 | 12/2014 | Passot et al. |
| 2014/0371912 A1 | 12/2014 | Passot et al. |
| 2015/0005937 A1 | 1/2015 | Ponulak |
| 2015/0019241 A1 | 1/2015 | Bennett et al. |
| 2015/0058265 A1 | 2/2015 | Padala et al. |
| 2015/0094850 A1 | 4/2015 | Passot et al. |
| 2015/0094852 A1 | 4/2015 | Laurent et al. |
| 2015/0100526 A1 | 4/2015 | Newnham et al. |
| 2015/0100530 A1 | 4/2015 | Mnih et al. |
| 2015/0102945 A1 | 4/2015 | El-Tantawy et al. |
| 2015/0140938 A1 | 5/2015 | Gulati et al. |
| 2015/0142466 A1 | 5/2015 | Macoviak et al. |
| 2015/0143414 A1 | 5/2015 | Bentolila et al. |
| 2015/0161232 A1 | 6/2015 | Kosko et al. |
| 2015/0163345 A1 | 6/2015 | Cornaby et al. |
| 2015/0179170 A1 | 6/2015 | Sarikaya et al. |
| 2015/0235321 A1 | 8/2015 | Unser et al. |
| 2015/0286873 A1 | 10/2015 | Davis et al. |
| 2015/0289797 A1 | 10/2015 | Pacione et al. |
| 2015/0289798 A1 | 10/2015 | Pacione et al. |
| 2015/0289799 A1 | 10/2015 | Pacione et al. |
| 2015/0289800 A1 | 10/2015 | Pacione et al. |
| 2015/0289808 A1 | 10/2015 | Pacione et al. |
| 2015/0289809 A1 | 10/2015 | Pacione et al. |
| 2015/0289810 A1 | 10/2015 | Pacione et al. |
| 2015/0289811 A1 | 10/2015 | Pacione et al. |
| 2015/0289812 A1 | 10/2015 | Pacione et al. |
| 2015/0294216 A1 | 10/2015 | Baughman et al. |
| 2015/0294574 A1 | 10/2015 | Pacione et al. |
| 2015/0294583 A1 | 10/2015 | Pacione et al. |
| 2015/0294594 A1 | 10/2015 | Pacione et al. |
| 2015/0310068 A1 | 10/2015 | Pickens et al. |
| 2015/0316282 A1 | 11/2015 | Stone et al. |
| 2015/0324236 A1 | 11/2015 | Gopalan et al. |
| 2015/0330640 A1 | 11/2015 | Stork Genannt Wersborg |
| 2015/0339946 A1 | 11/2015 | Pacione et al. |
| 2015/0363345 A1 | 12/2015 | Peng et al. |
| 2015/0366219 A1 | 12/2015 | Stork Genannt Wersborg |
| 2016/0012338 A1 | 1/2016 | Ring et al. |
| 2016/0021671 A1 | 1/2016 | Gulati et al. |
| 2016/0028608 A1 | 1/2016 | Dasgupta et al. |
| 2016/0044054 A1 | 2/2016 | Stiansen et al. |
| 2016/0055307 A1 | 2/2016 | Macoviak et al. |
| 2016/0067864 A1 | 3/2016 | Mullan et al. |
| 2016/0086086 A1 | 3/2016 | Gabillon et al. |
| 2016/0096270 A1 | 4/2016 | Ibarz Gabardos et al. |
| 2016/0096272 A1 | 4/2016 | Smith et al. |
| 2016/0112341 A1 | 4/2016 | Lui et al. |
| 2016/0148246 A1 | 5/2016 | Thomas et al. |
| 2016/0148250 A1 | 5/2016 | Thomas et al. |
| 2016/0148251 A1 | 5/2016 | Thomas et al. |
| 2016/0156737 A1 | 6/2016 | Perino et al. |
| 2016/0179162 A1 | 6/2016 | Eastep et al. |
| 2016/0188843 A1 | 6/2016 | Harris et al. |
| 2016/0210602 A1 | 7/2016 | Siddique et al. |
| 2016/0217371 A1 | 7/2016 | Leithiser |
| 2016/0219070 A1 | 7/2016 | Vasseur et al. |
| 2016/0223218 A1 | 8/2016 | Barrett |
| 2016/0232445 A1 | 8/2016 | Srinivasan et al. |
| 2016/0246929 A1 | 8/2016 | Zenati et al. |
| 2016/0253445 A1 | 9/2016 | Pataky |
| 2016/0279329 A1 | 9/2016 | Faisal et al. |
| 2016/0288323 A1 | 10/2016 | Muhlig et al. |
| 2016/0303738 A1 | 10/2016 | Laurent et al. |
| 2016/0366160 A1 | 12/2016 | Kapoor et al. |
| 2017/0001309 A1 | 1/2017 | Passot et al. |
| 2017/0011320 A1 | 1/2017 | Anderson et al. |
| 2017/0024643 A1 | 1/2017 | Lillicrap et al. |
| 2017/0032245 A1 | 2/2017 | Osband et al. |
| 2017/0061283 A1 | 3/2017 | Rasmussen et al. |
| 2017/0069009 A1 | 3/2017 | Bursey |
| 2017/0076201 A1 | 3/2017 | van Hasselt et al. |
| 2017/0103532 A1 | 4/2017 | Ghesu et al. |

(56) References Cited

U.S. PATENT DOCUMENTS

| | | |
|---|---|---|
| 2017/0109422 A1 | 4/2017 | Satkunarajah et al. |
| 2017/0111503 A1 | 4/2017 | McGann et al. |
| 2017/0111505 A1 | 4/2017 | McGann et al. |
| 2017/0111507 A1 | 4/2017 | McGann et al. |
| 2017/0111509 A1 | 4/2017 | McGann et al. |
| 2017/0116497 A1 | 4/2017 | Georgescu et al. |
| 2017/0117744 A1 | 4/2017 | Ye et al. |
| 2017/0118688 A1 | 4/2017 | Guvenc |
| 2017/0140053 A1 | 5/2017 | Vorobev et al. |
| 2017/0161437 A1 | 6/2017 | Weinstein et al. |
| 2017/0161447 A1 | 6/2017 | Weinstein et al. |
| 2017/0161451 A1 | 6/2017 | Weinstein et al. |
| 2017/0171761 A1 | 6/2017 | Guvenc |
| 2017/0177808 A1 | 6/2017 | Irwin et al. |
| 2017/0177809 A1 | 6/2017 | Bull et al. |
| 2017/0178093 A1 | 6/2017 | Bull et al. |
| 2017/0178135 A1 | 6/2017 | Bull et al. |
| 2017/0178245 A1 | 6/2017 | Rodkey |
| 2017/0185087 A1 | 6/2017 | Petroff |
| 2017/0186125 A1 | 6/2017 | Petroff |
| 2017/0193136 A1 | 7/2017 | Prasad et al. |
| 2017/0200061 A1 | 7/2017 | Julian et al. |
| 2017/0205863 A1 | 7/2017 | Lee et al. |
| 2017/0213204 A1 | 7/2017 | Massoudi et al. |
| 2017/0228662 A1 | 8/2017 | Gu et al. |
| 2017/0236006 A1 | 8/2017 | Davis et al. |
| 2017/0255884 A1 | 9/2017 | Visvanathan |
| 2017/0255945 A1 | 9/2017 | McCord et al. |
| 2017/0261949 A1 | 9/2017 | Hoffmann et al. |
| 2017/0270447 A1 | 9/2017 | Borean et al. |
| 2017/0278018 A1 | 9/2017 | Mnih et al. |
| 2017/0279832 A1 | 9/2017 | Di Pietro et al. |
| 2017/0286860 A1 | 10/2017 | Chen et al. |
| 2017/0290095 A1 | 10/2017 | Pereira et al. |
| 2017/0291301 A1 | 10/2017 | Ibarz Gabardos et al. |
| 2017/0293844 A1 | 10/2017 | Gombolay et al. |
| 2017/0300648 A1 | 10/2017 | Charlap |
| 2017/0300839 A1 | 10/2017 | Bursey |
| 2017/0302521 A1 | 10/2017 | Lui et al. |
| 2017/0308535 A1 | 10/2017 | Agarwal et al. |
| 2017/0308856 A1 | 10/2017 | Bursey |
| 2017/0308946 A1 | 10/2017 | Bursey |
| 2017/0316777 A1 | 11/2017 | Perez et al. |
| 2017/0318468 A1 | 11/2017 | Az |
| 2017/0326726 A1 | 11/2017 | Grotmol et al. |
| 2017/0330077 A1 | 11/2017 | Williams et al. |
| 2017/0337478 A1 | 11/2017 | Sarikaya et al. |
| 2017/0337682 A1 | 11/2017 | Liao et al. |
| 2017/0339484 A1 | 11/2017 | Kim |
| 2017/0347279 A1 | 11/2017 | Bejerano et al. |
| 2017/0357844 A1 | 12/2017 | Comaniciu et al. |
| 2017/0364829 A1 | 12/2017 | Fyffe |
| 2017/0371306 A1 | 12/2017 | Sossan et al. |
| 2017/0371965 A1 | 12/2017 | Davar et al. |
| 2018/0004913 A1 | 1/2018 | Ghasemzadeh et al. |
| 2018/0005083 A1 | 1/2018 | Georgescu et al. |
| 2018/0012137 A1* | 1/2018 | Wright ............... G05B 13/0265 |
| 2018/0225589 A1* | 8/2018 | Ghavamzadeh ....... G06N 20/00 |

OTHER PUBLICATIONS

U.S. Appl. No. 10/475,510, filed Nov. 12, 2019, Yang et al.

Abbasi-Yadkori, Y.; Bartlett, P.; and Wright, S. 2016. A fast and reliable policy improvement algorithm. In Proceedings of the 19th International Conference on Artificial Intelligence and Statistics, 1338-1346.

Abbeel, Pieter, Adam Coates, Morgan Quigley, and Andrew Y. Ng. "An application of reinforcement learning to aerobatic helicopter flight." In *Advances in neural information processing systems*, pp. 1-8. 2007.

Abbeel, Pieter, and Andrew Y. Ng. "Apprenticeship learning via inverse reinforcement learning." In *Proceedings of the twenty-first international conference on Machine learning*, p. 1. ACM, 2004.

Abbeel, Pieter, Morgan Quigley, and Andrew Y. Ng. "Using inaccurate models in reinforcement learning." In *Proceedings of the 23rd international conference on Machine learning*, pp. 1-8. ACM, 2006.

Achiam, J.; Held, D.; Tamar, A.; and Abbeel, p. 2017. Constrained policy optimization. In Proceedings of the ThirtyFourth International Conference on Machine Learning, 22-31.

Amari, S., and Nagaoka, H., eds. 2000. *Methods of Information Geometry*. Oxford University Press.

Amari, Shun-Ichi. "Natural gradient works efficiently in learning." *Neural computation* 10, No. 2 (1998): 251-276.

Amer-Yahia, Sihem, Vincent Leroy, Alexandre Termier, Martin Kirchgessner, and Behrooz Omidvar-Tehrani. "Interactive Data-Driven Research: the place where databases and data mining research meet." PhD diss., LIG, 2015.

Anthony, Thomas, Zheng Tian, and David Barber. "Thinking Fast and Slow with Deep Learning and Tree Search." arXiv preprint arXiv:1705.08439 (2017).

Arulkumaran, Kai, Marc Peter Deisenroth, Miles Brundage, and Anil Anthony Bharath. "A brief survey of deep reinforcement learning." arXiv preprint arXiv:1708.05866(2017).

Ba, J. L.; Kiros, R.; and Hinton, G. 2016. Layer normalization. In arXiv preprint arXiv:1607.06450.

Baez, John; Fritz, Tobias (2014). "A Bayesian characterization of relative entropy". Theory and Application of Categories. 29: 421-456. arXiv:1402.3067 Freely accessible.

Baird III, Leemon C., and Andrew W. Moore. "Gradient descent for general reinforcement learning." In *Advances in neural information processing systems*, pp. 968-974. 1999.

Baird, Leemon, Residual algorithms: Reinforcement learning with function approximation. ICML, pp. 30-37, 1995.

Banerjee, Bikramjit, and Jing Peng. "Performance bounded reinforcement learning in strategic interactions." In *AAAI*, vol. 4, pp. 2-7. 2004.

Barreto, André, Will Dabney, Rémi Munos, Jonathan J. Hunt, Tom Schaul, David Silver, and Hado P. van Hasselt. "Successor features for transfer in reinforcement learning." In *Advances in Neural Information Processing Systems*, pp. 4058-4068. 2017.

Barto, A., Reinforcement learning, in O. Omidvar, D. Elliot (eds.) Neural Systems for Control, p. 7-30, Academic Press, 1997.

Bellemare, Marc G., Will Dabney, and Remi Munos. "A distributional perspective on reinforcement learning." arXiv preprint arXiv:1707.06887(2017).

Benjamini, Y., and Hochberg, Y. 1995. Controlling the false discovery rate: A practical and powerful approach to multiple testing. Journal of the Royal Statistical Society 57(1):289-300.

Bertsekas, Dimitri P., and John N. Tsitsiklis. "Neuro-dynamic programming: an overview." In *Decision and Control, 1995., Proceedings of the 34th IEEE Conference on*, vol. 1, pp. 560-564. IEEE, 1995.

Bishop C. (2006). Pattern Recognition and Machine Learning p. 55.

Biswas, Anupam, K. K. Mishra, Shailesh Tiwari, and A. K. Misra. "Physics-inspired optimization algorithms: a survey." *Journal of Optimization* 2013 (2013).

Bloch, Mitchell Keith. "Temporal second difference traces." arXivpreprint arXiv:1104.4664 (2011).

Bloembergen, Daan, Karl Tuyls, Daniel Hennes, and Michael Kaisers. "Evolutionary Dynamics of Multi-Agent Learning: A Survey." *J. Artif. Intell. Res. (JAIR)* 53 (2015): 659-697.

Boyan, Justin A., and Michael L. Littman. "Packet routing in dynamically changing networks: A reinforcement learning approach." In *Advances in neural information processing systems*, pp. 671-678. 1994.

Bozinovski, S., A self learning system using secondary reinforcement, In R. Trappl (ed.) Cybernetics and Systems Research, p. 397-402, North Holland, 1982.

Bozinovski, S., Crossbar Adaptive Array: The first connectionist network that solved the delayed reinforcement learning problem, In A. Dobnikar, N. Steele, D. Pearson, R. Albert (Eds.) Artificial Neural Networks and Genetic Algorithms, 320-325, Springer Verlag, 1999.

(56) References Cited

OTHER PUBLICATIONS

Bradtke, Steven J. "Reinforcement learning applied to linear quadratic regulation." In *Advances in neural information processing systems*, pp. 295-302. 1993.
Bradtke, Steven J., B. Erik Ydstie, and Andrew G. Barto. "Adaptive linear quadratic control using policy iteration." In *American Control Conference*, 1994, vol. 3, pp. 3475-3479. IEEE, 1994.
Brafman, R. I., and Tennenholtz, M. 2003. R-max a general polynomial time algorithm for near-optimal reinforcement learning. *Journal of Machine Learning Research* 3:213-231.
Brafman, Ronen I., and Moshe Tennenholtz. "R-max-a general polynomial time algorithm for near-optimal reinforcement learning." *Journal of Machine Learning Research* 3, No. Oct. 2002: 213-231.
Brochu, Eric, Vlad M. Cora, and Nando De Freitas. "A tutorial on Bayesian optimization of expensive cost functions, with application to active user modeling and hierarchical reinforcement learning." arXivpreprint arXiv:1012.2599(2010).
Brockman, G.; Cheung, V.; Pettersson, L.; Schneider, J.; Schulman, J.; Tang, J.; and Zaremba, W. 2016. Openai gym.
Buchli, Jonas, Evangelos Theodorou, Freek Stulp, and Stefan Schaal. "Variable impedance control a reinforcement learning approach." *Robotics: Science and Systems VI* (2011): 153.
Buchli, Jonas, Freek Stulp, Evangelos Theodorou, and Stefan Schaal. "Learning variable impedance control." *The International Journal of Robotics Research* 30, No. 7 (2011): 820-833.
Bugallo, M. F.; Elvira, V.; Martino, L.; Luengo, D.; Miguez, J.; Djuric, P. M. (Jul. 2017). "Adaptive Importance Sampling: The past, the present, and the future". IEEE Signal Processing Magazine. 34 (4): 60-79. doi:10.1109/msp.2017.2699226. ISSN 1053-5888.
Bugallo, Mónica F.; Martino, Luca; Corander, Jukka (Dec. 1, 2015). "Adaptive importance sampling in signal processing". Digital Signal Processing. Special Issue in Honour of William J. (Bill) Fitzgerald. 47: 36-49. doi:10.1016/j.dsp.2015.05.014.
Burnham, K. P. and Anderson D. R. (2002), Model Selection and Multimodel Inference: A Practical Information-Theoretic Approach, p. 51, Second Edition (Springer Science) ISBN 978-0-387-95364-9.
Burnham, K.P.; Anderson, D.R. (2001). "Kullback-Leibler information as a basis for strong inference in ecological studies". Wildlife Research. 28: 111-119. doi:10.1071/WR99107.
Buşoniu, Lucian, Damien Ernst, Bart De Schutter, and Robert Babuška. "Online least-squares policy iteration for reinforcement learning control." In *American Control Conference (ACC)*, 2010, pp. 486-491. IEEE, 2010.
Busoniu, Lucian, Robert Babuska, and Bart De Schutter. "A comprehensive survey of multiagent reinforcement learning." *IEEE Transactions on Systems, Man, and Cybernetics—Part C: Applications and Reviews*, 38 (2), 2008 (2008).
Busoniu, Lucian, Robert Babuska, Bart De Schutter, and Damien Ernst. *Reinforcement learning and dynamic programming using function approximators*. vol. 39. CRC press, 2010.
Calumby, Rodrigo Tripodi. "Diversity-oriented multimodal and interactive information retrieval= Recuperação multimodal e interativa de informação orientada por diversidade." (2015).
Cappé, O.; Guillin, A.; Marin, J. M.; Robert, C. P. (Dec. 1, 2014). "Population Monte Carlo". Journal of Computational and Graphical Statistics. 13 (4): 907-929. doi:10.1198/106186004X12803. ISSN 1061-8600.
Cappé, Olivier; Douc, Randal; Guillin, Arnaud; Marin, Jean-Michel; Robert, Christian P. (Apr. 25, 2008). "Adaptive importance sampling in general mixture classes". Statistics and Computing. 18 (4): 447-459. doi:10.1007/s11222-008-9059-x. ISSN 0960-3174.
Cassandra, Anthony R., and Leslie Pack Kaelbling. "Learning policies for partially observable environments: Scaling up." In Machine Learning Proceedings 1995: Proceedings of the Twelfth International Conference on Machine Learning, Tahoe City, California, Jul. 9-12, 1995, p. 362. Morgan Kaufmann, 2016.
Chaloner, K.; Verdinelli, I. (1995). "Bayesian experimental design: a review". Statistical Science. 10 (3): 273-304. doi:10.1214/ss/1177009939.
Chebotar, Yevgen, Karol Hausman, Marvin Zhang, Gaurav Sukhatme, Stefan Schaal, and Sergey Levine. "Combining Model-Based and Model-Free Updates for Trajectory-Centric Reinforcement Learning." arXiv preprint arXiv:1703.03078 (2017).
Chebotar, Yevgen, Mrinal Kalakrishnan, Ali Yahya, Adrian Li, Stefan Schaal, and Sergey Levine. "Path integral guided policy search." In *Robotics and Automation (ICRA), 2017 IEEE International Conference on*, pp. 3381-3388. IEEE, 2017.
Chentanez, Nuttapong, Andrew G. Barto, and Satinder P. Singh. "Intrinsically motivated reinforcement learning." In *Advances in neural information processing systems*, pp. 1281-1288. 2005.
Chou, Po-Wei, Daniel Maturana, and Sebastian Scherer. "Improving stochastic policy gradients in continuous control with deep reinforcement learning using the beta distribution." In *International Conference on Machine Learning*, pp. 834-843. 2017.
Chrisman, Lonnie. "Reinforcement learning with perceptual aliasing: The perceptual distinctions approach." In *AAAI*, pp. 183-188. 1992.
Ciosek, K., and Whiteson, S. 2018. Expected policy gradients. In *Proceedings of the 32nd Conference on Artificial Intelligence*, 2868-2875.
Cohen, A.; Yu, L.; and Wright, R. 2018. Diverse exploration for fast and safe policy improvement. In *Proceedings of the 32nd Conference on Artificial Intelligence*, 2876-2883.
Cohen, Andrew. "Diverse experience learning." PhD diss., State University of New York at Binghamton, 2016.
Conti, Edoardo, Vashisht Madhavan, Felipe Petroski Such, Joel Lehman, Kenneth O. Stanley, and Jeff Clune. "Improving Exploration in Evolution Strategies for Deep Reinforcement Learning via a Population of Novelty-Seeking Agents." arXiv preprint arXiv:1712.06560 (2017).
Cornuet, Jean-Marie; Marin, Jean-Michel; Mira, Antonietta; Robert, Christian P. (Dec. 1, 2012). "Adaptive Multiple Importance Sampling". Scandinavian Journal of Statistics. 39 (4): 798-812. doi:10.1111/j.1467-9469.2011.00756.x. ISSN 1467-9469.
Cover, Thomas M., Joy A. Thomas (1991) Elements of Information Theory (John Wiley & Sons), p. 22.
Crites, Robert H., and Andrew G. Barto. "Improving elevator performance using reinforcement learning." In *Advances in neural information processing systems*, pp. 1017-1023. 1996.
Daniel, Christian, Gerhard Neumann, and Jan Peters. "Learning concurrent motor skills in versatile solution spaces." In *Intelligent Robots and Systems (IROS), 2012 IEEE/RSJ International Conference on*, pp. 3591-3597. IEEE, 2012.
Dayan, Peter, and Bernard W. Balleine. "Reward, motivation, and reinforcement learning." *Neuron* 36, No. 2 (2002): 285-298.
Dayan, Peter, and C. J. C. H. Watkins. "Q-learning." Machine learning 8, No. 3 (1992): 279-292.
Dayan, Peter, and Geoffrey E. Hinton. "Using expectation-maximization for reinforcement learning." *Neural Computation* 9, No. 2 (1997): 271-278.
Dearden, Richard, Nir Friedman, and Stuart Russell. "Bayesian Q-learning." In *AAAI/IAAI*, pp. 761-768. 1998.
Degris, Thomas, Olivier Sigaud, and Pierre-Henri Wuillemin. "Learning the structure of factored Markov decision processes in reinforcement learning problems." In *Proceedings of the 23rd international conference on Machine learning*, pp. 257-264. ACM, 2006.
Deisenroth, Marc, and Carl E. Rasmussen. "PILCO: A model-based and data-efficient approach to policy search." In *Proceedings of the 28th International Conference on machine learning (ICML-11)*, pp. 465-472. 2011.
Dietterich, T. G. 2001. Ensemble algorithms in reinforcement learning. Multiple Classifier Systems 1857:1-15.
Dietterich, Thomas G. "Hierarchical reinforcement learning with the MAXQ value function decomposition." *J. Artif. Intell. Res. (JAIR)* 13 (2000): 227-303.
Dietterich, Thomas G. "The MAXQ Method for Hierarchical Reinforcement Learning." In *ICML*, pp. 118-126. 1998.
Dimakopoulou, M., and Roy, B. V. 2018. Coordinated exploration in concurrent reinforcement learning. In *Proceedings of the 36th International Conference on Machine Learning*, 80:1271-1279.

(56) References Cited

OTHER PUBLICATIONS

Doya, Kenji, Kazuyuki Samejima, Ken-ichi Katagiri, and Mitsuo Kawato. "Multiple model-based reinforcement learning." *Neural computation* 14, No. 6 (2002): 1347-1369.

Doya, Kenji. "Reinforcement learning in continuous time and space." *Neural computation* 12, No. 1 (2000): 219-245.

Duan, Yan, Xi Chen, Rein Houthooft, John Schulman, and Pieter Abbeel. "Benchmarking deep reinforcement learning for continuous control." In *Proceedings of The 33rd International Conference on Machine Learning*, pp. 1329-1338. 2016.

Duchi J., "Derivations for Linear Algebra and Optimization", p. 13.

Džeroski, Sašo, Luc De Raedt, and Kurt Driessens. "Relational reinforcement learning." *Machine learning*, No. 1-2 (2001): 7-52.

El Bsat, Salam, Haitham Bou-Ammar, and Matthew E. Taylor. "Scalable Multitask Policy Gradient Reinforcement Learning." In *AAAI*, pp. 1847-1853. 2017.

Elvira, V.; Martino, L.; Luengo, D.; Bugallo, M.F. (Oct. 1, 2015). "Efficient Multiple Importance Sampling Estimators". IEEE Signal Processing Letters. 22 (10): 1757-1761. doi:10.1109/LSP.2015.2432078. ISSN 1070-9908.

Elvira, Victor; Martino, Luca; Luengo, David; Bugallo, Mónica F. "Improving population Monte Carlo: Alternative weighting and resampling schemes". Signal Processing. 131: 77-91. doi:10.1016/j.sigpro.2016.07.012.

Engel, Yaakov, Shie Mannor, and Ron Meir. "Reinforcement learning with Gaussian processes." In *Proceedings of the 22nd international conference on Machine learning*, pp. 201-208. ACM, 2005.

Englert, Peter, Alexandros Paraschos, Jan Peters, and Marc Peter Deisenroth. "Model-based imitation learning by probabilistic trajectory matching." In *Robotics and Automation (ICRA), 2013 IEEE International Conference on*, pp. 1922-1927. IEEE, 2013.

Englert, Peter, Alexandros Paraschos, Marc Peter Deisenroth, and Jan Peters. "Probabilistic model-based imitation learning." *Adaptive Behavior* 21, No. 5 (2013): 388-403.

Ernst, D.; Geurts, P.; Wehenkel, L.; and Littman, L. 2005. Tree-based batch mode reinforcement learning. Journal of Machine Learning Research 6:503-556.

Fernández, Fernando, and Manuela Veloso. "Probabilistic policy reuse in a reinforcement learning agent." In *Proceedings of the fifth international joint conference on Autonomous agents and multiagent systems*, pp. 720-727. ACM, 2006.

Filippi, Sarah, Olivier Cappé, and Aurélien Garivier. "Optimism in reinforcement learning and Kullback-Leibler divergence." In *Communication, Control, and Computing (Allerton), 2010 48th Annual Allerton Conference on*, pp. 115-122. IEEE, 2010.

Fortunato, M.; Azar, M.; B, P.; Menick, J.; Osband, I.; Graves, A.; Mnih, V.; Munos, R.; Hassabis, D.; Pietquin, O.; Blundell, C.; and Legg, S. 2018. Noisy networks for exploration. In *International Conference on Learning Representations*.

Frank, Mikhail, Jürgen Leitner, Marijn Stollenga, Alexander Förster, and Jürgen Schmidhuber. "Curiosity driven reinforcement learning for motion planning on humanoids." *Frontiers in neurorobotics* 7 (2014): 25.

Fraundorf, P. (2007). "Thermal roots of correlation-based complexity". Complexity. 13 (3): 18-26. doi:10.1002/cplx.20195.

Friston, Karl J., Jean Daunizeau, and Stefan J. Kiebel. "Reinforcement learning or active inference?" *PloS one* 4, No. 7 (2009): e6421.

Fukuchi, Yosuke, Masahiko Osawa, Hiroshi Yamakawa, and Michita Imai. "Autonomous self-explanation of behavior for interactive reinforcement learning agents." In *Proceedings of the 5th International Conference on Human Agent Interaction*, pp. 97-101. ACM, 2017.

Galichet, Nicolas, Michele Sebag, and Olivier Teytaud. "Exploration vs exploitation vs safety: Risk-aware multi-armed bandits." In *Asian Conference on Machine Learning*, pp. 245-260. 2013.

Garcia, J., and Fernandez, F. 2012. Safe exploration of state and action spaces in reinforcement learning. Journal of Machine Learning Research 45:515-564.

Ge, Hao, Jianhua Li, Shenghong Li, Wen Jiang, and Yifan Wang. "A novel parallel framework for pursuit learning schemes." *Neurocomputing* 228 (2017): 198-204.

Gelly, Sylvain, and David Silver. "Combining online and offline knowledge in UCT." In *Proceedings of the 24th international conference on Machine learning*, pp. 273-280. ACM, 2007.

Gibbs, J.W., (1873), "A method of geometrical representation of thermodynamic properties of substances by means of surfaces", reprinted in The Collected Works of J. W. Gibbs, vol. I Thermodynamics, ed. W. R. Longley and R. G. Van Name (New York: Longmans, Green, 1931) footnote p. 52.

Gil, Paulo, and Luis Nunes. "Hierarchical reinforcement learning using path clustering." In *Information Systems and Technologies (CISTI), 2013 8th Iberian Conference on*, pp. 1-6. IEEE, 2013.

Glatt, Ruben, and Anna Helena Reali Costa. "Improving Deep Reinforcement Learning with Knowledge Transfer." In *AAAI*, pp. 5036-5037. 2017.

Gosavi, Abhijit. "A reinforcement learning algorithm based on policy iteration for average reward: Empirical results with yield management and convergence analysis." *Machine Learning* 55, No. 1 (2004): 5-29.

Grosse, R., and Martens, J. 2016. A kronecker-factored approximate fisher matrix for convolution layers. In *Proceedings of The 33rd International Conference on Machine Learning*, 573-582.

Gu, Shixiang, Timothy Lillicrap, Zoubin Ghahramani, Richard E. Turner, Bernhard Schölkopf, and Sergey Levine. "Interpolated Policy Gradient: Merging On-Policy and Off-Policy Gradient Estimation for Deep Reinforcement Learning." arXiv preprint arXiv:1706.00387, In *Advances in Neural Information Processing Systems* 30, 3849-3858 (2017).

Haarnoja, Tuomas, Haoran Tang, Pieter Abbeel, and Sergey Levine. "Reinforcement Learning with Deep Energy-Based Policies." arXiv preprint arXiv:1702.08165 (2017).

Hanna, J.; Thomas, P.; Stone, P.; and Neikum, S. 2017. Data-efficient policy evaluation through behavior policy search. In Proceedings of the Thirty-Fourth International Conference on Machine Learning, 1394-1403.

Hansen, N. 2006. The CMA evolution strategy: a comparing review. In Lozano, J. A.; Larrañaga, P.; Inza, I.; and Bengoetxea, E., eds., Towards a New Evolutionary Computation: Advances in the Estimation of Distribution Algorithms. Springer.

Held, David, Xinyang Geng, Carlos Florensa, and Pieter Abbeel. "Automatic Goal Generation for Reinforcement Learning Agents." arXiv preprint arXiv:1705.06366 (2017).

Hernández López, José Manuel, José Héctor Lozano Bleda, and José Santacreu Mas. "La evaluación de la persistencia basada en una tarea de aprendizaje adquisición-extinción." *Escritos de Psicología (Internet)* 4, No. 1 (2011): 25-33.

Hessel, Matteo, Joseph Modayil, Hado Van Hasselt, Tom Schaul, Georg Ostrovski, Will Dabney, Dan Horgan, Bilal Piot, Mohammad Azar, and David Silver. "Rainbow: Combining Improvements in Deep Reinforcement Learning." arXiv preprint arXiv:1710.02298 (2017).

Higgins, Irina, Arka Pal, Andrei A. Rusu, Loic Matthey, Christopher P. Burgess, Alexander Pritzel, Matthew Botvinick, Charles Blundell, and Alexander Lerchner. "Darla: Improving zero-shot transfer in reinforcement learning." arXiv preprint arXiv:1707.08475 (2017).

Hinton, Geoffrey E. "Training products of experts by minimizing contrastive divergence." *Neural computation* 14, No. 8 (2002): 1771-1800.

Hinton, Geoffrey E., Simon Osindero, and Yee-Whye Teh. "A fast learning algorithm for deep belief nets." *Neural computation* 18, No. 7 (2006): 1527-1554.

Hobson, Arthur (1971). Concepts in statistical mechanics. New York: Gordon and Breach. ISBN 0677032404.

Hong, Z.; Shann, A.; Su, S.; Chang, Y.; Fu, T.; and Lee, C. 2018. Diversity-driven exploration strategy for deep reinforcement learning. In *Proceedings of the 32nd Conference on Neural Information Processing Systems*.

Hsu, William H., Scott J. Harmon, Edwin Rodriguez, and Christopher Zhong. "Empirical comparison of incremental reuse strategies in genetic programming for keep-away soccer." In *Late Breaking*

(56) References Cited

OTHER PUBLICATIONS

*Papers at the 2004 Genetic and Evolutionary Computation Conference, Seattle, Washington, USA*, vol. 26. 2004.

Hsu, William H., Scott J. Harmon, Edwin Rodríguez, and Christopher A. Zhong. "Empirical Comparison of Incremental Learning Strategies for Genetic Programming-Based Keep-Away Soccer Agents." In *Proceedings of the AAAI Fall Symposium on Learning Multi-Agent Systems*. 2004.

Huang, Chen, Simon Lucey, and Deva Ramanan. "Learning policies for adaptive tracking with deep feature cascades." arXiv preprint arXiv:1708.02973 (2017).

Hwangbo, Jemin, Inkyu Sa, Roland Siegwart, and Marco Hutter. "Control of a quadrotor with reinforcement learning." *IEEE Robotics and Automation Letters* 2, No. 4 (2017): 2096-2103.

Ipek, Engin, Onur Mutlu, José F. Martínez, and Rich Caruana. "Self-optimizing memory controllers: A reinforcement learning approach." In *Computer Architecture, 2008. ISCA'08. 35th International Symposium on*, pp. 39-50. IEEE, 2008.

Jaakkola, Tommi, Satinder P. Singh, and Michael I. Jordan. "Reinforcement learning algorithm for partially observable Markov decision problems." In *Advances in neural information processing systems*, pp. 345-352. 1995.

Janarthanam, Srinivasan, and Oliver Lemon. "A two-tier user simulation model for reinforcement learning of adaptive referring expression generation policies." In *Proceedings of the SIGDIAL 2009 Conference: The 10th Annual Meeting of the Special Interest Group on Discourse and Dialogue*, pp. 120-123. Association for Computational Linguistics, 2009.

Jaynes, E. T. (1957). "Information theory and statistical mechanics" (PDF). Physical Review. 106: 620-630. Bibcode:1957PhRv..106..620J. doi:10.1103/physrev.106.620.

Jaynes, E. T. (1957). "Information theory and statistical mechanics II" (PDF). Physical Review. 108: 171-190. Bibcode:1957PhRv..108..171J. doi:10.1103/physrev.108.171.

Jeffreys, H. (1946). "An invariant form for the prior probability in estimation problems". Proceedings of the Royal Society of London, Series A. 186: 453-461. Bibcode:1946RSPSA.1 86..453J. doi:10.1098/rspa.1946.0056. JSTOR 97883.

Jiang, He, Huaguang Zhang, Yang Liu, and Ji Han. "Neural-network-based control scheme for a class of nonlinear systems with actuator faults via data-driven reinforcement learning method." *Neurocomputing* 239 (2017): 1-8.

Jiang, N., and Li, L. 2016. Doubly robust off-policy value evaluation for reinforcement learning. In Proceedings of the 33rd International Conference on Machine Learning, 652-661.

Jilk, David J., Seth J. Herd, Stephen J. Read, and Randall C. O'Reilly. "Anthropomorphic reasoning about neuromorphic AGI safety." *Journal of Experimental & Theoretical Artificial Intelligence* 29, No. 6 (2017): 1337-1351.

Jouffe, Lionel. "Fuzzy inference system learning by reinforcement methods." *IEEE Transactions on Systems, Man, and Cybernetics, Part C (Applications and Reviews)* 28, No. 3 (1998): 338-355.

Kaelbling, Leslie Pack, Michael L. Littman, and Andrew W. Moore. "Reinforcement learning: A survey." *Journal of artificial intelligence research* 4 (1996): 237-285.

Kaelbling, Leslie Pack, Michael L. Littman, and Anthony R. Cassandra. "Planning and acting in partially observable stochastic domains." *Artificial intelligence* 101, No. 1 (1998): 99-134.

Kahn, Gregory, Tianhao Zhang, Sergey Levine, and Pieter Abbeel. "Plato: Policy learning using adaptive trajectory optimization." In *Robotics and Automation (ICRA), 2017 IEEE International Conference on*, pp. 3342-3349. IEEE, 2017.

Kakade, Sham M. "A natural policy gradient." In *Advances in neural information processing systems*, pp. 1531-1538. 2002.

Kakade, Sham Machandranath. "On the sample complexity of reinforcement learning." PhD diss., University of London, 2003.

Kakade, Sham, and John Langford. "Approximately optimal approximate reinforcement learning." In *ICML*, vol. 2, pp. 267-274. 2002.

Kearns, Michael, and Satinder Singh. "Near-optimal reinforcement learning in polynomial time." *Machine Learning* 49, No. 2-3 (2002): 209-232.

Kimura, Hajime, Kazuteru Miyazaki, and Shigenobu Kobayashi. "Reinforcement learning in POMDPs with function approximation." In *ICML*, vol. 97, pp. 152-160. 1997.

Kingma, D. P., and Welling, M. 2014. Auto-encoding variational bayes. In *International Conference on Learning Representations*.

Kiumarsi, Bahare, Frank L. Lewis, and Zhong-Ping Jiang. "$H\infty$ control of linear discrete-time systems: Off-policy reinforcement learning." *Automatica* 78 (2017): 144-152.

Kober, Jens, and Jan R. Peters. "Policy search for motor primitives in robotics." In *Advances in neural information processing systems*, pp. 849-856. 2009.

Kober, Jens, Andreas Wilhelm, Erhan Oztop, and Jan Peters. "Reinforcement learning to adjust parametrized motor primitives to new situations." *Autonomous Robots* 33, No. 4 (2012): 361 -379.

Kober, Jens, Erhan Öztop, and Jan Peters. "Reinforcement learning to adjust robot movements to new situations." In *IJCAI Proceedings—International Joint Conference on Artificial Intelligence*, vol. 22, No. 3, p. 2650. 2011.

Kober, Jens, J. Andrew Bagnell, and Jan Peters. "Reinforcement learning in robotics: A survey." The *International Journal of Robotics Research* 32, No. 11 (2013): 1238-1274.

Kohl, Nate, and Peter Stone. "Policy gradient reinforcement learning for fast quadrupedal locomotion." In *Robotics and Automation, 2004. Proceedings. ICRA'04. 2004 IEEE International Conference on*, vol. 3, pp. 2619-2624. IEEE, 2004.

Konidaris, G.; Osentoski, S.; and Thomas, P. S. 2011. Value function approximation in reinforcement learning using the fourier basis. In AAAI, vol. 6, 7.

Konidaris, George, and Andrew G. Barto. "Building Portable Options: Skill Transfer in Reinforcement Learning." In *IJCAI*, vol. 7, pp. 895-900. 2007.

Kormushev, Petar, Sylvain Calinon, and Darwin G. Caldwell. "Robot motor skill coordination with EM-based reinforcement learning." In *Intelligent Robots and Systems (IROS), 2010 IEEE/RSJ International Conference on*, pp. 3232-3237. IEEE, 2010.

Kullback, S. (1959), Information Theory and Statistics, John Wiley & Sons. Republished by Dover Publications in 1968; reprinted in 1978: ISBN 0-8446-5625-9.

Kullback, S. (1987). "Letter to the Editor: The Kullback-Leibler distance". The American Statistician. 41 (4): 340-341. doi:10.1080/00031305.1987.10475510.JSTOR 2684769.

Kullback, S.; Leibler, R.A. (1951). "On information and sufficiency". Annals of Mathematical Statistics. 22 (1): 79-86. doi:10.1214/aoms/1177729694. MR 0039968.

Kwok, Cody, and Dieter Fox. "Reinforcement learning for sensing strategies." In *Intelligent Robots and Systems, 2004. (IROS 2004). Proceedings. 2004 IEEE/RSJ International Conference on*, vol. 4, pp. 3158-3163. IEEE, 2004.

Lagoudakis, Michail G., and Ronald Parr. "Least-squares policy iteration." *Journal of machine learning research* 4, No. Dec. 2003: 1107-1149.

Lagoudakis, Michail G., and Ronald Parr. "Reinforcement learning as classification: Leveraging modern classifiers." In *Proceedings of the 20th International Conference on Machine Learning (ICML-03)*, pp. 424-431. 2003.

Lagoudakis, Michail, Ronald Parr, and Michael Littman. "Least-squares methods in reinforcement learning for control." *Methods and Applications of Artificial Intelligence* (2002): 752-752.

Lanctot, Marc, Vinicius Zambaldi, Audrunas Gruslys, Angeliki Lazaridou, Julien Perolat, David Silver, and Thore Graepel. "A unified game-theoretic approach to multiagent reinforcement learning." In *Advances in Neural Information Processing Systems*, pp. 4193-4206. 2017.

Lee, J.; Jang, Y.; Poupart, P.; and Kim, K. 2017. Constrained Bayesian reinforcement learning via approximate linear programming. In Proceedings of the 26th International Joint Conference on Artifical Intelligence, 2088-2095.

Lee, Jae Young, and Richard S. Sutton. "Integral Policy Iterations for Reinforcement Learning Problems in Continuous Time and Space." arXiv preprint arXiv: 1705.03520 (2017).

(56) References Cited

OTHER PUBLICATIONS

Lehnert, Lucas, Stefanie Tellex, and Michael L. Littman. "Advantages and Limitations of using Successor Features for Transfer in Reinforcement Learning." arXiv preprint arXiv: 1708.00102 (2017).
Levine, Sergey, and Pieter Abbeel. "Learning neural network policies with guided policy search under unknown dynamics." In *Advances in Neural Information Processing Systems*, pp. 1071-1079. 2014.
Levine, Sergey, Chelsea Finn, Trevor Darrell, and Pieter Abbeel. "End-to-end training of deep visuomotor policies." *Journal of Machine Learning Research* 17, No. 39 (2016): 1-40.
Lewis, Frank L., and Kyriakos G. Vamvoudakis. "Reinforcement learning for partially observable dynamic processes: Adaptive dynamic programming using measured output data." *IEEE Transactions on Systems, Man, and Cybernetics, Part B (Cybernetics)* 41, No. 1 (2011): 14-25.
Lewis, Frank L., Draguna Vrabie, and Kyriakos G. Vamvoudakis. "Reinforcement learning and feedback control: Using natural decision methods to design optimal adaptive controllers." *IEEE Control Systems* 32, No. 6 (2012): 76-105.
Li, Hongliang, Derong Liu, and Ding Wang. "Manifold Regularized Reinforcement Learning." *IEEE Transactions on Neural Networks and Learning Systems* (2017).
Lin, Long-H. "Self-improving reactive agents based on reinforcement learning, planning and teaching." *Machine learnings* 8, No. 3/4 (1992): 69-97.
Lin, Long-Ji. *Reinforcement learning for robots using neural networks*. No. CMU-CS-93-103. Carnegie-Mellon Univ Pittsburgh PA School of Computer Science, 1993.
Littman, Michael L., Thomas L. Dean, and Leslie Pack Kaelbling. "On the complexity of solving Markov decision problems." In *Proceedings of the Eleventh conference on Uncertainty in artificial intelligence*, pp. 394-402. Morgan Kaufmann Publishers Inc., 1995.
Littman, Michael, and Justin Boyan. "A distributed reinforcement learning scheme for network routing." In *Proceedings of the international workshop on applications of neural networks to telecommunications*, pp. 45-51. Psychology Press, 1993.
Liu, H.; Feng, Y.; Mao, Y.; Zhou, D.; Peng, J.; and Liu, Q. 2018. Action-dependent control variates for policy optimization via stein's identity. In *International Conference on Learning Representations*.
Liu, Yan, Alexandru Niculescu-Mizil, and Wojciech Gryc. "Topic-link LDA: joint models of topic and author community." In *proceedings of the 26th annual international conference on machine learning*, pp. 665-672. ACM, 2009.
Machado, Marlos C., Marc G. Bellemare, and Michael Bowling. "A Laplacian Framework for Option Discovery in Reinforcement Learning." arXiv preprint arXiv:1703.00956(2017).
MacKay, David J.C. (2003). Information Theory, Inference, and Learning Algorithms (First ed.). Cambridge University Press, p. 34.
Maei, Hamid; Szepesvári, Csaba; Bhatnagar, Shalabh; and Sutton, Richard. Toward off-policy learning control with function approximation. In proceedings of the 27th International Conference on Machine Learning, pp. 719-726, 2010.
Mahadevan, Sridhar, Nicholas Marchalleck, Tapas K. Das, and Abhijit Gosavi. "Self-improving factory simulation using continuous-time average-reward Reinforcement learning." *In Machine Learning-International Workshop Then Conference-*, pp. 202-210. Morgan Kaufmann Publishers, Inc., 1997.
Mahadevan, Sridhar. "Average reward reinforcement learning: Foundations, algorithms, and empirical results." *Machine learning* 22, No. 1 (1996): 159-195.
Martino, L.; Elvira, V.; Luengo, D.; Corander, J. (Aug. 1, 2015). "An Adaptive Population Importance Sampler: Learning From Uncertainty". IEEE Transactions on Signal Processing. 63 (16): 4422-4437. doi:10.1109/TSP.2015.2440215. ISSN 1053-587X.
Martino, L.; Elvira, V.; Luengo, D.; Corander, J. (May 1, 2017). "Layered adaptive importance sampling". Statistics and Computing. 27 (3): 599-623. doi:10.1007/s11222-016-9642-5. ISSN 0960-3174.

Martino, Luca; Elvira, Victor; Louzada, Francisco. "Effective sample size for importance sampling based on discrepancy measures". Signal Processing. 131: 386-401. doi: 10.1016/j.sigpro.2016.08.025.
McCallum, Thomas Edward Reid. "Understanding how Knowledge is exploited in Ant Algorithms." (2005).
McGovern, Amy, and Andrew G. Barto. "Automatic discovery of subgoals in reinforcement learning using diverse density." *Computer Science Department Faculty Publication Series* (2001): 8.
Melo, Francisco S. "Convergence of Q-learning: A simple proof." Institute of Systems and Robotics, Tech. Rep (2001): 1-4.
Menache, Ishai, Shie Mannor, and Nahum Shimkin. "Basis function adaptation in temporal difference reinforcement learning." *Annals of Operations Research* 134, No. 1 (2005): 215-238.
Menache, Ishai, Shie Mannor, and Nahum Shimkin. "Q-cut-dynamic discovery of sub-goals in reinforcement learning." In *ECML*, vol. 14, pp. 295-306. 2002.
Merrick, Kathryn E., Kamran Shafi, and Amitay Isaacs. "Using Approach-Avoidance Motivation to Model Adaptive Social-Forces in Artificial Agents." In *and Learning Agents Workshop 2011*, p. 83. 2011.
Mirjalili, Seyedali, Seyed Mohammad Mirjalili, and Andrew Lewis. "Let a biogeography-based optimizer train your multi-layer perceptron." *Information Sciences* 269 (2014): 188-209.
Mnih, Andriy, and Karol Gregor. "Neural variational inference and learning in belief networks." arXiv preprint arXiv:1402.0030 (2014).
Mnih, Volodymyr, Adria Puigdomenech Badia, Mehdi Mirza, Alex Graves, Timothy Lillicrap, Tim Harley, David Silver, and Koray Kavukcuoglu. "Asynchronous methods for deep reinforcement learning." In *International Conference on Machine Learning*, pp. 1928-1937. 2016.
Mnih, Volodymyr, Koray Kavukcuoglu, David Silver, Alex Graves, Ioannis Antonoglou, Daan Wierstra, and Martin Riedmiller. "Playing Atari with deep reinforcement learning." arXiv preprint arXiv:1312.5602 (2013).
Mnih, Volodymyr, Koray Kavukcuoglu, David Silver, Andrei A. Rusu, Joel Veness, Marc G. Bellemare, Alex Graves et al. "Human-level control through deep reinforcement learning." *Nature* 518, No. 7540 (2015): 529-533.
Moldovan, T. M., and Abbeel, P. 2012. Safe exploration in markov decision processes. In Proceedings of the 29th International Conference on Machine Learning, 1451-1458.
Montgomery, William, Anurag Ajay, Chelsea Finn, Pieter Abbeel, and Sergey Levine. "Reset-free guided policy search: efficient deep reinforcement learning with stochastic initial states." In *Robotics and Automation (ICRA), 2017 IEEE International Conference on*, pp. 3373-3380. IEEE, 2017.
Novak S.Y. (2011), Extreme Value Methods with Applications to Finance ch. 14.5 (Chapman & Hall). ISBN 978-1-4398-3574-6.
Okdinawati, Liane, Togar M. Simatupang, and Yos Sunitiyoso. "Multi-agent Reinforcement Learning for Collaborative Transportation Management (CTM)." In *Agent-Based Approaches in Economics and Social Complex Systems IX*, pp. 123-136. Springer, Singapore, 2017.
Osband, I.; Blundell, C.; Pritzel, A.; and Van Roy, B. 2016. Deep exploration via bootstrapped DQN. In Proceedings of the 30th Conference on Neural Information Processing Systems, 4026-4034.
Owen, Art; Associate, Yi Zhou (Mar. 1, 2000). "Safe and Effective Importance Sampling". Journal of the American Statistical Association. 95 (449): 135-143. doi:10.1080/01621459.2000.10473909. ISSN 0162-1459.
Parr, Ronald, Lihong Li, Gavin Taylor, Christopher Painter-Wakefield, and Michael L. Littman. "An analysis of linear models, linear value-function approximation, and feature selection for reinforcement learning." In *Proceedings of the 25th international conference on Machine learning*, pp. 752-759. ACM, 2008.
Peng, Xue Bin, Glen Berseth, KangKang Yin, and Michiel Van De Panne. "Deeploco: Dynamic locomotion skills using hierarchical deep reinforcement learning." *ACM Transactions on Graphics (TOG)* 36, No. 4 (2017): 41.
Perez, Diego, Edward J. Powley, Daniel Whitehouse, Philipp Rohlfshagen, Spyridon Samothrakis, Peter I. Cowling, and Simon M. Lucas. "Solving the Physical traveling salesman problem: Tree

(56) References Cited

OTHER PUBLICATIONS search and macro actions." *IEEE Transactions on Computational Intelligence and AI in Games* 6, No. 1 (2014): 31-45.
Perez, Diego. "Adaptive Controllers for Real-Time Games." Ph. D. Thesis, University of Essex (2015).
Peters, Jan, and Stefan Schaal. "Natural actor-critic." *Neurocomputing* 71, No. 7 (2008): 1180-1190.
Peters, Jan, and Stefan Schaal. "Reinforcement learning of motor skills with policy gradients." *Neural networks* 21, No. 4 (2008): 682-697.
Peters, Jan, Katharina Mülling, and Yasemin Altun. "Relative Entropy Policy Search." In *AAAI*, pp. 1607-1612. 2010.
Peters, Jan, Sethu Vijayakumar, and Stefan Schaal. "Natural actor-critic." In *European Conference on Machine Learning*, pp. 280-291. Springer, Berlin, Heidelberg, 2005.
Peters, Jan, Sethu Vijayakumar, and Stefan Schaal. "Reinforcement learning for humanoid robotics." In *Proceedings of the third IEEE-RAS international conference on humanoid robots*, pp. 1-20. 2003.
Petrik, M.; Ghavamzadeh, M.; and Chow, Y. 2016. Safe policy improvement by minimizing robust baseline regret. In Proceedings of the 30th Conference on Neural Information Processing Systems, 2298-2306.
Pirotta, M.; Restelli, M.; Pecorino, A.; and Calandriello, D. 2013. Safe policy iteration. In Proceedings of the 30th International Conference on Machine Learning, 307-315.
Plappert, M.; Houthooft, R.; Dhariwal, P.; Sidor, S.; Chen, R.; Chen, X.; Asfour, T.; Abbeel, P.; and Andrychowicz, M. 2018. Parameter space noise for exploration. In *International Conference on Learning Representations*.
Precup, D.; Sutton, R. S.; and Singh, S. 2000. Eligibility traces for off-policy policy evaluation. Proceedings of the 17th International Conference on Machine Learning 759-766.
Precup, Doina, Richard S. Sutton, and Satinder Singh. "Theoretical results on reinforcement learning with temporally abstract options." In *European conference on machine learning*, pp. 382-393. Springer, Berlin, Heidelberg, 1998.
Press, W.H.; Teukolsky, S.A.; Vetterling, W.T.; Flannery, B.P. (2007). "Section 14.7.2. Kullback-Leibler Distance". Numerical Recipes: The Art of Scientific Computing (3rd ed.). Cambridge University Press. ISBN 978-0-521-88068-8.
Puterman, M. L. 2009. Markov decision processes: discrete stochastic dynamic programming, vol. 414. WileyInterscience.
Ramachandran, Deepak, and Eyal Amir. "Bayesian inverse reinforcement learning." *Urbana* 51, No. 61801 (2007): 1-4.
Rasmussen, Carl Edward, and Malte Kuss. "Gaussian Processes in Reinforcement Learning." In *NIPS*, vol. 4, p. 1. 2003.
Rawlik, Konrad, Marc Toussaint, and Sethu Vijayakumar. "On stochastic optimal control and reinforcement learning by approximate inference." In *Robotics: science and systems*. 2012.
Rennie, Jason, and Andrew McCallum. "Using reinforcement learning to spider the web efficiently." In *ICML*, vol. 99, pp. 335-343. 1999.
Rényi A. (1970). Probability Theory. Elsevier. Appendix, Sec.4. ISBN 0-486-45867-9.
Rényi, A. (1961), "On measures of entropy and information" (PDF), Proceedings of the 4th Berkeley Symposium on Mathematics, Statistics and Probability 1960, pp. 547-561.
Riedmiller, Martin, Thomas Gabel, Roland Hafner, and Sascha Lange. "Reinforcement learning for robot soccer." *Autonomous Robots* 27, No. 1 (2009): 55-73.
Rosen-Zvi, Michal, Thomas Griffiths, Mark Steyvers, and Padhraic Smyth. "The author-topic model for authors and documents." In *Proceedings of the 20th conference on Uncertainty in artificial intelligence*, pp. 487-494. AUAI Press, 2004.
Roy, Nicholas, and Geoffrey J. Gordon. "Exponential family PCA for belief compression in POMDPs." In *Advances in Neural Information Processing Systems*, pp. 1667-1674. 2003.
Rubinstein, R. Y., & Kroese, D. P. (2011). Simulation and the Monte Carlo method (vol. 707). John Wiley & Sons.
Rubner, Y.; Tomasi, C.; Guibas, L. J. (2000). "The earth mover's distance as a metric for image retrieval". International Journal of Computer Vision. 40 (2): 99-121.
Russell, Stuart J.; Peter Norvig (2010). Artificial Intelligence: A Modern Approach (Third ed.). Prentice Hall. p. 649. ISBN 978-0136042594.
Salimans, T.; Ho, J.; Chen, X.; and Sutskever, I. 2017. Evolution strategies as a scalable alternative to reinforcement learning. In arXiv preprint arXiv:1703.03864.
Sanov, I.N. (1957). "On the probability of large deviations of random magnitudes". Matem. Sbornik. 42 (84): 11-44.
Schulman, John, Sergey Levine, Pieter Abbeel, Michael Jordan, and Philipp Moritz. "Trust region policy optimization." In *Proceedings of the 32nd International Conference on Machine Learning (ICML-15)*, pp. 1889-1897. 2015.
Schwartz, Anton. "A reinforcement learning method for maximizing undiscounted rewards." In *Proceedings of the tenth international conference on machine learning*, vol. 298, pp. 298-305. 1993.
Sehnke, F.; Osendorfer, C.; Rckstie, T.; Peters, J.; and Schmidhuber, J. 2010. Parameter-exploring policy gradients. In *Neural Networks*, vol. 23, 551-559.
Settles, Burr. "Active learning." Synthesis Lectures on Artificial Intelligence and Machine Learning 6, No. 1 (2012): 1-114.
Severinghaus, Robert, Murali Tummala, and John McEachen. "Networks for maintaining system-level availability for an exploring robot." *IEEE Systems Journal* 9, No. 1 (2015): 98-106.
Shteingart, H; Neiman, T; Loewenstein, Y (May 2013). "The Role of First Impression in Operant Learning", J Exp Psychol Gen. 142 (2): 476-88. doi:10.1037/a0029550. PMID 22924882.
Sigaud, Olivier, and Olivier Buffet, eds. *Markov decision processes in artificial intelligence*. John Wiley & Sons, 2013.
Smart, William D., and L. Pack Kaelbling. "Effective reinforcement learning for mobile robots." In *Robotics and Automation, 2002. Proceedings. ICRA '02. IEEE International Conference on*, vol. 4, pp. 3404-3410. IEEE, 2002.
Song, Ruizhuo, Frank L. Lewis, and Qinglai Wei. "Off-Policy Integral Reinforcement Learning Method to Solve Nonlinear Continuous-Time Multiplayer Nonzero-Sum Games." *IEEE transactions on neural networks and learning systems* 28, No. 3 (2017): 704-713.
Stone, Peter, and Manuela Veloso. "Team-partitioned, opaque-transition reinforcement learning." In *Proceedings of the third annual conference on Autonomous Agents*, pp. 206-212. ACM, 1999.
Stone, Peter, Richard S. Sutton, and Gregory Kuhlmann. "Reinforcement learning for robocup soccer keepaway." *Adaptive Behavior* 13, No. 3 (2005): 165-188.
Strehl, Alexander L.; Li, Lihong; Wiewiora, Eric; Langford, John; and Littman, Michael L. Pac model-free reinforcement learning. In Proc. 22nd ICML 2006, pp. 881-888, 2006.
Stulp, Freek, and Olivier Sigaud. "Path integral policy improvement with covariance matrix adaptation." arXiv preprint arXiv:1206.4621 (2012).
Such, Felipe Petroski, Vashisht Madhavan, Edoardo Conti, Joel Lehman, Kenneth O. Stanley, and Jeff Clune. "Deep Neuroevolution: Genetic Algorithms Are a Competitive Alternative for Training Deep Neural Networks for Reinforcement Learning." arXiv preprint arXiv:1712.06567(2017).
Sugiyama, Masashi, Matthias Krauledat, and Klaus-Robert Müller. "Covariate shift adaptation by importance weighted cross validation." *Journal of Machine Learning Research* 8, No. May 2007: 985-1005.
Sugiyama, Masashi, Shinichi Nakajima, Hisashi Kashima, Paul V. Buenau, and Motoaki Kawanabe. "Direct importance estimation with model selection and its application to covariate shift adaptation." In *Advances in neural information processing systems*, pp. 1433-1440. 2008.
Sun, Ruoying, Gang Zhao, Chen Li, and Shoji Tatsumi. "Comparison of Different ACS Methods and Analysis about Efficiency of Novel ACS Approaches." In *IEEE Industrial Electronics, IECON 2006—32nd Annual Conference on*, pp. 3627-3632. IEEE, 2006.
Sun, Ruoying, Shoji Tatsumi, and Gang Zhao. "Multiagent cooperating learning methods by indirect media communication." *IEICE*

(56) References Cited

OTHER PUBLICATIONS transactions on fundamentals of electronics, communications and computer sciences 86, No. 11 (2003): 2868-2878.

Sutton, R. S., and Barto, A. G. 1998. *Reinforcement Learning: An Introduction*. The MIT Press. 1998.

Sutton, Richard S. "Generalization in reinforcement learning: Successful examples using sparse coarse coding." In *Advances in neural information processing systems*, pp. 1038-1044. 1996.

Sutton, Richard S., David A. McAllester, Satinder P. Singh, and Yishay Mansour. "Policy gradient methods for reinforcement learning with function approximation." In *Advances in neural information processing systems*, pp. 1057-1063. 2000.

Sutton, Richard S., Doina Precup, and Satinder Singh. "Between MDPs and semi-MDPs: A framework for temporal abstraction in reinforcement learning." *Artificial intelligence* 112, No. 1-2 (1999): 181-211.

Sutton, Richard Stuart. "Temporal credit assignment in reinforcement learning." (1984).

Szepesvári, Csaba. "Algorithms for reinforcement learning." *Synthesis lectures on artificial intelligence and machine learning* 4, No. 1 (2010): 1-103.

Tan, Ming. "Multi-agent reinforcement learning: Independent vs. cooperative agents." In *Proceedings of the tenth international conference on machine learning*, pp. 330-337. 1993.

Tang, Haoran, Rein Houthooft, Davis Foote, Adam Stooke, OpenAI Xi Chen, Yan Duan, John Schulman, Filip DeTurck, and Pieter Abbeel. "# Exploration: A Study of Count-Based Exploration for Deep Reinforcement Learning." In *Advances in Neural Information Processing Systems*, pp. 2750-2759. 2017.

Tani, Jun, and Jun Yamamoto. "On the dynamics of robot exploration learning." *Cognitive Systems Research* 3, No. 3 (2002): 459-470.

Tani, Jun, and Yuya Sugita. "On the Dynamics of Robot Exploration." In Advances in Artificial Life: 5th European Conference, European Conference on Artificial Life, Lausanne, Switzerland, Sep. 13-17, 1999 Proceedings, p. 279. Springer Science & Business Media, Berlin, Heidelberg.

Tani, Jun. "Self-Organization of Behavioral Contexts in Dynamic Exploration and Learning of Robots." (1999).

Taylor, Matthew E., and Peter Stone. "Transfer learning for reinforcement learning domains: A survey." *Journal of Machine Learning Research* 10, No. Jul. 2009: 1633-1685.

Teh, Yee, Victor Bapst, Wojciech M. Czarnecki, John Quan, James Kirkpatrick, Raia Hadsell, Nicolas Heess, and Razvan Pascanu. "Distral: Robust multitask reinforcement learning." In *Advances in Neural Information Processing Systems*, pp. 4499-4509. 2017.

Tesauro, Gerald (Mar. 1995). "Temporal Difference Learning and TD-Gammon". Communications of the ACM. 38 (3). doi:10.1145/203330.203343.

Tesauro, Gerald, and Gregory R. Galperin. "On-line policy improvement using Monte-Carlo search." In *Advances in Neural Information Processing Systems*, pp. 1068-1074. 1997.

Tesauro, Gerald, Nicholas K. Jong, Rajarshi Das, and Mohamed N. Bennani. "A hybrid reinforcement learning approach to autonomic resource allocation." In *Autonomic Computing, 2006. ICAC'06. IEEE International Conference on*, pp. 65-73. IEEE, 2006.

Tesauro, Gerald, Nicholas K. Jong, Rajarshi Das, and Mohamed N. Bennani. "On the use of hybrid reinforcement learning for autonomic resource allocation." *Cluster Computing* 10, No. 3 (2007): 287-299.

Tesauro, Gerald. "Reinforcement learning in autonomic computing: A manifesto and case studies." *IEEE Internet Computing* 11, No. 1 (2007).

Theodorou, Evangelos, Jonas Buchli, and Stefan Schaal. "A generalized path integral control approach to reinforcement learning." *Journal of Machine Learning Research* 11, No. Nov. 2010: 3137-3181.

Theodorou, Evangelos, Jonas Buchli, and Stefan Schaal. "Learning policy improvements with path integrals." In *Proceedings of the Thirteenth International Conference on Artificial Intelligence and Statistics*, pp. 828-835. 2010.

Theodorou, Evangelos, Jonas Buchli, and Stefan Schaal. "Reinforcement learning of motor skills in high dimensions: A path integral approach." In *Robotics and Automation (ICRA), 2010 IEEE International Conference on*, pp. 2397-2403. IEEE, 2010.

Thomas, P., and Brunskill, E. 2016. Data-efficient off-policy policy evaluation for reinforcement learning. In Proceedings of the Thirty-Third International Conference on Machine Learning, 2139-2148.

Thomas, P.; Theocharous, G.; and Ghavamzadeh, M. 2015a. High confidence off-policy evaluation. In Proceedings of the Twenty-Ninth Conference on Artificial Intelligence, 3000-3006.

Thomas, P.; Theocharous, G.; and Ghavamzadeh, M. 2015b. High confidence policy improvement. In Proceedings of the Thirty-Second International Conference on Machine Learning, 2380-2388.

Thrun, Sebastian. "Monte carlo pomdps." In *Advances in neural information processing systems*, pp. 1064-1070. 2000.

Todorov, E.; Erez, T.; and Tassa, Y. 2012. Mujoco: A physics engine for model-based control. In *Intelligent Robots and Systems (IROS), 2012 IEEE/RSJ International Conference on*, 5026-5033. IEEE.

Todorov, Emanuel. "Efficient computation of optimal actions." *Proceedings of the national academy of sciences* 106, No. 28 (2009): 11478-11483.

Todorov, Emanuel. "Linearly-solvable Markov decision problems." In *Advances in neural information processing systems*, pp. 1369-1376. 2007.

Tribus, M.; McIrvine, E. C. (1971). "Energy and information". Scientific American. 224: 179-186. doi:10.1038/scientificamerican0971-179.

Tribus, Myron, (1961), Thermodynamics and Thermostatics (D. Van Nostrand, New York).

Turchetta, M.; Berkenkamp, F.; and Krause, A. 2016. Safe exploration in finite markov decision processes with gaussian processes. In Proceedings of 30th Conference on Neural Information Processing Systems, 4312-4320.

van Hasselt, Hado (2011). "Double Q-learning" (PDF). Advances in Neural Information Processing Systems. 23: 2613-2622.

van Hasselt, Hado. Reinforcement Learning in Continuous State and Action Spaces. In: Reinforcement Learning: State of the Art, Springer, pp. 207-251, 2012.

van Hasselt, Hado; Guez, Arthur; Silver, David (2015). "Deep reinforcement learning with double Q-learning". AAAI Conference on Artificial Intelligence: 2094-2100.

Veach, Eric; Guibas, Leonidas J. (Jan. 1, 1995). "Optimally Combining Sampling Techniques for Monte Carlo Rendering". Proceedings of the 22Nd Annual Conference on Computer Graphics and Interactive Techniques. SIGGRAPH '95. New York, NY, USA: ACM: 419-428. doi:10.1145/218380.218498. ISBN 0-89791-701-4.

Vengerov, David. "A reinforcement learning approach to dynamic resource allocation." *Engineering Applications of Artificial Intelligence* 20, No. 3 (2007): 383-390.

Verdú, Sergio "differential entropy—4", Relative Entropy video lecture, NIPS 2009.

Vezhnevets, Alexander Sasha, Simon Osindero, Tom Schaul, Nicolas Heess, Max Jaderberg, David Silver, and Koray Kavukcuoglu. "Feudal networks for hierarchical reinforcement learning." arXiv preprint arXiv:1703.01161 (2017).

Vincent, François-Lavet; Fonteneau, Raphael; Ernst, Damien. "How to Discount Deep Reinforcement Learning: Towards New Dynamic Strategies". NIPS, Deep RL workshop 2015.

Wang, Y.; Agarwal, A.; and Dudik, M. 2017. Optimal and adaptive off-policy evaluation in contextual bandits. In Proceedings of the Thirty-Fourth International Conference on Machine Learning, 3589-3597.

Wang, Ziyu, Tom Schaul, Matteo Hessel, Hado Van Hasselt, Marc Lanctot, and Nando De Freitas. "Dueling network architectures for deep reinforcement learning." arXiv preprint arXiv:1511.06581 (2015).

Watkins, C.J.C.H., (1989), Learning from Delayed Rewards. Ph.D. thesis, Cambridge University.

(56) References Cited

OTHER PUBLICATIONS

Wiering, Marco A. "Explorations in efficient reinforcement learning." PhD diss., University of Amsterdam, 1999.
Wierstra, D.; Schaul, T.; Glasmachers, T.; Sun, Y.; Peters, J.; and Schmidhuber, J. 2014. Natural evolution strategies. In *Journal of Machine Learning Research*, 949-980.
Wright, S., and Nocedal, J., eds. 1999. *Numerical Optimization*. New York, New York: Springer.
Wu, Y.; Mansimov, E.; Grosse, R.; Liao, S.; and Ba, J. 2017. Scalable trust-region method for deep reinforcement learning using kronecker-factored approximation. In *Advances in Neural Information Processing Systems 30*, 5285-5294.
Wu, Yuhuai, Elman Mansimov, Roger B. Grosse, Shun Liao, and Jimmy Ba. "Scalable trust-region method for deep reinforcement learning using Kronecker-factored approximation." In *Advances in Neural Information Processing Systems*, pp. 5285-5294. 2017.
Xie, Junfei, Yan Wan, Kevin Mills, James J. Filliben, and Frank L. Lewis. "A Scalable Sampling Method to High-dimensional Uncertainties for Optimal and Reinforcement Learning-based Controls." *IEEE Control Systems Letters* (2017).
Xu, Xin, Dewen Hu, and Xicheng Lu. "Kernel-based least squares policy iteration for reinforcement learning." *IEEE Transactions on Neural Networks* 18, No. 4 (2007): 973-992.
Xu, Xin, Zhenhua Huang, Lei Zuo, and Haibo He. "Manifold-based reinforcement learning via locally linear reconstruction." *IEEE transactions on neural networks and learning systems* 28, No. 4 (2017): 934-947.
Yahya, Ali, Adrian Li, Mrinal Kalakrishnan, Yevgen Chebotar, and Sergey Levine. "Collective robot reinforcement learning with distributed asynchronous guided policy search." In *Intelligent Robots and Systems (IROS), 2017 IEEE/RSJ International Conference on*, pp. 79-86. IEEE, 2017.
Zhang, Huaguang, He Jiang, Yanhong Luo, and Geyang Xiao. "Data-driven optimal consensus control for discrete-time multi-agent systems with unknown dynamics using reinforcement learning method." *IEEE Transactions on Industrial Electronics* 64, No. 5 (2017): 4091-4100.
Zhang, Tianhao, Gregory Kahn, Sergey Levine, and Pieter Abbeel. "Learning deep control policies for autonomous aerial vehicles with mpc-guided policy search." In *Robotics and Automation (ICRA), 2016 IEEE International Conference on*, pp. 528-535. IEEE, 2016.
Zhang, Wei, and Thomas G. Dietterich. "A reinforcement learning approach to job-shop scheduling." In *IJCAI*, vol. 95, pp. 1114-1120. 1995.
Zhao, Gang, and Ruoying Sun. "Analysis about Efficiency of Indirect Media Communication on Multi-agent Cooperation Learning." In *Systems, Man and Cybernetics, 2006. SMC'06. IEEE International Conference on*, vol. 5, pp. 4180-4185. IEEE, 2006.
Zhu, Pengfei, Xin Li, and Pascal Poupart. "On Improving Deep Reinforcement Learning for POMDPs." arXiv preprint arXiv:1704.07978 (2017).

\* cited by examiner

FRAMEWORK AND METHODS OF DIVERSE EXPLORATION FOR FAST AND SAFE POLICY IMPROVEMENT

CROSS REFERENCE TO RELATED APPLICATIONS

The present application claims benefit of priority under 35 U.S.C. § 119(e) from U.S. Provisional Patent Application No. 62/621,856, filed Jan. 25, 2018, the entirety of which is expressly incorporated herein by reference.

FIELD OF THE INVENTION

The present invention relates to the field of autonomous agents, and more particularly to optimization of policies for implementation by agents.

BACKGROUND OF THE INVENTION

Recent advances in autonomy technology have promoted the widespread emergence of autonomous agents in various domains such as autonomous vehicles, online marketing, and financial management. Common to all of these domains is the requirement to quickly improve from the current policy/strategy in use while ensuring safe operations. This requirement is called "the Fast and Safe (policy) Improvement" (FSI) problem. On one hand, fast policy improvement demands that an agent acquire a better policy quickly (i.e., through fewer interactions with the environment). On the other hand, a new policy to be deployed needs to be safe guaranteed to perform at least as well as a baseline policy (e.g., the current policy), in order to represent an improvement. Untested policies and/or unrestricted exploratory actions that potentially cause degenerated performance are not acceptable.

Policy gradient (PG) (Peters and Schaal 2008; Schulman et al. 2015; Sutton et al. 1999; Wu et al. 2017) methods in reinforcement learning (RL) (Sutton and Barto 1998) has great potential in enabling robust autonomous agents that learn and optimize from new experiences, and have shown the ability to train large function approximators with many parameters but suffer from slow convergence and data inefficiency due to a lack of exploration. Achieving exploration while maintaining effective operations is a challenging problem as exploratory decisions may degrade performance. Past research has focused mainly on learning an optimal or near-optimal policy, instead of the FSI problem. Conventional exploration strategies do not provide a suitable tradeoff between exploitation and exploration to achieve both fast and safe policy improvement, and do not guarantee performance of the behavior policy. They make potentially suboptimal and unsafe exploratory action choices (either blindly like ε-greedy (Sutton and Barto 1998) or intentionally to reduce uncertainty like R-MAX (Brafman and Tennenholtz 2003)) at the "state" level, and achieve exploration by "deviating" from the best policy according to current knowledge.

RL problems can be elegantly described within the context of Markov Decision Processes (MDP) (Puterman 2009). An MDP, M, is defined as a 5-tuple, $M=(S, A, P, \mathcal{R}, \gamma)$, where S is a fully observable finite set of states, A is a finite set of possible actions, P is the state transition model such that $P(s'|s, a) \in [0, 1]$ describes the probability of transitioning to state s' after taking action a in state s, $\mathcal{R}_{s,s'}^a$ is the expected value of the immediate reward r after taking a in s, resulting in s', and $\gamma \in (0, 1)$ is the discount factor on future rewards.

In RL scenarios P and $\mathcal{R}$ are unknown and $\pi$ must be learned from experiences that take the form of samples. Experience samples are singlestep observations of transitions from the domain. They are represented by tuples, $(s_t, a_t, r_{t+1}, s_{t+1})$, which consist of a state $s_t$, an action $a_t$, the next state $s_{t+1}$, and the immediate reward $r_{t+1}$. A trajectory of length T is an ordered set of transitions:

$$\tau = \{s_0, a_0, r_1, s_1, a_1, r_2, \ldots, s_{T-1}, a_{T-1}, r_T\}.$$

A solution to an MDP is a policy, $\pi(a|s)$ which provides the probability of taking action a in state s when following policy $\pi$. The performance of policy $\pi$ is the expected discounted return $$J(\pi) = \mathbb{E}_\tau[R(\tau)] = \mathbb{E}_{s_0, a_0 \ldots} \left[ \sum_{t=0}^{\infty} \gamma^t r(a_t, s_t) \right]$$

where $s_0 \sim \rho(s_0), a_t \sim \pi(\cdot | s_t), s_{t+1} \sim P(\cdot | s_t, a_t)$ and so $\rho(s_0)$ is the distribution over start states. The state-action value function, value function and advantage function are defined as:

$$Q_\pi(s_t, a_t) = \mathbb{E}_{s_{t+1}, a_{t+1} \ldots} \left[ \sum_{l=0}^{\infty} \gamma^l r(a_{t+l}, s_{t+l}) \right]$$

$$V_\pi(s_t) = \mathbb{E}_{a_t, s_{t+1} \ldots} \left[ \sum_{l=0}^{\infty} \gamma^l r(a_{t+l}, s_{t+l}) \right]$$

$$A_\pi(s_t, a_t) = Q_\pi(s_t, a_t) - V_\pi(s_t)$$

where $$a_t \sim \pi(\cdot | s_t), s_{t+1} \sim P(\cdot | s_t, a_t)$$

In policy gradient methods, $\pi_\theta$ is represented by a function approximator such as a neural network parameterized by vector $\theta$. These methods maximize via gradient descent on $\theta$ the expected return of $\pi_\theta$ captured by the objective function:

$$\max_\theta J(\theta) = \mathbb{E}_\tau[R(\tau)].$$

The gradient of the objective $J(\theta)$ is:

$$\nabla_\theta J(\theta) = \mathbb{E}_\tau \left[ \sum_{t=0}^{T} \nabla_\theta \log(\pi(a_t | s_t; \theta)) R_t(\tau) \right],$$

which is derived using the likelihood ratio. This is estimated empirically via $$\nabla_\theta \hat{J}(\theta) = \frac{1}{N} \sum_{i=0}^{N} \left[ \sum_{t=0}^{T} \nabla_\theta \log(\pi(a_t | s_t; \theta)) \hat{A}_\pi(s_t, a_t) \right],$$

where an empirical estimate of the advantage function is used instead of $R_t(\tau)$ to reduce variance and N is the number of trajectories. The policy update is then $\theta_i + \alpha \nabla_\theta \hat{J}(\theta)$ where $\alpha$ is the stepsize. This is known as the 'vanilla' policy gradient.

Natural Gradient Descent and TRPO

A shortcoming of vanilla PG methods is that they are not invariant to the scale of parameterization nor do they consider the more complex manifold structure of parameter space. Natural Gradient Descent methods (Kakade 2002; Amari and Nagaoka 2000) address this by correcting for the curvature of the parameter space manifold by scaling the gradient with the inverse Fisher Information Matrix (FIM) $F_\theta$ where $$F_{ij,\theta} = -\mathbb{E}_{s \sim \rho}\left[\frac{\partial}{\partial \theta_i}\frac{\partial}{\partial \theta_j}\log(\pi_\theta(\cdot \mid s))\right]$$

is the i; jth entry in the FIM and $\rho$ is the state distribution induced by policy $\pi_\theta$. The natural policy gradient descent direction and policy update is then $$\tilde{\nabla}_\theta \hat{J}(\theta) = F_\theta \nabla_\theta \hat{J}(\theta), \theta_{i+1} = \theta_i + \alpha \tilde{\nabla}_\theta \hat{J}(\theta).$$

Selecting the stepsize $\alpha$ is not trivial. TRPO (Schulman et al. 2015), a robust and state of the art approach, follows the natural gradient descent direction from the current policy $\pi_{\theta'}$ but enforces a strict KL divergence constraint by optimizing $$\max_\theta \mathbb{E}_{s \sim \rho_{\theta'}, a \sim \pi_{\theta'}}\left[\frac{\pi(a \mid s; \theta)}{\pi(a \mid s; \theta')} R_t(\tau)\right]$$

subject to $D_{KL}(\pi_\theta \| \pi_{\theta'}) \leq \delta$ which is equivalent to the standard objective. The KL divergence between two policies is $$D_{KL}(\pi_\theta \| \pi_{\theta'}) := E_{s \sim \rho}[D_{KL}(\pi_\theta(\cdot \mid s) \| \pi_{\theta'}(\cdot \mid s))].$$

Via a Taylor expansion of $D_{KL}$, one can obtain the following local approximation $$D_{KL}(\theta \| \theta + d\delta) = \tfrac{1}{2}(\theta + d\delta - \theta)^T F_\theta (\theta + d\delta - \theta) = \tfrac{1}{2} d\delta^T F_\theta d\delta$$

where $\theta + d\delta$ and $\theta$ parameterize two policies. This approximation is employed below.

Parameter Space Noise for Exploration

The reinforcement learning gradient estimation can be generalized with inspiration from evolutionary strategies (Wierstra et al. 2014) by sampling parameters $\theta$ from a search distribution $\mathcal{N}(\phi, \Sigma)$ (Plappert et al. 2018).

$$\nabla_{\theta, \Sigma} \mathbb{E}_{\substack{\theta \sim \mathcal{N}(\phi, \Sigma) \\ \tau \sim \pi}}[R(\tau)] = \mathbb{E}_{\substack{\epsilon \sim \mathcal{N}(0, I) \\ \tau \sim \pi}}\left[\sum_{t=0}^{T} \nabla_{\phi, \Sigma} \log(\pi(a_t \mid s_t; \phi + \epsilon \Sigma^{1/2})) R_t(\tau)\right] \quad (1)$$

which is derived using likelihood ratios and reparameterization (Kingma and Welling 2014). The corresponding empirical estimate is $$\frac{1}{N}\sum_{i=0}^{N}\left[\sum_{t=0}^{T} \nabla_{\phi, \Sigma} \log(\pi(a_t \mid s_t; \phi + \epsilon_i \Sigma^{1/2})) \hat{A}_\pi(s_t, a_t)\right].$$

This gradient enables exploration because it aggregates samples from multiple policies (each $\epsilon_i$ defines a different, perturbed policy). It may seem that using trajectories collected from perturbed policies introduces off-policy bias (and it would for the standard on-policy gradient estimate). However, the generalized objective in Equation (1) does not have this issue since the gradient is computed over a perturbation distribution.

Perturbation approaches suffer from an exploration-exploitation dilemma. Large perturbations increase exploration but potentially degrade performance since the perturbed policy becomes significantly different from the main, unperturbed policy. A small perturbation provides limited exploration but will benefit from online performance similar to that of the main policy. Our approach, DE, is designed to maximize diversity in a limited number of perturbations within a bounded local region of parameter space to address this tradeoff which random perturbations do not. From here on, we refer to Equation (1) as the "perturbed gradient estimate" and refer to the approach that samples random perturbations as RP.

Policy Performance Estimation

It is a challenging problem to estimate the performance of a policy without deploying it. To address this challenge, the authors of (Thomas, Theocharous, and Ghavamzadeh 2015a) proposed high-confidence off-policy evaluation (HCOPE) methods which lower-bound the performance of a target policy, $\pi_p$, based on a set of trajectories, $\mathcal{D}$, generated by some behavior policy (or policies), $\pi_q$. In their work, the (normalized and discounted) return of a trajectory is defined as:

$$R(\tau) = ((\Sigma_{t=1}^{T} \gamma^{t-1} r_t) - R_-) / (R_+ - R_-) \in [0, 1],$$

where $R_+$ and $R_-$ are upper and lower bounds on $\Sigma_{t=1}^{T} \gamma^{t-1} r_t$.

HCOPE applies importance sampling (Precup, Sutton, and Singh 2000) to produce an unbiased estimator of $\rho(\pi_p)$ from a trajectory generated by a behavior policy, $\pi_q$. The estimator is called the importance weighted return, $\hat{\rho}(\pi_p \mid \tau, \pi_q)$, and is given by: $\hat{\rho}(\pi_p \mid \tau, \pi_q) = R(\tau) w(\tau; \pi_p, \pi_q)$, where $w(\tau; \pi_p, \pi_q)$ is the importance weight:

$$w(\tau; \pi_p; \pi_q) = \prod_{t=1}^{T} \frac{\pi_p(a_t \mid s_t)}{\pi_q(a_t \mid s_t)}.$$

Based on a set of importance weighted returns, HCOPE provides a high confidence lower bound for $\rho(\pi_p)$.

Let $X_1, \ldots, X_n$ be n random variables, which are independent and all have the same expected value, $\mu = E[X_i]$. HCOPE considers $\hat{\rho}(\pi_p \mid \tau_i, \pi_i)$ as $X_i$, and so $\mu = \rho(\pi_p)$.

One difficulty with this approach is importance weighted returns often come from distributions with heavy upper tails, which makes it challenging to estimate confidence intervals based on samples. In (Thomas, Theocharous, and Ghavamzadeh 2015b) the authors studied the effectiveness of three methods; concentration inequality, Student's t-test, and bootstrap confidence interval. The t-test is adopted due to its good performance and computational efficiency. Under mild assumptions of the central limit theorem, the distribution of the sample mean approximates a normal distribution, and it is appropriate to use a one-sided Student's t-test to get a $1-\delta$ confidence lower bound on the performance of a policy. In (Thomas, Theocharous, and Ghavamzadeh 2015b), policies deemed safe by the t-test are called semi-safe since the estimate is based on possibly false assumptions.

See, 20180005083; 20180004913; 20170371965; 20170371306; 20170364829; 20170357844; 20170347279; 20170339484; 20170337682; 20170337478; 20170330077; 20170326726; 20170318468; 20170316777; 20170308946; 20170308856; 20170308535; 20170302521; 20170300839; 20170300648; 20170293844; 20170291301; 20170290095; 20170286860; 20170279832; 20170278018; 20170270447; 20170261949; 20170255945; 20170255884; 20170236006; 20170228662; 20170213204; 20170205863; 20170200061; 20170193136; 20170186125; 20170185087; 20170178245; 20170178135; 20170178093; 20170177809; 20170177808; 20170171761; 20170161451; 20170161447; 20170161437; 20170140053; 20170118688; 20170117744; 20170116497; 20170111509; 20170111507; 20170111505; 20170111503; 20170109422; 20170103532; 20170076201; 20170069009; 20170061283; 20170032245; 20170024643; 20170011320; 20170001309; 20160366160; 20160303738; 20160288323; 20160279329; 20160253445; 20160246929; 20160232445; 20160223218; 20160219070; 20160217371; 20160210602; 20160188843; 20160179162; 20160156737; 20160148251; 20160148250; 20160148246; 20160112341; 20160096272; 20160096270; 20160086086; 20160067864; 20160055307; 20160044054; 20160028608; 20160021671; 20160012338; 20150366219; 20150363345; 20150339946; 20150330640; 20150324236; 20150316282; 20150310068; 20150294594; 20150294583; 20150294574; 20150294216; 20150289812; 20150289811; 20150289810; 20150289809; 20150289808; 20150289800; 20150289799; 20150289798; 20150289797; 20150286873; 20150235321; 20150179170; 20150163345; 20150161232; 20150143414; 20150142466; 20150140938; 20150102945; 20150100530; 20150100526; 20150094852; 20150094850; 20150058265; 20150019241; 20150005937; 20140371912; 20140371907; 20140357312; 20140344282; 20140342328; 20140336539; 20140330094; 20140324395; 20140317135; 20140317119; 20140317042; 20140317039; 20140316885; 20140310298; 20140310297; 20140310296; 20140310295; 20140310294; 20140310284; 20140310276; 20140310275; 20140310274; 20140310223; 20140310105; 20140310066; 20140309940; 20140309939; 20140308639; 20140308636; 20140277765; 20140277744; 20140277718; 20140272847; 20140257577; 20140257540; 20140257055; 20140249676; 20140223562; 20140222851; 20140222850; 20140222849; 20140222848; 20140222847; 20140222842; 20140222739; 20140222735; 20140222734; 20140222733; 20140222732; 20140221791; 20140221790; 20140221789; 20140221785; 20140221784; 20140221776; 20140221775; 20140221773; 20140221730; 20140220525; 20140214903; 20140214874; 20140214873; 20140214836; 20140214552; 20140213938; 20140213854; 20140201126; 20140188874; 20140187873; 20140187872; 20140181108; 20140180993; 20140180978; 20140180993; 20140180978; 20140180975; 20140180720; 20140180598; 20140180025; 20140180024; 20140180018; 20140156698; 20140122537; 20140122536; 20140122496; 20140115008; 20140100912; 20140100777; 20140097979; 20140094999; 20140089001; 20140079297; 20140058755; 20140046777; 20140032449; 20140025613; 20140018985; 20140011850; 20130346614; 20130325776; 20130223724; 20130219081; 20130215116; 20130184838; 20130178953; 20130178952; 20130158368; 20130158367; 20130151450; 20130151449; 20130151448; 20130122819; 20130110750; 20130097664; 20130095774; 20130085678; 20130080641; 20130080377; 20130080358; 20130066750; 20130031036; 20120316793; 20120240185; 20120179511; 20120072039; 20120041914; 20120030150; 20120017262; 20120016435; 20120011530; 20120002567; 20110302000; 20110251917; 20110238855; 20110231564; 20110231510; 20110231320; 20110219056; 20110219035; 20110214157; 20110213869; 20110213435; 20110099130; 20110019693; 20100333167; 20100302961; 20100241243; 20100145161; 20100138452; 20100138451; 20100138271; 20100137734; 20100082513; 20100082142; 20100030578; 20100023307; 20090327172; 20090327011; 20090322561; 20090318773; 20090306866; 20090276457; 20090254971; 20090177521; 20090172540; 20090171164; 20090164549; 20090164503; 20090164458; 20090164403; 20090164401; 20090164302; 20090164132; 20090164131; 20090163777; 20090157813; 20090157751; 20090157660; 20090157625; 20090157482; 20090157481; 20090157419; 20090157323; 20090156955; 20090156907; 20090099985; 20090089078; 20090030746; 20090024050; 20090018407; 20090012922; 20090006458; 20090006457; 20080320030; 20080320029; 20080319855; 20080319796; 20080319787; 20080319786; 20080319781; 20080318678; 20080313596; 20080313595; 20080313110; 20080313008; 20080312980; 20080312979; 20080287821; 20080262991; 20080262990; 20080249844; 20080243439; 20080229415; 20080208946; 20080168249; 20080162390; 20080154737; 20080147852; 20080140591; 20080134330; 20080133518; 20080133517; 20080097644; 20080091526; 20070260346; 20070203871; 20070198444; 20070192863; 20070143765; 20070094187; 20070087756; 20070011119; 20060271441; 20060247973; 20060224535; 20060206337; 20060192850; 20060184465; 20050143138; 20050113650; 20050083858; 20050071223; 20050054381; 20050049830; 20040073764; 20040015386; 20030221915; 20030204368; 20030101451; 20030101449; 20030004912; 20020198854; 20020184166; 20020178127; 20020091748; 20020091747; U.S. Pat. Nos. 9,842,314; 9,840,003; 9,828,107; 9,826,016; 9,823,842; 9,818,297; 9,817,957; 9,812,127; 9,811,849; 9,800,608; 9,792,546; 9,792,531; 9,792,397; 9,789,605; 9,775,554; 9,764,468; 9,754,221; 9,731,417; 9,730,098; 9,729,639; 9,727,557; 9,723,151; 9,716,792; 9,708,899; 9,705,817; 9,687,984; 9,682,067; 9,679,258; 9,661,019; 9,635,181; 9,630,318; 9,622,635; 9,622,133; 9,604,359; 9,599,990; 9,579,789; 9,569,736; 9,552,546; 9,525,696; 9,495,684; 9,492,048; 9,489,623; 9,484,046; 9,480,381; 9,471,777; 9,471,565; 9,446,515; 9,443,428; 9,440,352; 9,436,917; 9,436,909; 9,432,298; 9,418,368; 9,412,075; 9,412,041; 9,405,975; 9,396,486; 9,396,183; 9,395,707; 9,392,920; 9,384,443; 9,373,163; 9,367,820; 9,367,798; 9,358,685; 9,355,441; 9,354,778; 9,349,100; 9,342,786; 9,317,038; 9,314,924; 9,311,600; 9,298,172; 9,296,101; 9,286,572; 9,277,264; 9,262,772; 9,256,369; 9,256,215; 9,229,454; 9,225,772; 9,224,180; 9,215,598; 9,213,937; 9,213,936; 9,211,077; 9,210,044; 9,202,253; 9,195,934; 9,189,730; 9,186,793; 9,179,470; 9,177,257; 9,156,165; 9,149,170; 9,146,546; 9,144,361; 9,144,360; 9,128,739; 9,128,486; 9,113,371; 9,105,077; 9,104,186; 9,092,802; 9,090,255; 9,082,079; 9,081,760; 9,053,431; 9,053,394; 9,050,200; 9,038,233; 9,015,093; 9,015,092; 9,008,840; 9,008,835; 9,007,908; 9,002,757; 8,996,177; 8,990,133; 8,985,127; 8,978,196; 8,965,819; 8,954,192; 8,949,899; 8,943,008; 8,942,659; 8,924,975; 8,924,318; 8,918,866; 8,914,314; 8,914,300; 8,909,590; 8,874,477; 8,874,264; 8,873,813; 8,860,602; 8,855,813; 8,854,001; 8,850,465; 8,839,477; 8,839,255; 8,819,686; 8,812,419; 8,799,912; 8,793,381; 8,793,205; 8,793,020; 8,788,439; 8,788,092; 8,779,941; 8,779,940; 8,775,341; 8,774,966; 8,774,923; 8,762,570; 8,762,379; 8,761,935; 8,761,931; 8,749,196; 8,713,025; 8,708,705; 8,686,679; 8,670,866; 8,661,605; 8,630,960; 8,626,565; 8,615,479; 8,612,311; 8,612,107; 8,607,234; 8,600,553; 8,598,829; 8,594,840; 8,584,305; 8,572,010; 8,566,143; 8,565,920; 8,528,157; 8,521,337; 8,516,651; 8,515,578; 8,504,504; 8,495,680; 8,494,980; 8,484,146; 8,479,302; 8,478,442; 8,474,090; 8,463,438;

8,461,803; 8,458,715; 8,456,125; 8,447,713; 8,447,419; 8,442,861; 8,438,695; 8,433,622; 8,429,097; 8,429,096; 8,429,001; 8,428,778; 8,422,444; 8,418,303; 8,417,481; 8,417,383; 8,417,360; 8,412,377; 8,402,540; 8,398,546; 8,396,592; 8,396,550; 8,392,021; 8,390,251; 8,387,193; 8,386,081; 8,382,906; 8,382,590; 8,380,350; 8,378,613; 8,374,721; 8,368,339; 8,356,317; 8,356,004; 8,301,406; 8,290,806; 8,285,581; 8,275,635; 8,260,655; 8,253,368; 8,250,014; 8,249,955; 8,239,992; 8,212,688; 8,195,593; 8,176,011; 8,150,796; 8,135,657; 8,126,765; 8,099,189; 8,069,125; 8,055,607; 8,055,606; 8,050,949; 8,050,948; 8,046,797; 8,036,877; 8,032,404; 8,010,469; 8,006,223; 8,001,063; 7,979,368; 7,974,863; 7,971,180; 7,970,739; 7,962,629; 7,958,552; 7,958,509; 7,958,064; 7,805,580; 7,783,512; 7,734,471; 7,725,419; 7,707,131; 7,689,432; 7,672,739; 7,664,714; 7,640,488; 7,630,986; 7,594,245; 7,532,574; 7,454,388; 7,433,841; 7,403,904; 7,395,252; 7,346,520; 7,308,322; 7,231,343; 7,174,354; 7,073,175; 7,058,550; 7,010,788; 6,990,670; 6,917,925; 6,912,515; 6,882,992; 6,775,415; 6,675,189; 6,672,431; 6,581,048; 6,532,454; 6,513,022; 6,480,876; 6,473,851; 6,169,981; 5,946,673; 5,722,418; 5,608,843; 5,486,112; each of which is expressly incorporated herein by reference in its entirety.

See the following, each of which is expressly incorporated herein by reference in its entirety:

Abbasi-Yadkori, Y.; Bartlett, P.; and Wright, S. 2016. A fast and reliable policy improvement algorithm. In Proceedings of the 19th International Conference on Artificial Intelligence and Statistics, 1338-1346.

Abbeel, Pieter, Adam Coates, Morgan Quigley, and Andrew Y. Ng. "An application of reinforcement learning to aerobatic helicopter flight." In *Advances in neural information processing systems*, pp. 1-8. 2007.

Abbeel, Pieter, and Andrew Y. Ng. "Apprenticeship learning via inverse reinforcement learning." In *Proceedings of the twenty-first international conference on Machine learning*, p. 1. ACM, 2004.

Abbeel, Pieter, Morgan Quigley, and Andrew Y. Ng. "Using inaccurate models in reinforcement learning." In *Proceedings of the 23rd international conference on Machine learning*, pp. 1-8. ACM, 2006.

Achiam, J.; Held, D.; Tamar, A.; and Abbeel, P. 2017. Constrained policy optimization. In Proceedings of the ThirtyFourth International Conference on Machine Learning, 22-31.

Amari, S., and Nagaoka, H., eds. 2000. *Methods of Information Geometry*. Oxford University Press.

Amari, Shun-Ichi. "Natural gradient works efficiently in learning." *Neural computation* 10, no. 2 (1998): 251-276.

Amer-Yahia, Sihem, Vincent Leroy, Alexandre Termier, Martin Kirchgessner, and Behrooz Omidvar-Tehrani. "Interactive Data-Driven Research: the place where databases and data mining research meet." PhD diss., LIG, 2015.

Anthony, Thomas, Zheng Tian, and David Barber. "Thinking Fast and Slow with Deep Learning and Tree Search." *arXiv preprint arXiv:*1705.08439 (2017).

Arulkumaran, Kai, Marc Peter Deisenroth, Miles Brundage, and Anil Anthony Bharath. "A brief survey of deep reinforcement learning." *arXiv preprint arXiv:* 1708.05866(2017).

Ba, J. L.; Kiros, R.; and Hinton, G. 2016. Layer normalization. In *arXiv preprint arXiv:*1607.06450.

Baez, John; Fritz, Tobias (2014). "A Bayesian characterization of relative entropy". Theory and Application of Categories. 29: 421-456. arXiv:1402.3067 Freely accessible.

Baird III, Leemon C., and Andrew W. Moore. "Gradient descent for general reinforcement learning." In *Advances in neural information processing systems*, pp. 968-974. 1999.

Baird, Leemon, Residual algorithms: Reinforcement learning with function approximation. ICML, pages 30-37, 1995.

Banerjee, Bikramjit, and Jing Peng. "Performance bounded reinforcement learning in strategic interactions." In *AAAI*, vol. 4, pp. 2-7. 2004.

Barreto, André, Will Dabney, Rémi Munos, Jonathan J. Hunt, Tom Schaul, David Silver, and Hado P. van Hasselt. "Successor features for transfer in reinforcement learning." In *Advances in Neural Information Processing Systems*, pp. 4058-4068. 2017.

Barto, A., Reinforcement learning, in O. Omidvar, D. Elliot (eds.) Neural Systems for Control, p. 7-30, Academic Press, 1997.

Bellemare, Marc G., Will Dabney, and Rémi Munos. "A distributional perspective on reinforcement learning." *arXiv preprint arXiv:*1707.06887 (2017).

Benjamini, Y., and Hochberg, Y. 1995. Controlling the false discovery rate: A practical and powerful approach to multiple testing. Journal of the Royal Statistical Society 57(1):289-300.

Bertsekas, Dimitri P., and John N. Tsitsiklis. "Neuro-dynamic programming: an overview." In *Decision and Control*, 1995., *Proceedings of the 34th IEEE Conference on*, vol. 1, pp. 560-564. IEEE, 1995.

Bishop C. (2006). Pattern Recognition and Machine Learning p. 55.

Biswas, Anupam, K. K. Mishra, Shailesh Tiwari, and A. K. Misra. "Physics-inspired optimization algorithms: a survey." *Journal of Optimization* 2013 (2013).

Bloch, Mitchell Keith. "Temporal second difference traces." *arXiv preprint arXiv:*1104.4664 (2011).

Bloembergen, Daan, Karl Tuyls, Daniel Hennes, and Michael Kaisers. "Evolutionary Dynamics of Multi-Agent Learning: A Survey." *J. Artif. Intell. Res. (JAIR)* 53 (2015): 659-697.

Boyan, Justin A., and Michael L. Littman. "Packet routing in dynamically changing networks: A reinforcement learning approach." In *Advances in neural information processing systems*, pp. 671-678. 1994.

Bozinovski, S., A self learning system using secondary reinforcement, In R. Trappl (ed.) Cybernetics and Systems Research, p. 397-402, North Holland, 1982.

Bozinovski, S., Crossbar Adaptive Array: The first connectionist network that solved the delayed reinforcement learning problem, In A. Dobnikar, N. Steele, D. Pearson, R. Albert (Eds.) Artificial Neural Networks and Genetic Algorithms, 320-325, Springer Verlag, 1999.

Bradtke, Steven J. "Reinforcement learning applied to linear quadratic regulation." In *Advances in neural information processing systems*, pp. 295-302. 1993.

Bradtke, Steven J., B. Erik Ydstie, and Andrew G. Barto. "Adaptive linear quadratic control using policy iteration." In *American Control Conference,* 1994, vol. 3, pp. 3475-3479. IEEE, 1994.

Brafman, R. I., and Tennenholtz, M. 2003. R-max a general polynomial time algorithm for near-optimal reinforcement learning. Journal of Machine Learning Research 3:213-231.

Brafman, Ronen I., and Moshe Tennenholtz. "R-max-a general polynomial time algorithm for near-optimal reinforcement learning." *Journal of Machine Learning Research* 3, no. October (2002): 213-231.

Brochu, Eric, Vlad M. Cora, and Nando De Freitas. "A tutorial on Bayesian optimization of expensive cost functions, with application to active user modeling and hierarchical reinforcement learning." arXiv preprint arXiv: 1012.2599(2010).

Brockman, G.; Cheung, V.; Pettersson, L.; Schneider, J.; Schulman, J.; Tang, J.; and Zaremba, W. 2016. Openai gym.

Buchli, Jonas, Evangelos Theodorou, Freek Stulp, and Stefan Schaal. "Variable impedance control a reinforcement learning approach." *Robotics: Science and Systems VI* (2011): 153.

Buchli, Jonas, Freek Stulp, Evangelos Theodorou, and Stefan Schaal. "Learning variable impedance control." *The International Journal of Robotics Research* 30, no. 7 (2011): 820-833.

Bugallo, M. F.; Elvira, V.; Martino, L.; Luengo, D.; Miguez, J.; Djuric, P. M. (July 2017). "Adaptive Importance Sampling: The past, the present, and the future". IEEE Signal Processing Magazine. 34 (4): 60-79. doi:10.1109/msp.2017.2699226. ISSN 1053-5888.

Bugallo, Mónica F.; Martino, Luca; Corander, Jukka (2015-12-01). "Adaptive importance sampling in signal processing". Digital Signal Processing. Special Issue in Honour of William J. (Bill) Fitzgerald. 47: 36-49. doi:10.1016/j.dsp.2015.05.014.

Burnham, K. P. and Anderson D. R. (2002), Model Selection and Multimodel Inference: A Practical Information-Theoretic Approach, p. 51, Second Edition (Springer Science) ISBN 978-0-387-95364-9

Burnham, K. P.; Anderson, D. R. (2001). "Kullback-Leibler information as a basis for strong inference in ecological studies". Wildlife Research. 28: 111-119. doi:10.1071/WR99107.

Buşoniu, Lucian, Damien Ernst, Bart De Schutter, and Robert Babuška. "Online least-squares policy iteration for reinforcement learning control." In *American Control Conference* (ACC), 2010, pp. 486-491. IEEE, 2010.

Busoniu, Lucian, Robert Babuska, and Bart De Schutter. "A comprehensive survey of multiagent reinforcement learning." *IEEE Transactions on Systems, Man, And Cybernetics-Part C: Applications and Reviews,* 38 (2), 2008 (2008).

Busoniu, Lucian, Robert Babuska, Bart De Schutter, and Damien Ernst. *Reinforcement learning and dynamic programming using function approximators*. Vol. 39. CRC press, 2010.

Calumby, Rodrigo Tripodi. "Diversity-oriented multimodal and interactive information retrieval=Recuperação multimodal e interativa de informação orientada por diversidade." (2015).

Cappé, O.; Guillin, A.; Marin, J. M.; Robert, C. P. (2004-12-01). "Population Monte Carlo". Journal of Computational and Graphical Statistics. 13 (4): 907-929. doi: 10.1198/106186004X12803. ISSN 1061-8600.

Cappé, Olivier; Douc, Randal; Guillin, Arnaud; Marin, Jean-Michel; Robert, Christian P. (2008 Apr. 25). "Adaptive importance sampling in general mixture classes". Statistics and Computing. 18 (4): 447-459. doi:10.1007/s11222-008-9059-x. ISSN 0960-3174.

Cassandra, Anthony R., and Leslie Pack Kaelbling. "Learning policies for partially observable environments: Scaling up." In Machine Learning Proceedings 1995: Proceedings of the Twelfth International Conference on Machine Learning, Tahoe City, Calif., Jul. 9-12 1995, p. 362. Morgan Kaufmann, 2016.

Chaloner, K.; Verdinelli, I. (1995). "Bayesian experimental design: a review". Statistical Science. 10 (3): 273-304. doi:10.1214/ss/1177009939.

Chebotar, Yevgen, Karol Hausman, Marvin Zhang, Gaurav Sukhatme, Stefan Schaal, and Sergey Levine. "Combining Model-Based and Model-Free Updates for Trajectory-Centric Reinforcement Learning." *arXiv preprint arXiv:* 1703.03078 (2017).

Chebotar, Yevgen, Mrinal Kalakrishnan, Ali Yahya, Adrian Li, Stefan Schaal, and Sergey Levine. "Path integral guided policy search." In *Robotics and Automation (ICRA),* 2017 *IEEE International Conference on,* pp. 3381-3388. IEEE, 2017.

Chentanez, Nuttapong, Andrew G. Barto, and Satinder P. Singh. "Intrinsically motivated reinforcement learning." In *Advances in neural information processing systems,* pp. 1281-1288. 2005.

Chou, Po-Wei, Daniel Maturana, and Sebastian Scherer. "Improving stochastic policy gradients in continuous control with deep reinforcement learning using the beta distribution." In *International Conference on Machine Learning,* pp. 834-843. 2017.

Chrisman, Lonnie. "Reinforcement learning with perceptual aliasing: The perceptual distinctions approach." In *AAAI,* pp. 183-188. 1992.

Ciosek, K., and Whiteson, S. 2018. Expected policy gradients. In *Proceedings of the* 32nd *Conference on Artificial Intelligence,* 2868-2875.

Cohen, A.; Yu, L.; and Wright, R. 2018. Diverse exploration for fast and safe policy improvement. In *Proceedings of the* 32nd *Conference on Artificial Intelligence,* 2876-2883.

Cohen, Andrew. "Diverse experience learning." PhD diss., State University of New York at Binghamton, 2016.

Conti, Edoardo, Vashisht Madhavan, Felipe Petroski Such, Joel Lehman, Kenneth O. Stanley, and Jeff Clune. "Improving Exploration in Evolution Strategies for Deep Reinforcement Learning via a Population of Novelty-Seeking Agents." *arXiv preprint arXiv:*1712.06560 (2017).

Cornuet, Jean-Marie; Marin, Jean-Michel; Mira, Antonietta; Robert, Christian P. (2012 Dec. 1). "Adaptive Multiple Importance Sampling". Scandinavian Journal of Statistics. 39 (4): 798-812. doi:10.1111/j.1467-9469.2011.00756.x. ISSN 1467-9469.

Cover, Thomas M., Joy A. Thomas (1991) Elements of Information Theory (John Wiley & Sons), p. 22

Crites, Robert H., and Andrew G. Barto. "Improving elevator performance using reinforcement learning." In *Advances in neural information processing systems,* pp. 1017-1023. 1996.

Daniel, Christian, Gerhard Neumann, and Jan Peters. "Learning concurrent motor skills in versatile solution spaces." In *Intelligent Robots and Systems (IROS),* 2012 *IEEE/RSJ International Conference on,* pp. 3591-3597. IEEE, 2012.

Dayan, Peter, and Bernard W. Balleine. "Reward, motivation, and reinforcement learning." *Neuron* 36, no. 2 (2002): 285-298.

Dayan, Peter, and C. J. C. H. Watkins. "Q-learning." Machine learning 8, no. 3 (1992): 279-292.

Dayan, Peter, and Geoffrey E. Hinton. "Using expectation-maximization for reinforcement learning." *Neural Computation* 9, no. 2 (1997): 271-278.

Dearden, Richard, Nir Friedman, and Stuart Russell. "Bayesian Q-learning." In *AAAI/IAAI,* pp. 761-768. 1998.

Degris, Thomas, Olivier Sigaud, and Pierre-Henri Wuillemin. "Learning the structure of factored Markov decision processes in reinforcement learning problems." In *Proceedings of the 23rd international conference on Machine learning*, pp. 257-264. ACM, 2006.

Deisenroth, Marc, and Carl E. Rasmussen. "PILCO: A model-based and data-efficient approach to policy search." In *Proceedings of the 28th International Conference on machine learning (ICML-11)*, pp. 465-472. 2011.

Dietterich, T. G. 2001. Ensemble algorithms in reinforcement learning. Multiple Classifier Systems 1857:1-15.

Dietterich, Thomas G. "Hierarchical reinforcement learning with the MAXQ value function decomposition." *J. Artif. Intell. Res. (JAIR)* 13 (2000): 227-303.

Dietterich, Thomas G. "The MAXQ Method for Hierarchical Reinforcement Learning." In *ICML*, pp. 118-126. 1998.

Dimakopoulou, M., and Roy, B. V. 2018. Coordinated exploration in concurrent reinforcement learning. In *Proceedings of the 36th International Conference on Machine Learning*, 80:1271-1279.

Doya, Kenji, Kazuyuki Samejima, Ken-ichi Katagiri, and Mitsuo Kawato. "Multiple model-based reinforcement learning." *Neural computation* 14, no. 6 (2002): 1347-1369.

Doya, Kenji. "Reinforcement learning in continuous time and space." *Neural computation* 12, no. 1 (2000): 219-245.

Duan, Yan, Xi Chen, Rein Houthooft, John Schulman, and Pieter Abbeel. "Benchmarking deep reinforcement learning for continuous control." In *Proceedings of The 33rd International Conference on Machine Learning*, pp. 1329-1338. 2016.

Duchi J., "Derivations for Linear Algebra and Optimization", p. 13.

Džeroski, Sašo, Luc De Raedt, and Kurt Driessens. "Relational reinforcement learning." *Machine learning* 43, no. 1-2 (2001): 7-52.

El Bsat, Salam, Haitham Bou-Ammar, and Matthew E. Taylor. "Scalable Multitask Policy Gradient Reinforcement Learning." In *AAAI*, pp. 1847-1853. 2017.

Elvira, V.; Martino, L.; Luengo, D.; Bugallo, M. F. (2015-10-01). "Efficient Multiple Importance Sampling Estimators". IEEE Signal Processing Letters. 22 (10): 1757-1761. doi:10.1109/LSP.2015.2432078. ISSN 1070-9908.

Elvira, Victor; Martino, Luca; Luengo, David; Bugallo, Mónica F. "Improving population Monte Carlo: Alternative weighting and resampling schemes". Signal Processing. 131: 77-91. doi:10.1016/j.sigpro.2016.07.012.

Engel, Yaakov, Shie Mannor, and Ron Meir. "Reinforcement learning with Gaussian processes." In *Proceedings of the 22nd international conference on Machine learning*, pp. 201-208. ACM, 2005.

Englert, Peter, Alexandros Paraschos, Jan Peters, and Marc Peter Deisenroth. "Model-based imitation learning by probabilistic trajectory matching." In *Robotics and Automation (ICRA), 2013 IEEE International Conference on*, pp. 1922-1927. IEEE, 2013.

Englert, Peter, Alexandros Paraschos, Marc Peter Deisenroth, and Jan Peters. "Probabilistic model-based imitation learning." *Adaptive Behavior* 21, no. 5 (2013): 388-403.

Ernst, D.; Geurts, P.; Wehenkel, L.; and Littman, L. 2005. Tree-based batch mode reinforcement learning. Journal of Machine Learning Research 6:503-556.

Fernandez, Fernando, and Manuela Veloso. "Probabilistic policy reuse in a reinforcement learning agent." In *Proceedings of the fifth international joint conference on Autonomous agents and multiagent systems*, pp. 720-727. ACM, 2006.

Filippi, Sarah, Olivier Cappé, and Aurélien Garivier. "Optimism in reinforcement learning and Kullback-Leibler divergence." In *Communication, Control, and Computing (Allerton), 2010 48th Annual Allerton Conference on*, pp. 115-122. IEEE, 2010.

Fortunato, M.; Azar, M.; B, P.; Menick, J.; Osband, I.; Graves, A.; Mnih, V.; Munos, R.; Hassabis, D.; Pietquin, O.; Blundell, C.; and Legg, S. 2018. Noisy networks for exploration. In *International Conference on Learning Representations*.

Frank, Mikhail, Jurgen Leitner, Marijn Stollenga, Alexander Förster, and Jürgen Schmidhuber. "Curiosity driven reinforcement learning for motion planning on humanoids." *Frontiers in neurorobotics* 7 (2014): 25.

Fraundorf, P. (2007). "Thermal roots of correlation-based complexity". Complexity. 13 (3): 18-26. doi:10.1002/cplx.20195.

Friston, Karl J., Jean Daunizeau, and Stefan J. Kiebel. "Reinforcement learning or active inference?" *PloS one* 4, no. 7 (2009): e6421.

Fukuchi, Yosuke, Masahiko Osawa, Hiroshi Yamakawa, and Michita Imai. "Autonomous self-explanation of behavior for interactive reinforcement learning agents." In *Proceedings of the 5th International Conference on Human Agent Interaction*, pp. 97-101. ACM, 2017.

Galichet, Nicolas, Michele Sebag, and Olivier Teytaud. "Exploration vs exploitation vs safety: Risk-aware multiarmed bandits." In Asian Conference on Machine Learning, pp. 245-260. 2013.

Garcia, J., and Fernandez, F. 2012. Safe exploration of state and action spaces in reinforcement learning. Journal of Machine Learning Research 45:515-564.

Ge, Hao, Jianhua Li, Shenghong Li, Wen Jiang, and Yifan Wang. "A novel parallel framework for pursuit learning schemes." *Neurocomputing* 228 (2017): 198-204.

Gelly, Sylvain, and David Silver. "Combining online and offline knowledge in UCT." In *Proceedings of the 24th international conference on Machine learning*, pp. 273-280. ACM, 2007.

Gibbs, J. W., (1873), "A method of geometrical representation of thermodynamic properties of substances by means of surfaces", reprinted in The Collected Works of J. W. Gibbs, Volume I Thermodynamics, ed. W. R. Longley and R. G. Van Name (New York: Longmans, Green, 1931) footnote page 52.

Gil, Paulo, and Luis Nunes. "Hierarchical reinforcement learning using path clustering." In *Information Systems and Technologies (CISTI), 2013 8th Iberian Conference on*, pp. 1-6. IEEE, 2013.

Glatt, Ruben, and Anna Helena Reali Costa. "Improving Deep Reinforcement Learning with Knowledge Transfer." In *AAAI*, pp. 5036-5037. 2017.

Gosavi, Abhijit. "A reinforcement learning algorithm based on policy iteration for average reward: Empirical results with yield management and convergence analysis." *Machine Learning* 55, no. 1 (2004): 5-29.

Grosse, R., and Martens, J. 2016. A kronecker-factored approximate fisher matrix for convolution layers. In *Proceedings of The 33rd International Conference on Machine Learning*, 573-582.

Gu, Shixiang, Timothy Lillicrap, Zoubin Ghahramani, Richard E. Turner, Bernhard Scholkopf, and Sergey Levine. "Interpolated Policy Gradient: Merging On-Policy and Off-Policy Gradient Estimation for Deep Reinforcement Learning." *arXiv preprint arXiv:*1706.00387, In *Advances in Neural Information Processing Systems* 30, 3849-3858 (2017).

Haarnoja, Tuomas, Haoran Tang, Pieter Abbeel, and Sergey Levine. "Reinforcement Learning with Deep Energy-Based Policies." *arXiv preprint arXiv:*1702.08165 (2017).

Hanna, J.; Thomas, P.; Stone, P.; and Neikum, S. 2017. Data-efficient policy evaluation through behavior policy search. In Proceedings of the Thirty-Fourth International Conference on Machine Learning, 1394-1403.

Hansen, N. 2006. The CMA evolution strategy: a comparing review. In Lozano, J. A.; Larrañaga, P.; Inza, I.; and Bengoetxea, E., eds., Towards a New Evolutionary Computation: Advances in the Estimation of Distribution Algorithms. Springer.

Held, David, Xinyang Geng, Carlos Florensa, and Pieter Abbeel. "Automatic Goal Generation for Reinforcement Learning Agents." *arXiv preprint arXiv:*1705.06366 (2017).

Hernãndez López, José Manuel, José Héctor Lozano Bleda, and José Santacreu Mas. "La evaluación de la persistencia basada en una tarea de aprendizaje adquisición-extinción." *Escritos de Psicología (Internet)* 4, no. 1 (2011): 25-33.

Hessel, Matteo, Joseph Modayil, Hado Van Hasselt, Tom Schaul, Georg Ostrovski, Will Dabney, Dan Horgan, Bilal Piot, Mohammad Azar, and David Silver. "Rainbow: Combining Improvements in Deep Reinforcement Learning." *arXiv preprint arXiv:*1710.02298 (2017).

Higgins, Irina, Arka Pal, Andrei A. Rusu, Loic Matthey, Christopher P. Burgess, Alexander Pritzel, Matthew Botvinick, Charles Blundell, and Alexander Lerchner. "Darla: Improving zero-shot transfer in reinforcement learning." *arXiv preprint arXiv:*1707.08475 (2017).

Hinton, Geoffrey E. "Training products of experts by minimizing contrastive divergence." *Neural computation* 14, no. 8 (2002): 1771-1800.

Hinton, Geoffrey E., Simon Osindero, and Yee-Whye Teh. "A fast learning algorithm for deep belief nets." *Neural computation* 18, no. 7 (2006): 1527-1554.

Hobson, Arthur (1971). Concepts in statistical mechanics. New York: Gordon and Breach. ISBN 0677032404.

Hong, Z.; Shann, A.; Su, S.; Chang, Y.; Fu, T.; and Lee, C. 2018. Diversity-driven exploration strategy for deep reinforcement learning. In *Proceedings of the 32nd Conference on Neural Information Processing Systems*.

Hsu, William H., Scott J. Harmon, Edwin Rodriguez, and Christopher Zhong. "Empirical comparison of incremental reuse strategies in genetic programming for keep-away soccer." In *Late Breaking Papers at the* 2004 *Genetic and Evolutionary Computation Conference, Seattle, Wash., USA*, vol. 26. 2004.

Hsu, William H., Scott J. Harmon, Edwin Rodriguez, and Christopher A. Zhong. "Empirical Comparison of Incremental Learning Strategies for Genetic Programming-Based Keep-Away Soccer Agents." In *Proceedings of the AAAI Fall Symposium on Learning Multi-Agent Systems*. 2004.

Huang, Chen, Simon Lucey, and Deva Ramanan. "Learning policies for adaptive tracking with deep feature cascades." *arXiv preprint arXiv:*1708.02973 (2017).

Hwangbo, Jemin, Inkyu Sa, Roland Siegwart, and Marco Hutter. "Control of a quadrotor with reinforcement learning." *IEEE Robotics and Automation Letters* 2, no. 4 (2017): 2096-2103.

Ipek, Engin, Onur Mutlu, José F. Martínez, and Rich Caruana. "Self-optimizing memory controllers: A reinforcement learning approach." In *Computer Architecture, 2008. ISCA'08. 35th International Symposium on*, pp. 39-50. IEEE, 2008.

Jaakkola, Tommi, Satinder P. Singh, and Michael I. Jordan. "Reinforcement learning algorithm for partially observable Markov decision problems." In *Advances in neural information processing systems*, pp. 345-352. 1995.

Janarthanam, Srinivasan, and Oliver Lemon. "A two-tier user simulation model for reinforcement learning of adaptive referring expression generation policies." In *Proceedings of the SIGDIAL* 2009 *Conference: The* 10*th Annual Meeting of the Special Interest Group on Discourse and Dialogue*, pp. 120-123. Association for Computational Linguistics, 2009.

Jaynes, E. T. (1957). "Information theory and statistical mechanics" (PDF). Physical Review. 106: 620-630. Bibcode:1957PhRv . . . 106 . . . 620J. doi:10.1103/physrev.106.620.

Jaynes, E. T. (1957). "Information theory and statistical mechanics II" (PDF). Physical Review. 108: 171-190. Bibcode:1957PhRv . . . 108 . . . 171J. doi:10.1103/physrev.108.171.

Jeffreys, H. (1946). "An invariant form for the prior probability in estimation problems". Proceedings of the Royal Society of London, Series A. 186: 453-461. Bibcode: 1946RSPSA.1 86 . . . 453J. doi:10.1098/rspa.1946.0056. JSTOR 97883.

Jiang, He, Huaguang Zhang, Yang Liu, and Ji Han. "Neural-network-based control scheme for a class of nonlinear systems with actuator faults via data-driven reinforcement learning method." *Neurocomputing* 239 (2017): 1-8.

Jiang, N., and Li, L. 2016. Doubly robust off-policy value evaluation for reinforcement learning. In Proceedings of the 33rd International Conference on Machine Learning, 652-661.

Jilk, David J., Seth J. Herd, Stephen J. Read, and Randall C. O'Reilly. "Anthropomorphic reasoning about neuromorphic AGI safety." *Journal of Experimental & Theoretical Artificial Intelligence* 29, no. 6 (2017): 1337-1351.

Jouffe, Lionel. "Fuzzy inference system learning by reinforcement methods." *IEEE Transactions on Systems, Man, and Cybernetics, Part C (Applications and Reviews)* 28, no. 3 (1998): 338-355.

Kaelbling, Leslie Pack, Michael L. Littman, and Andrew W. Moore. "Reinforcement learning: A survey." *Journal of artificial intelligence research* 4 (1996): 237-285.

Kaelbling, Leslie Pack, Michael L. Littman, and Anthony R. Cassandra. "Planning and acting in partially observable stochastic domains." *Artificial intelligence* 101, no. 1 (1998): 99-134.

Kahn, Gregory, Tianhao Zhang, Sergey Levine, and Pieter Abbeel. "Plato: Policy learning using adaptive trajectory optimization." In *Robotics and Automation (ICRA)*, 2017 *IEEE International Conference on*, pp. 3342-3349. IEEE, 2017.

Kakade, S. 2002. A natural policy gradient. In *Advances in Neural Information Processing Systems*, 1057-1063. MIT Press.

Kakade, Sham M. "A natural policy gradient." In *Advances in neural information processing systems*, pp. 1531-1538. 2002.

Kakade, Sham Machandranath. "On the sample complexity of reinforcement learning." PhD diss., University of London, 2003.

Kakade, Sham, and John Langford. "Approximately optimal approximate reinforcement learning." In *ICML*, vol. 2, pp. 267-274. 2002.

Kearns, Michael, and Satinder Singh. "Near-optimal reinforcement learning in polynomial time." *Machine Learning* 49, no. 2-3 (2002): 209-232.

Kimura, Hajime, Kazuteru Miyazaki, and Shigenobu Kobayashi. "Reinforcement learning in POMDPs with function approximation." In *ICML*, vol. 97, pp. 152-160. 1997.

Kingma, D. P., and Welling, M. 2014. Auto-encoding variational bayes. In *International Conference on Learning Representations*.

Kiumarsi, Bahare, Frank L. Lewis, and Zhong-Ping Jiang. "H∞ control of linear discrete-time systems: Off-policy reinforcement learning." *Automatica* 78 (2017): 144-152.

Kober, Jens, and Jan R. Peters. "Policy search for motor primitives in robotics." In *Advances in neural information processing systems*, pp. 849-856. 2009.

Kober, Jens, Andreas Wilhelm, Erhan Oztop, and Jan Peters. "Reinforcement learning to adjust parametrized motor primitives to new situations." *Autonomous Robots* 33, no. 4 (2012): 361-379.

Kober, Jens, Erhan Öztop, and Jan Peters. "Reinforcement learning to adjust robot movements to new situations." In *IJCAI Proceedings-International Joint Conference on Artificial Intelligence*, vol. 22, no. 3, p. 2650. 2011.

Kober, Jens, J. Andrew Bagnell, and Jan Peters. "Reinforcement learning in robotics: A survey." *The International Journal of Robotics Research* 32, no. 11 (2013): 1238-1274.

Kohl, Nate, and Peter Stone. "Policy gradient reinforcement learning for fast quadrupedal locomotion." In *Robotics and Automation, 2004. Proceedings. ICRA '04. 2004 IEEE International Conference on*, vol. 3, pp. 2619-2624. IEEE, 2004.

Konidaris, G.; Osentoski, S.; and Thomas, P. S. 2011. Value function approximation in reinforcement learning using the fourier basis. In *AAAI*, volume 6, 7.

Konidaris, George, and Andrew G. Barto. "Building Portable Options: Skill Transfer in Reinforcement Learning." In *IJCAI*, vol. 7, pp. 895-900. 2007.

Kormushev, Petar, Sylvain Calinon, and Darwin G. Caldwell. "Robot motor skill coordination with EM-based reinforcement learning." In *Intelligent Robots and Systems (IROS), 2010 IEEE/RSJ International Conference on*, pp. 3232-3237. IEEE, 2010.

Kullback, S. (1959), Information Theory and Statistics, John Wiley & Sons. Republished by Dover Publications in 1968; reprinted in 1978: ISBN 0-8446-5625-9.

Kullback, S. (1987). "Letter to the Editor: The Kullback-Leibler distance". The American Statistician. 41 (4): 340-341. doi:10.1080/00031305.1987. Ser. No. 10/475,510. JSTOR 2684769.

Kullback, S.; Leibler, R. A. (1951). "On information and sufficiency". Annals of Mathematical Statistics. 22 (1): 79-86. doi:10.1214/aoms/1177729694. MR 0039968.

Kwok, Cody, and Dieter Fox. "Reinforcement learning for sensing strategies." In *Intelligent Robots and Systems, 2004. (IROS 2004). Proceedings. 2004 IEEE/RSJ International Conference on*, vol. 4, pp. 3158-3163. IEEE, 2004.

Lagoudakis, Michail G., and Ronald Parr. "Least-squares policy iteration." *Journal of machine learning research* 4, no. December (2003): 1107-1149.

Lagoudakis, Michail G., and Ronald Parr. "Reinforcement learning as classification: Leveraging modern classifiers." In *Proceedings of the 20th International Conference on Machine Learning (ICML-03)*, pp. 424-431. 2003.

Lagoudakis, Michail, Ronald Parr, and Michael Littman. "Least-squares methods in reinforcement learning for control." *Methods and Applications of Artificial Intelligence* (2002): 752-752.

Lanctot, Marc, Vinicius Zambaldi, Audrunas Gruslys, Angeliki Lazaridou, Julien Perolat, David Silver, and Thore Graepel. "A unified game-theoretic approach to multiagent reinforcement learning." In *Advances in Neural Information Processing Systems*, pp. 4193-4206. 2017.

Lee, J.; Jang, Y.; Poupart, P.; and Kim, K. 2017. Constrained Bayesian reinforcement learning via approximate linear programming. In Proceedings of the 26th International Joint Conference on Artifical Intelligence, 2088-2095.

Lee, Jae Young, and Richard S. Sutton. "Integral Policy Iterations for Reinforcement Learning Problems in Continuous Time and Space." *arXiv preprint arXiv:1705.03520* (2017).

Lehnert, Lucas, Stefanie Tellex, and Michael L. Littman. "Advantages and Limitations of using Successor Features for Transfer in Reinforcement Learning." *arXiv preprint arXiv:1708.00102* (2017).

Levine, Sergey, and Pieter Abbeel. "Learning neural network policies with guided policy search under unknown dynamics." In *Advances in Neural Information Processing Systems*, pp. 1071-1079. 2014.

Levine, Sergey, Chelsea Finn, Trevor Darrell, and Pieter Abbeel. "End-to-end training of deep visuomotor policies." *Journal of Machine Learning Research* 17, no. 39 (2016): 1-40.

Lewis, Frank L., and Kyriakos G. Vamvoudakis. "Reinforcement learning for partially observable dynamic processes: Adaptive dynamic programming using measured output data." *IEEE Transactions on Systems, Man, and Cybernetics, Part B (Cybernetics)* 41, no. 1 (2011): 14-25.

Lewis, Frank L., Draguna Vrabie, and Kyriakos G. Vamvoudakis. "Reinforcement learning and feedback control: Using natural decision methods to design optimal adaptive controllers." *IEEE Control Systems* 32, no. 6 (2012): 76-105.

Li, Hongliang, Derong Liu, and Ding Wang. "Manifold Regularized Reinforcement Learning." *IEEE Transactions on Neural Networks and Learning Systems* (2017).

Lin, Long-H. "Self-improving reactive agents based on reinforcement learning, planning and teaching." *Machine learning* 8, no. 3/4 (1992): 69-97.

Lin, Long-Ji. *Reinforcement learning for robots using neural networks*. No. CMU-CS-93-103. Carnegie-Mellon Univ Pittsburgh Pa. School of Computer *Science*, 1993.

Littman, Michael L., Thomas L. Dean, and Leslie Pack Kaelbling. "On the complexity of solving Markov decision problems." In *Proceedings of the Eleventh conference on Uncertainty in artificial intelligence*, pp. 394-402. Morgan Kaufmann Publishers Inc., 1995.

Littman, Michael, and Justin Boyan. "A distributed reinforcement learning scheme for network routing." In *Proceedings of the international workshop on applications of neural networks to telecommunications*, pp. 45-51. Psychology Press, 1993.

Liu, H.; Feng, Y.; Mao, Y.; Zhou, D.; Peng, J.; and Liu, Q. 2018. Action-dependent control variates for policy optimization via stein's identity. In *International Conference on Learning Representations*.

Liu, Yan, Alexandru Niculescu-Mizil, and Wojciech Gryc. "Topic-link LDA: joint models of topic and author community." In *proceedings of the 26th annual international conference on machine learning*, pp. 665-672. ACM, 2009.

Machado, Marlos C., Marc G. Bellemare, and Michael Bowling. "A Laplacian Framework for Option Discovery in Reinforcement Learning." arXiv preprint arXiv:17030.00956(2017).

MacKay, David J. C. (2003). Information Theory, Inference, and Learning Algorithms (First ed.). Cambridge University Press. p. 34.

Maei, Hamid; Szepesvári, Csaba; Bhatnagar, Shalabh; and Sutton, Richard. Toward off-policy learning control with function approximation. In proceedings of the 27th International Conference on Machine Learning, pages 719-726, 2010.

Mahadevan, Sridhar, Nicholas Marchalleck, Tapas K. Das, and Abhijit Gosavi. "Self-improving factory simulation using continuous-time average-reward reinforcement learning." In *Machine Learning-International Workshop Then Conference-*, pp. 202-210. Morgan Kaufmann Publishers, Inc., 1997.

Mahadevan, Sridhar. "Average reward reinforcement learning: Foundations, algorithms, and empirical results." *Machine learning* 22, no. 1 (1996): 159-195.

Martino, L.; Elvira, V.; Luengo, D.; Corander, J. (2015-08-01). "An Adaptive Population Importance Sampler: Learning From Uncertainty". IEEE Transactions on Signal Processing. 63 (16): 4422-4437. doi:10.1109/TSP.2015.2440215. ISSN 1053-587X.

Martino, L.; Elvira, V.; Luengo, D.; Corander, J. (2017-05-01). "Layered adaptive importance sampling". Statistics and Computing. 27 (3): 599-623. doi:10.1007/s11222-016-9642-5. ISSN 0960-3174.

Martino, Luca; Elvira, Victor; Louzada, Francisco. "Effective sample size for importance sampling based on discrepancy measures". Signal Processing. 131: 386-401. doi:10.1016/j.sigpro.2016.08.025.

McCallum, Thomas Edward Reid. "Understanding how Knowledge is exploited in Ant Algorithms." (2005).

McGovern, Amy, and Andrew G. Barto. "Automatic discovery of subgoals in reinforcement learning using diverse density." *Computer Science Department Faculty Publication Series* (2001): 8.

Melo, Francisco S. "Convergence of Q-learning: A simple proof." Institute Of Systems and Robotics, Tech. Rep (2001): 1-4.

Menache, Ishai, Shie Mannor, and Nahum Shimkin. "Basis function adaptation in temporal difference reinforcement learning." *Annals of Operations Research* 134, no. 1 (2005): 215-238.

Menache, Ishai, Shie Mannor, and Nahum Shimkin. "Q-cut-dynamic discovery of sub-goals in reinforcement learning." In *ECML*, vol. 14, pp. 295-306. 2002.

Merrick, Kathryn E., Kamran Shafi, and Amitay Isaacs. "Using Approach-Avoidance Motivation to Model Adaptive Social-Forces in Artificial Agents." In *and Learning Agents Workshop* 2011, p. 83. 2011.

Mirjalili, Seyedali, Seyed Mohammad Mirjalili, and Andrew Lewis. "Let a biogeography-based optimizer train your multi-layer perceptron." *Information Sciences* 269 (2014): 188-209.

Mnih, Andriy, and Karol Gregor. "Neural variational inference and learning in belief networks." arXiv preprint arXiv:1402.0030 (2014).

Mnih, Volodymyr, Adria Puigdomenech Badia, Mehdi Mirza, Alex Graves, Timothy Lillicrap, Tim Harley, David Silver, and Koray Kavukcuoglu. "Asynchronous methods for deep reinforcement learning." In *International Conference on Machine Learning*, pp. 1928-1937. 2016.

Mnih, Volodymyr, Koray Kavukcuoglu, David Silver, Alex Graves, Ioannis Antonoglou, Daan Wierstra, and Martin Riedmiller. "Playing Atari with deep reinforcement learning." arXiv preprint arXiv:1312.5602 (2013).

Mnih, Volodymyr, Koray Kavukcuoglu, David Silver, Andrei A. Rusu, Joel Veness, Marc G. Bellemare, Alex Graves et al. "Human-level control through deep reinforcement learning." *Nature* 518, no. 7540 (2015): 529-533.

Moldovan, T. M., and Abbeel, P. 2012. Safe exploration in markov decision processes. In Proceedings of the 29th International Conference on Machine Learning, 1451-1458.

Montgomery, William, Anurag Ajay, Chelsea Finn, Pieter Abbeel, and Sergey Levine. "Reset-free guided policy search: efficient deep reinforcement learning with stochastic initial states." In *Robotics and Automation (ICRA), 2017 IEEE International Conference on*, pp. 3373-3380. IEEE, 2017.

Novak S. Y. (2011), Extreme Value Methods with Applications to Finance ch. 14.5 (Chapman & Hall). ISBN 978-1-4398-3574-6.

Okdinawati, Liane, Togar M. Simatupang, and Yos Sunityoso. "Multi-agent Reinforcement Learning for Collaborative Transportation Management (CTM)." In *Agent-Based Approaches in Economics and Social Complex Systems IX*, pp. 123-136. Springer, Singapore, 2017.

Osband, I.; Blundell, C.; Pritzel, A.; and Van Roy, B. 2016. Deep exploration via bootstrapped DQN. In Proceedings of the 30th Conference on Neural Information Processing Systems, 4026-4034.

Owen, Art; Associate, Yi Zhou (2000-03-01). "Safe and Effective Importance Sampling". Journal of the American Statistical Association. 95 (449): 135-143. doi:10.1080/01621459.2000. Ser. No. 10/473,909. ISSN 0162-1459.

Parr, Ronald, Lihong Li, Gavin Taylor, Christopher Painter-Wakefield, and Michael L. Littman. "An analysis of linear models, linear value-function approximation, and feature selection for reinforcement learning." In *Proceedings of the 25th international conference on Machine learning*, pp. 752-759. ACM, 2008.

Peng, Xue Bin, Glen Berseth, KangKang Yin, and Michiel Van De Panne. "Deeploco: Dynamic locomotion skills using hierarchical deep reinforcement learning." *ACM Transactions on Graphics* (TOG) 36, no. 4 (2017): 41.

Perez, Diego, Edward J. Powley, Daniel Whitehouse, Philipp Rohlfshagen, Spyridon Samothrakis, Peter I. Cowling, and Simon M. Lucas. "Solving the physical traveling salesman problem: Tree search and macro actions." *IEEE Transactions on Computational Intelligence and AI in Games* 6, no. 1 (2014): 31-45.

Perez, Diego. "Adaptive Controllers for Real-Time Games." Ph. D. Thesis, University of Essex (2015).

Peters, Jan, and Stefan Schaal. "Natural actor-critic." Neurocomputing 71, no. 7 (2008): 1180-1190.

Peters, Jan, and Stefan Schaal. "Reinforcement learning of motor skills with policy gradients." *Neural networks* 21, no. 4 (2008): 682-697.

Peters, Jan, Katharina Mulling, and Yasemin Altun. "Relative Entropy Policy Search." In *AAAI*, pp. 1607-1612. 2010.

Peters, Jan, Sethu Vijayakumar, and Stefan Schaal. "Natural actor-critic." In *European Conference on Machine Learning*, pp. 280-291. Springer, Berlin, Heidelberg, 2005.

Peters, Jan, Sethu Vijayakumar, and Stefan Schaal. "Reinforcement learning for humanoid robotics." In *Proceedings of the third IEEE-RAS international conference on humanoid robots, pp. 1-20. 2003.

Petrik, M.; Ghavamzadeh, M.; and Chow, Y. 2016. Safe policy improvement by minimizing robust baseline regret. In Proceedings of the 30th Conference on Neural Information Processing Systems, 2298-2306.

Pirotta, M.; Restelli, M.; Pecorino, A.; and Calandriello, D. 2013. Safe policy iteration. In Proceedings of the 30th International Conference on Machine Learning, 307-315.

Plappert, M.; Houthooft, R.; Dhariwal, P.; Sidor, S.; Chen, R.; Chen, X.; Asfour, T.; Abbeel, P.; and Andrychowicz, M. 2018. Parameter space noise for exploration. In *International Conference on Learning Representations*.

Precup, D.; Sutton, R. S.; and Singh, S. 2000. Eligibility traces for off-policy policy evaluation. Proceedings of the 17th International Conference on Machine Learning 759-766.

Precup, Doina, Richard S. Sutton, and Satinder Singh. "Theoretical results on reinforcement learning with temporally abstract options." In *European conference on machine learning*, pp. 382-393. Springer, Berlin, Heidelberg, 1998.

Press, W. H.; Teukolsky, S. A.; Vetterling, W. T.; Flannery, B. P. (2007). "Section 14.7.2. Kullback-Leibler Distance". Numerical Recipes: The Art of Scientific Computing (3rd ed.). Cambridge University Press. ISBN 978-0-521-88068-8.

Puterman, M. 1994. Markov decision processes: Discrete stochastic dynamic programming. John Wiley & Sons, Inc. New York, N.Y., USA.

Puterman, M. L. 2009. Markov decision processes: discrete stochastic dynamic programming, volume 414. Wiley-Interscience.

Ramachandran, Deepak, and Eyal Amir. "Bayesian inverse reinforcement learning." *Urbana* 51, no. 61801 (2007): 1-4.

Rasmussen, Carl Edward, and Malte Kuss. "Gaussian Processes in Reinforcement Learning." In *NIPS*, vol. 4, p. 1. 2003.

Rawlik, Konrad, Marc Toussaint, and Sethu Vijayakumar. "On stochastic optimal control and reinforcement learning by approximate inference." In *Robotics: science and systems*. 2012.

Rennie, Jason, and Andrew McCallum. "Using reinforcement learning to spider the web efficiently." In *ICML*, vol. 99, pp. 335-343. 1999.

Rényi A. (1970). Probability Theory. Elsevier. Appendix, Sec. 4. ISBN 0-486-45867-9.

Rényi, A. (1961), "On measures of entropy and information" (PDF), Proceedings of the 4th Berkeley Symposium on Mathematics, *Statistics and Probability* 1960, pp. 547-561.

Riedmiller, Martin, Thomas Gabel, Roland Hafner, and Sascha Lange. "Reinforcement learning for robot soccer." *Autonomous Robots* 27, no. 1 (2009): 55-73.

Rosen-Zvi, Michal, Thomas Griffiths, Mark Steyvers, and Padhraic Smyth. "The author-topic model for authors and documents." In *Proceedings of the 20th conference on Uncertainty in artificial intelligence*, pp. 487-494. AUAI Press, 2004.

Roy, Nicholas, and Geoffrey J. Gordon. "Exponential family PCA for belief compression in POMDPs." In *Advances in Neural Information Processing Systems*, pp. 1667-1674. 2003.

Rubinstein, R. Y., & Kroese, D. P. (2011). Simulation and the Monte Carlo method (Vol. 707). John Wiley & Sons.

Rubner, Y.; Tomasi, C.; Guibas, L. J. (2000). "The earth mover's distance as a metric for image retrieval". International Journal of Computer Vision. 40 (2): 99-121.

Russell, Stuart J.; Peter Norvig (2010). Artificial Intelligence: A Modern Approach (Third ed.). Prentice Hall. p. 649. ISBN 978-0136042594.

Salimans, T.; Ho, J.; Chen, X.; and Sutskever, I. 2017. Evolution strategies as a scalable alternative to reinforcement learning. In *arXiv preprint arXiv:*1703.03864.

Sanov, I. N. (1957). "On the probability of large deviations of random magnitudes". Matem. Sbornik. 42 (84): 11-44.

Schulman, John, Sergey Levine, Pieter Abbeel, Michael Jordan, and Philipp Moritz. "Trust region policy optimization." In *Proceedings of the 32nd International Conference on Machine Learning (ICML-15)*, pp. 1889-1897. 2015.

Schwartz, Anton. "A reinforcement learning method for maximizing undiscounted rewards." In *Proceedings of the tenth international conference on machine learning*, vol. 298, pp. 298-305. 1993.

Sehnke, F.; Osendorfer, C.; Rckstie, T.; Peters, J.; and Schmidhuber, J. 2010. Parameter-exploring policy gradients. In *Neural Networks*, volume 23, 551-559.

Settles, Burr. "Active learning." Synthesis Lectures on Artificial Intelligence and Machine Learning 6, no. 1 (2012): 1-114.

Severinghaus, Robert, Murali Tummala, and John McEachen. "Networks for maintaining system-level availability for an exploring robot." *IEEE Systems Journal* 9, no. 1 (2015): 98-106.

Shteingart, H; Neiman, T; Loewenstein, Y (May 2013). "The Role of First Impression in Operant Learning". J Exp Psychol Gen. 142 (2): 476-88. doi:10.1037/a0029550. PMID 22924882.

Sigaud, Olivier, and Olivier Buffet, eds. *Markov decision processes in artificial intelligence*. John Wiley & Sons, 2013.

Smart, William D., and L. Pack Kaelbling. "Effective reinforcement learning for mobile robots." In *Robotics and Automation, 2002. Proceedings. ICRA '02. IEEE International Conference on*, vol. 4, pp. 3404-3410. IEEE, 2002.

Song, Ruizhuo, Frank L. Lewis, and Qinglai Wei. "Off-Policy Integral Reinforcement Learning Method to Solve Nonlinear Continuous-Time Multiplayer Nonzero-Sum Games." *IEEE transactions on neural networks and learning systems* 28, no. 3 (2017): 704-713.

Stone, Peter, and Manuela Veloso. "Team-partitioned, opaque-transition reinforcement learning." In *Proceedings of the third annual conference on Autonomous Agents*, pp. 206-212. ACM, 1999.

Stone, Peter, Richard S. Sutton, and Gregory Kuhlmann. "Reinforcement learning for robocup soccer keepaway." *Adaptive Behavior* 13, no. 3 (2005): 165-188.

Strehl, Alexander L.; Li, Lihong; Wiewiora, Eric; Langford, John; and Littman, Michael L. Pac model-free reinforcement learning. In Proc. 22nd ICML 2006, pages 881-888, 2006.

Stulp, Freek, and Olivier Sigaud. "Path integral policy improvement with covariance matrix adaptation." *arXiv preprint arXiv:*1206.4621 (2012).

Such, Felipe Petroski, Vashisht Madhavan, Edoardo Conti, Joel Lehman, Kenneth O. Stanley, and Jeff Clune. "Deep Neuroevolution: Genetic Algorithms Are a Competitive Alternative for Training Deep Neural Networks for Reinforcement Learning." *arXiv preprint arXiv:*1712.06567 (2017).

Sugiyama, Masashi, Matthias Krauledat, and Klaus-Robert Müller. "Covariate shift adaptation by importance weighted cross validation." *Journal of Machine Learning Research* 8, no. May (2007): 985-1005.

Sugiyama, Masashi, Shinichi Nakajima, Hisashi Kashima, Paul V. Buenau, and Motoaki Kawanabe. "Direct importance estimation with model selection and its application to covariate shift adaptation." In *Advances in neural information processing systems*, pp. 1433-1440. 2008.

Sun, Ruoying, Gang Zhao, Chen Li, and Shoji Tatsumi. "Comparison of Different ACS Methods and Analysis about Efficiency of Novel ACS Approaches." In *IEEE Industrial Electronics, IECON 2006-32nd Annual Conference on*, pp. 3627-3632. IEEE, 2006.

Sun, Ruoying, Shoji Tatsumi, and Gang Zhao. "Multiagent cooperating learning methods by indirect media communication." *IEICE transactions on fundamentals of electronics, communications and computer sciences* 86, no. 11 (2003): 2868-2878.

Sutton, R. S., and Barto, A. G. 1998. Reinforcement Learning: An Introduction. The MIT Press. 1998.

Sutton, Richard S. "Generalization in reinforcement learning: Successful examples using sparse coarse coding." In *Advances in neural information processing systems*, pp. 1038-1044. 1996.

Sutton, Richard S., David A. McAllester, Satinder P. Singh, and Yishay Mansour. "Policy gradient methods for reinforcement learning with function approximation." In *Advances in neural information processing systems*, pp. 1057-1063. 2000.

Sutton, Richard S., Doina Precup, and Satinder Singh. "Between MDPs and semi-MDPs: A framework for temporal abstraction in reinforcement learning." *Artificial intelligence* 112, no. 1-2 (1999): 181-211.

Sutton, Richard Stuart. "Temporal credit assignment in reinforcement learning." (1984).

Szepesvári, Csaba. "Algorithms for reinforcement learning." *Synthesis lectures on artificial intelligence and machine learning* 4, no. 1 (2010): 1-103.

Tan, Ming. "Multi-agent reinforcement learning: Independent vs. cooperative agents." In *Proceedings of the tenth international conference on machine learning*, pp. 330-337. 1993.

Tang, Haoran, Rein Houthooft, Davis Foote, Adam Stooke, OpenAI Xi Chen, Yan Duan, John Schulman, Filip DeTurck, and Pieter Abbeel. "#Exploration: A Study of Count-Based Exploration for Deep Reinforcement Learning." In *Advances in Neural Information Processing Systems*, pp. 2750-2759. 2017.

Tani, Jun, and Jun Yamamoto. "On the dynamics of robot exploration learning." *Cognitive Systems Research* 3, no. 3 (2002): 459-470.

Tani, Jun, and Yuya Sugita. "On the Dynamics of Robot Exploration." In Advances in Artificial Life: 5th European Conference, European Conference on Artificial Life, Lausanne, Switzerland, Sep. 13-17, 1999 Proceedings, p. 279. Springer Science & Business Media, Berlin, Heidelberg.

Tani, Jun. "Self-Organization of Behavioral Contexts in Dynamic Exploration and Learning of Robots." (1999).

Taylor, Matthew E., and Peter Stone. "Transfer learning for reinforcement learning domains: A survey." *Journal of Machine Learning Research* 10, no. July (2009): 1633-1685.

Teh, Yee, Victor Bapst, Wojciech M. Czarnecki, John Quan, James Kirkpatrick, Raia Hadsell, Nicolas Heess, and Razvan Pascanu. "Distral: Robust multitask reinforcement learning." In *Advances in Neural Information Processing Systems*, pp. 4499-4509. 2017.

Tesauro, Gerald (March 1995). "Temporal Difference Learning and TD-Gammon". Communications of the ACM. 38 (3). doi:10.1145/203330.203343.

Tesauro, Gerald, and Gregory R. Galperin. "On-line policy improvement using Monte-Carlo search." In *Advances in Neural Information Processing Systems*, pp. 1068-1074. 1997.

Tesauro, Gerald, Nicholas K. Jong, Rajarshi Das, and Mohamed N. Bennani. "A hybrid reinforcement learning approach to autonomic resource allocation." In *Autonomic Computing, 2006. ICAC'06. IEEE International Conference on*, pp. 65-73. IEEE, 2006.

Tesauro, Gerald, Nicholas K. Jong, Rajarshi Das, and Mohamed N. Bennani. "On the use of hybrid reinforcement learning for autonomic resource allocation." *Cluster Computing* 10, no. 3 (2007): 287-299.

Tesauro, Gerald. "Reinforcement learning in autonomic computing: A manifesto and case studies." *IEEE Internet Computing* 11, no. 1 (2007).

Theodorou, Evangelos, Jonas Buchli, and Stefan Schaal. "A generalized path integral control approach to reinforcement learning." *Journal of Machine Learning Research* 11, no. November (2010): 3137-3181.

Theodorou, Evangelos, Jonas Buchli, and Stefan Schaal. "Learning policy improvements with path integrals." In *Proceedings of the Thirteenth International Conference on Artificial Intelligence and Statistics*, pp. 828-835. 2010.

Theodorou, Evangelos, Jonas Buchli, and Stefan Schaal. "Reinforcement learning of motor skills in high dimensions: A path integral approach." In *Robotics and Automation (ICRA), 2010 IEEE International Conference on*, pp. 2397-2403. IEEE, 2010.

Thomas, P., and Brunskill, E. 2016. Data-efficient off-policy policy evaluation for reinforcement learning. In Proceedings of the Thirty-Third International Conference on Machine Learning, 2139-2148.

Thomas, P.; Theocharous, G.; and Ghavamzadeh, M. 2015a. High confidence off-policy evaluation. In Proceedings of the Twenty-Ninth Conference on Artificial Intelligence, 3000-3006.

Thomas, P.; Theocharous, G.; and Ghavamzadeh, M. 2015b. High confidence policy improvement. In Proceedings of the Thirty-Second International Conference on Machine Learning, 2380-2388.

Thrun, Sebastian. "Monte carlo pomdps." In *Advances in neural information processing systems*, pp. 1064-1070. 2000.

Todorov, E.; Erez, T.; and Tassa, Y. 2012. Mujoco: A physics engine for model-based control. In *Intelligent Robots and Systems (IROS), 2012 IEEE/RSJ International Conference on*, 5026-5033. IEEE.

Todorov, Emanuel. "Efficient computation of optimal actions." *Proceedings of the national academy of sciences* 106, no. 28 (2009): 11478-11483.

Todorov, Emanuel. "Linearly-solvable Markov decision problems." In *Advances in neural information processing systems*, pp. 1369-1376. 2007.

Tribus, M.; McIrvine, E. C. (1971). "Energy and information". Scientific American. 224: 179-186. doi:10.1038/scientificamerican0971-179.

Tribus, Myron, (1961), Thermodynamics and Thermostatics (D. Van Nostrand, N.Y.).

Turchetta, M.; Berkenkamp, F.; and Krause, A. 2016. Safe exploration in finite markov decision processes with gaussian processes. In Proceedings of 30th Conference on Neural Information Processing Systems, 4312-4320.

van Hasselt, Hado (2011). "Double Q-learning" (PDF). Advances in Neural Information Processing Systems. 23: 2613-2622.

van Hasselt, Hado. Reinforcement Learning in Continuous State and Action Spaces. In: Reinforcement Learning: State of the Art, Springer, pages 207-251, 2012 van Hasselt, Hado; Guez, Arthur; Silver, David (2015). "Deep reinforcement learning with double Q-learning". AAAI Conference on Artificial Intelligence: 2094-2100.

Veach, Eric; Guibas, Leonidas J. (1995-01-01). "Optimally Combining Sampling Techniques for Monte Carlo Rendering". Proceedings of the 22Nd Annual Conference on Computer Graphics and Interactive Techniques. SIGGRAPH '95. New York, N.Y., USA: ACM: 419-428. doi:10.1145/218380.218498. ISBN 0-89791-701-4.

Vengerov, David. "A reinforcement learning approach to dynamic resource allocation." *Engineering Applications of Artificial Intelligence* 20, no. 3 (2007): 383-390.

Verdú, Sergio "differential entropy −4", Relative Entropy video lecture, NIPS 2009.

Vezhnevets, Alexander Sasha, Simon Osindero, Tom Schaul, Nicolas Heess, Max Jaderberg, David Silver, and Koray Kavukcuoglu. "Feudal networks for hierarchical reinforcement learning." *arXiv preprint arXiv:*1703.01161 (2017).

Vincent, François-Lavet; Fonteneau, Raphael; Ernst, Damien. "How to Discount Deep Reinforcement Learning: Towards New Dynamic Strategies". NIPS, Deep RL workshop 2015.

Wang, Y.; Agarwal, A.; and Dudik, M. 2017. Optimal and adaptive off-policy evaluation in contextual bandits. In Proceedings of the Thirty-Fourth International Conference on Machine Learning, 3589-3597.

Wang, Ziyu, Tom Schaul, Matteo Hessel, Hado Van Hasselt, Marc Lanctot, and Nando De Freitas. "Dueling network architectures for deep reinforcement learning." *arXiv preprint arXiv:*1511.06581 (2015).

Watkins, C. J. C. H., (1989), Learning from Delayed Rewards. Ph.D. thesis, Cambridge University.

Wiering, Marco A. "Explorations in efficient reinforcement learning." PhD diss., University of Amsterdam, 1999.

Wierstra, D.; Schaul, T.; Glasmachers, T.; Sun, Y.; Peters, J.; and Schmidhuber, J. 2014. Natural evolution strategies. In *Journal of Machine Learning Research,* 949-980.

Wright, S., and Nocedal, J., eds. 1999. *Numerical Optimization.* New York, N.Y.: Springer.

Wu, Y.; Mansimov, E.; Grosse, R.; Liao, S.; and Ba, J. 2017. Scalable trust-region method for deep reinforcement learning using kronecker-factored approximation. In *Advances in Neural Information Processing Systems* 30, 5285-5294.

Wu, Yuhuai, Elman Mansimov, Roger B. Grosse, Shun Liao, and Jimmy Ba. "Scalable trust-region method for deep reinforcement learning using Kronecker-factored approximation." In *Advances in Neural Information Processing Systems,* pp. 5285-5294. 2017.

Xie, Junfei, Yan Wan, Kevin Mills, James J. Filliben, and Frank L. Lewis. "A Scalable Sampling Method to High-dimensional Uncertainties for Optimal and Reinforcement Learning-based Controls." *IEEE Control Systems Letters* (2017).

Xu, Xin, Dewen Hu, and Xicheng Lu. "Kernel-based least squares policy iteration for reinforcement learning." *IEEE Transactions on Neural Networks* 18, no. 4 (2007): 973-992.

Xu, Xin, Zhenhua Huang, Lei Zuo, and Haibo He. "Manifold-based reinforcement learning via locally linear reconstruction." *IEEE transactions on neural networks and learning systems* 28, no. 4 (2017): 934-947.

Yahya, Ali, Adrian Li, Mrinal Kalakrishnan, Yevgen Chebotar, and Sergey Levine. "Collective robot reinforcement learning with distributed asynchronous guided policy search." In *Intelligent Robots and Systems (IROS), 2017 IEEE/RSJ International Conference on,* pp. 79-86. IEEE, 2017.

Zhang, Huaguang, He Jiang, Yanhong Luo, and Geyang Xiao. "Data-driven optimal consensus control for discrete-time multi-agent systems with unknown dynamics using reinforcement learning method." *IEEE Transactions on Industrial Electronics* 64, no. 5 (2017): 4091-4100.

Zhang, Tianhao, Gregory Kahn, Sergey Levine, and Pieter Abbeel. "Learning deep control policies for autonomous aerial vehicles with mpc-guided policy search." In *Robotics and Automation (ICRA), 2016 IEEE International Conference on,* pp. 528-535. IEEE, 2016.

Zhang, Wei, and Thomas G. Dietterich. "A reinforcement learning approach to job-shop scheduling." In *IJCAI,* vol. 95, pp. 1114-1120. 1995.

Zhao, Gang, and Ruoying Sun. "Analysis about Efficiency of Indirect Media Communication on Multi-agent Cooperation Learning." In *Systems, Man and Cybernetics, 2006. SMC'06. IEEE International Conference on,* vol. 5, pp. 4180-4185. IEEE, 2006.

Zhu, Pengfei, Xin Li, and Pascal Poupart. "On Improving Deep Reinforcement Learning for POMDPs." *arXiv preprint arXiv:*1704.07978 (2017).

astrostatistics.psu.edu/su14/lectures/cisewski_is.pdf.
en.wikipedia.org/wiki/Importance_sampling.
en.wikipedia.org/wiki/Reinforcement_learning.
ib.berkeley.edu/labs/slatkin/eriq/classes/guest_lect/mc_lecture_notes.pdf.
ib.berkeley.edu/labs/slatkin/eriq/classes/guest_lect/mc_lecture_notes.pdf.
math.arizona.edu/~tgk/mc/book_chap6.pdf.
people.hss.caltech.edu/~mshum/gradio/simulation.pdf.
perso.telecom-paristech.fr/~bianchi/athens/LectIV_Imp-Sampling.pdf.
statweb.stanford.edu/~owen/mc/Ch-var-is.pdf.
webdocs.cs.ualberta.ca/~sutton/book/ebook/node21.html.
www.jstor.org/stable/2289294.

All references recited herein, are expressly incorporated herein by reference in its entirety. These incorporated references are presented for the purposes of demonstrating enablement to practice the invention, to demonstrate applications of the technology, which may be used with, or in place of, the technologies discussed in the references, to provide further discussion and background of the context of the invention and language used in the art to describe it, and all other purposes.

SUMMARY OF THE INVENTION

According to the present technology, a radically different approach to exploration is adopted, by performing exploration over the space of stochastic policies.

Diverse Exploration (DE) is employed, which learns and deploys a diverse set of safe policies to explore the environment. Following the insight that in almost all cases, there exist different safe policies with similar performance for complex problems, DE makes exploratory decisions at the "policy" level, and achieves exploration at little to no sacrifice to performance by searching policy space and "exploiting" multiple diverse policies that are safe according to current knowledge.

The present technology defines the FSI problem, and proposes a new exploration strategy DE as a solution. DE theory shows how diversity in behavior policies in one iteration promotes diversity in subsequent iterations, enabling effective exploration under uncertainty in the space of safe policies. The DE framework iteratively learns a diverse set of policies from a single batch of experience data and evaluates their quality through off-policy evaluation by importance sampling before deploying them. The proposed policies are compared to a baseline algorithm, referred to as SPI (safe policy improvement), which follows the same framework but only learns and deploys a single safe policy at every iteration.

Experiments on three domains show that the DE framework can achieve both safe performance and fast policy improvement.

Some recent studies on safe exploration (Garcia and Fernandez 2012; Moldovan and Abbeel 2012; Turchetta, Berkenkamp, and Krause 2016; Achiam et al. 2017; Lee et al. 2017) provide safety guarantees during exploration. Their notion of safety is to avoid unsafe states and actions which can cause catastrophic failures in safety critical applications. In contrast, the present technology employs a notion of safety defined at the policy level instead of the state and action level. A safe policy must perform at least as well as a baseline policy. A recent work on deep exploration (Osband et al. 2016) alluded to a similar idea of exploring the environment through a diverse set of policies, but it does not address the safety issue. Recent advances in approximate policy iteration have produced safe policy improvement methods such as conservative policy iteration (Kakade and Langford 2002) and its derivatives (Abbasi-Yadkori, Bartlett, and Wright 2016; Pirotta et al. 2013), and off-policy methods (Jiang and Li 2016; Petrik, Ghavamzadeh, and Chow 2016; Thomas, Theocharous, and Ghavamzadeh 2015b) which decide safe policies based on samples or model estimates from past behavior policies. These methods do not perform active exploration during policy improvement. Manipulating behavior distributions has been explored but with the objective to find an optimal behavior policy to use as a proposal policy for a known target policy (Hanna et al. 2017).

The present technology performs exploration in policy space, and has some relation to Diverse Exploration (DE) (Cohen, Yu, and Wright 2018) and use of parameter space noise for exploration (Plappert et al. 2018). The key insight of DE is that, in many domains, there exist multiple different policies at various levels of policy quality. Effective exploration can be achieved without sacrificing exploitation if an agent learns and deploys a set of diverse behavior policies within some policy performance constraint. Multiple parameterizations of "good" but, importantly, different policies exist in the local region of a main policy, a feature shared with PG methods, though distinct implementation and theoretical results are provided to a unique challenge in PG methods: to maximally explore local policy space in order to improve the gradient estimate while ensuring performance. Deploying a set of these policies increases the knowledge of the local region and can improve the gradient estimate in policy updates.

Parameter space noise for exploration (Plappert et al. 2018) can be thought of as a DE approach specific to the PG context. To achieve exploration, different behavior policies are generated by randomly perturbing policy parameters. To maintain the guarantees of the policy improvement step from the previous iteration, the magnitude of these perturbations has to be limited which inherently limits exploration. Thus, for effective exploration in PG methods, an optimal diversity objective is identified, and a principled approach of maximizing diversity employed. The present technology seeks DE by conjugate policies that maximize a theoretically justified Kullback-Leibler (KL) divergence objective for exploration in PG methods.

The present technology provides DE solution via conjugate policies for natural policy gradient (NPG) methods. DE learns and deploys a set of conjugate policies in the local region of policy space and follows the natural gradient descent direction during each policy improvement iteration. Further, it explains why DE via conjugate policies is effective in NPG methods. Theoretical results show that: (1) maximizing the diversity (in terms of KL divergence) among perturbed policies is inversely related to the variance of the perturbed gradient estimate, contributing to more accurate policy updates; and (2) conjugate policies generated by conjugate vectors maximize pairwise KL divergence among a constrained number of perturbations. In addition to justifying DE via conjugate policies, these theoretical results explain why parameter space noise (Plappert et al. 2018) improves upon NPG methods but is not optimal in terms of the maximum diversity objective.

Further, it develops a general algorithmic framework of DE via conjugate policies for NPG methods. The algorithm efficiently generates conjugate policies by taking advantage of conjugate vectors produced in each policy improvement iteration when computing the natural gradient descent direction. Experimental results based on Trust Region Policy Optimization (TRPO) (Schulman et al. 2015) on three continuous control domains show that TRPO with DE significantly outperforms the baseline TRPO as well as TRPO with random perturbations.

Therefore, it is an object according to the present technology to provide a system and method of learning and deploying a set of safe behavior policies selected from a set of behavior policies, each having a statistically expected return no worse than a lower bound of policy performance which excludes a portion of the set of behavior policies, for an autonomous agent, comprising iteratively improving a safe behavior policy for each iteration of policy improvement, employing a diverse exploration strategy which strives for behavior diversity in a space of stochastic policies by deploying a diverse set comprising a plurality of safe behavior policies during each iteration of policy improvement.

It is also an object to provide a system and method of operating a system according to reinforcement learning controller operating according to a behavior policy, comprising: determining a diverse set comprising a plurality of behavior policies for the reinforcement learning controller which each have a statistically expected return no worse than a policy performance of a prior policy, according to a diverse exploration algorithm which optimizes behavior diversity in a space of stochastic policies; filtering the diverse set of behavior policies based on a safety criterion to yield a set of safe behavior policies, which excludes a portion of the set of behavior policies; sequentially operating the reinforcement learning controller according to the set of safe behavior policies; analyzing, for each respective safe behavior policy of the set of safe behavior policies, a respective system state, a resulting system state following an action decided by the respective safe behavior policy, and a cost or reward signal assessing a performance of the respective safe behavior policy; and updating, based on said analyzing, the prior policy.

It is a further object to provide a system and method of operating a system according to reinforcement learning controller operating according to a behavior policy, comprising: determining a diverse set comprising a plurality of safe behavior policies for the reinforcement learning controller which each have a safety within a confidence bound and a statistically expected return no worse than a policy performance of a prior policy, according to a diverse exploration algorithm which optimizes behavior diversity in a space of stochastic policies; sequentially operating the reinforcement learning controller according to the diverse set of safe behavior policies; analyzing, for each respective safe behavior policy of the set of safe behavior policies, a respective system state, a resulting system state following an action decided by the respective safe behavior policy, and a cost or reward signal assessing a performance of the respective safe behavior policy; and updating, based on said analyzing, the prior policy.

It is a further object to provide a control method and system therefore, comprising: determining a set comprising safe behavior policies which each have a safety meeting a statistical confidence bound and a statistical expected return no worse than a policy performance of a prior policy, according to a diverse exploration algorithm; operating a controlled system according to a plurality of the safe behavior policies; analyzing a respective system state, a resulting system state following an action decided by the respective safe behavior policy, and a cost or reward signal assessing a performance, for each of a plurality of different safe behavior policies; and updating, based on said analyzing, the prior policy.

Another object provides a reinforcement learning system operating according to a behavior policy and corresponding method, comprising: at least one input representing a state of an environment of a controlled apparatus; at least one output representing a control signal for the controlled apparatus; and at least one automated processor, configured to implement a diverse exploration strategy for defining and deploying a set of safe policies, and then iteratively updating the base policy based on prior operation under control of the set of safe policies.

The diverse exploration strategy may determine a diverse set comprising a plurality of behavior policies for the reinforcement learning controller which each have a statistically expected return no worse than a policy performance of a prior policy, according to a diverse exploration algorithm which optimizes behavior diversity in a space of stochastic policies; and then filter the diverse set of behavior policies based on a safety criterion to yield a set of safe behavior policies, which excludes a portion of the set of behavior policies.

The diverse exploration strategy may also determine a diverse set comprising a plurality of safe behavior policies for the reinforcement learning controller which each have a safety within a confidence bound and a statistically expected return no worse than a policy performance of a prior policy, according to a diverse exploration algorithm which optimizes behavior diversity in a space of stochastic policies.

The policies may be deployed in series or parallel, or both (i.e., testing multiple instances in sequence).

The policy performance is analyzed, by considering, for each respective safe behavior policy of the set of safe behavior policies, a respective system state, a resulting system state following an action decided by the respective safe behavior policy, and a cost or reward signal assessing a performance of the respective safe behavior policy. The basis policy for the diverse exploration is then updated based on the analysis.

Each safe behavior policy may have a variance, and each diverse set has a predetermined average variance associated with the estimate of its performance by importance sampling in each of a plurality of policy improvement iterations.

Each of the policy performance and policy behavior diversity may be quantified according to a respective objective function.

The set of safe policies may comprise a plurality of policies predefined upon commencement of a respective single iteration of policy improvement.

The set of safe policies may comprise a plurality of policies which are adaptively defined based on policy performance within a respective single iteration of policy improvement. The adaptation may be based on a change in the lower bound of policy performance as a selection criterion for a subsequent safe policy within a respective single iteration of policy improvement.

The adaptation may be based on feedback of a system state received after deploying a prior safe policy within a respective single iteration of policy improvement.

The set of safe policies within a respective single iteration may be selected as a plurality of safe policies generated based on prior feedback, having maximum differences from each other.

The diversity of the set of safe policies may be determined according to a Kullback-Leibler (KL) divergence measure. See, en.wikipedia.org/wiki/Kullback-Leibler_divergence.

The set of safe policies within a respective single iteration may be selected as a plurality of safe policies generated based on prior feedback, having maximum differences from each other according to a KL-divergence measure. Safe policies within a respective iteration may be selected stochastically.

Each respective safe policy may represent a trained neural network. each safe policy may control an artificial neural network. See, en.wikipedia.org/wiki/Artificial_neural_network.

Safe policies within a respective iteration may be selected according to an aggregate group statistic. Safe policies may be generated by Q-learning. See, en.wikipedia.org/wiki/Q-learning.

Importance sampling within a confidence interval may be employed to select safe policies.

In each iteration of policy improvement, a data set may be collected representing an environment in a first number of dimensions, and the set of safe policies have a second number of dimensions less than the first number of dimensions.

The statistically expected return no worse than a lower bound of policy performance may be changed between iterations of policy improvement The statistically expected return no worse than a lower bound of policy performance may provide a confidence bound of safety of at least 65%, 75%, 80%, 85%, 90%, 95%, 97.5%, 98%, 98.5%, 99%, 99.5%, or 99.9%, for example. The statistically expected return no worse than a lower bound of policy performance may provide a confidence bound of safety of, e.g., at least two standard deviations. In some cases, the one may seek to assess failure mode performance, or otherwise determine useful policies during stressed conditions. In such cases, one may seek to deploy and text unsafe policies, and therefore the confidence bound of safety may be less than 50%, such as 33%, 25%, 20%, 15, 10%, 5%, 2.5%, 1%, 0.5%, or 0.1%. When operating with an unsafe policy, which may permit under unsafe conditions, the system and control would typically be highly instrumented, and deployed only where persistent harm would not occur. However, the data from such unsafe policies may be useful in more fully exploring the nature of the safety criterion, and also provide data which may be useful for defining safe policies and the diverse exploration of the stochastic policy space. Often, it is useful to consider statistical measures of confidence or safety, and therefore the safe policies may have a confidence bound of safety of one standard deviation, two standard deviations, three standard deviations, etc., from a mean value (e.g., 50% chance of unsafe policy). In many cases, the statistical distribution of policies with respect to safety will not be a normal distribution, in which case numeric integration of area under a curve, or other techniques may be used to assess the safety criterion. Heuristics may also be used to assess safety. The safety determination does not need to apply the same criteria or test for each type of risk. One way to assess safety is to provide an objective risk cost function which is applied to the policy. Each policy is assessed for its aggregate risk according to the cost function. In this case, one can then balance risk and reward, such that the safety of a policy is considered based on the difference between the normalized risk cost and expected reward, wherein the set of policies may be ranked by this difference measure. Further, the risk and/or reward function a may be modified, or a separate factor included, based on diverse exploration criteria, which, for example, rewards policies that explore a sparsely explored portion of the parameter space and penalizes policies which explore a densely explored portion. This is especially useful where the diverse exploration algorithm is integrated with the safety evaluation algorithm, though these can be integrated or separate.

In each iteration of policy improvement, feedback may be obtained from a system controlled in accordance with the policy, the feedback is used to improve a computational model of the system which is predictive of future behavior of the system over a range of environmental conditions.

A computational model of the system may be provided which is predictive of future behavior of the system over a multidimensional range of environmental conditions, based on a plurality of observations under different environmental conditions having a distribution, and the diverse exploration strategy is biased to select safe policies within the set of safe policies which selectively explore portions of the multidimensional range of environmental conditions. For example, the explored portions may be sparsely explored by prior policies.

Each safe behavior policy may embody a predictive model of a system controlled according to the respective safe behavior policy.

The set of safe policies may be selected based on a predicted state of a system controlled according to the respective safe behavior policy during deployment of the respective safe behavior policy.

The autonomous agent may be used to control a dynamic system whose dynamics are constant over a period of policy improvement.

The autonomous agent may be used to control a dynamic system whose dynamics are unknown and subject to change over a period of policy improvement.

Deployment of each safe behavior policy may produce a data set comprising a system state, a next system state achieved by following an action decided by the respective safe behavior policy, and a cost or reward signal enabling an objective evaluation of the respective safe behavior policy.

Deployment of each safe behavior policy may produce a data set comprising a system state, a next system state achieved by following an action decided by the respective safe behavior policy, and a cost or reward signal enabling a subjective evaluation of the respective safe behavior policy. This subjective evaluation is, for example, a biased automated system-produced output, a human, or other non-objective observer, Deployment of each safe behavior policy may produce a data set comprising a system state, a next system state achieved by following an action decided by the respective safe behavior policy, and a cost or reward signal enabling an automated evaluation of the respective safe behavior policy, further comprising receiving an expert evaluation of the respective safe behavior policy as an override of the automated evaluation.

The autonomous agent may be used to control a system whose operating statistics change over time.

A minimum number of episodes of the set of safe behavior polices for the set of safe policies may be deployed within each iteration of policy improvement to generate sufficient data to provide a predetermined statistical improvement in average policy performance.

A predetermined number of safe behavior polices within each iteration of policy improvement may be selected to generate a maximum statistical improvement in predicted policy performance.

Safe behavior polices for the safe set of policies within each iteration of policy improvement may be selected to generate a statistically significant improvement in a safe performance confidence interval. Safe behavior polices for the safe set of policies may be selected which each have a minimum statistical difference from a safe behavior of by a prior iteration of policy improvement.

Each set of safe behavior policies may correspond to a deep neural network trained with data from prior iterations of policy improvement, with a variation parameter that distinguishes members of the set of safe behavior policies.

Another object provides a system and method of iterative policy improvement in reinforcement learning, comprising: in each policy improvement iteration i, deploying a most recently confirmed set of policies $\mathcal{P}$ to collect n trajectories uniformly distributed over the respective policies $\pi_i$ within the set of policies $\pi_i \in \mathcal{P}$; for each set of trajectories $\mathcal{D}_i$ collected from a respective policy $\pi_i$, partition $\mathcal{D}_i$ and append to a training set of trajectories $\mathcal{D}_{train}$ and a testing set of trajectories $\mathcal{D}_{test}$; from $\mathcal{D}_{train}$, generating a set of candidate policies and evaluating them using $\mathcal{D}_{test}$; confirming a subset of policies as meeting predetermined criteria; and if no new policies $\pi_i$ are confirmed, the current set of policies $\mathcal{P}$ are redeployed.

The method may further comprise, for each iteration: defining a lower policy performance bound $\rho_-$; and performing a t-test on normalized returns of $\mathcal{D}_{test}$ without importance sampling, treating the set of deployed policies $\mathcal{P}$ as a mixture policy that generated $\mathcal{D}_{test}$.

The method may further comprise, during at least one iteration, employing a subset of the training set of trajectories $\mathcal{D}_{train}$, obtained from each of the different policies $\pi_i$.

The method may further comprise, employing a set of conjugate policies $\mathcal{P}$, each of which is optimally diverse, and each having a constrained distance, with respect to a KL-divergence diversity measure from a reference policy $\pi_i$.

The technology may be employed to control mechanical systems, hydraulic systems, electrical systems, power grid management, electromechanical systems, social network systems, robotics, navigation, inventory management, resource allocation, fleet management, routing problems, queue optimization, investment decisions, portfolio management, asset and option pricing, recommenders, user modeling, advertisement placement, medical treatments, language processing, video analysis, object recognition.

DETAILED DESCRIPTION OF THE INVENTION

Figure 1A:
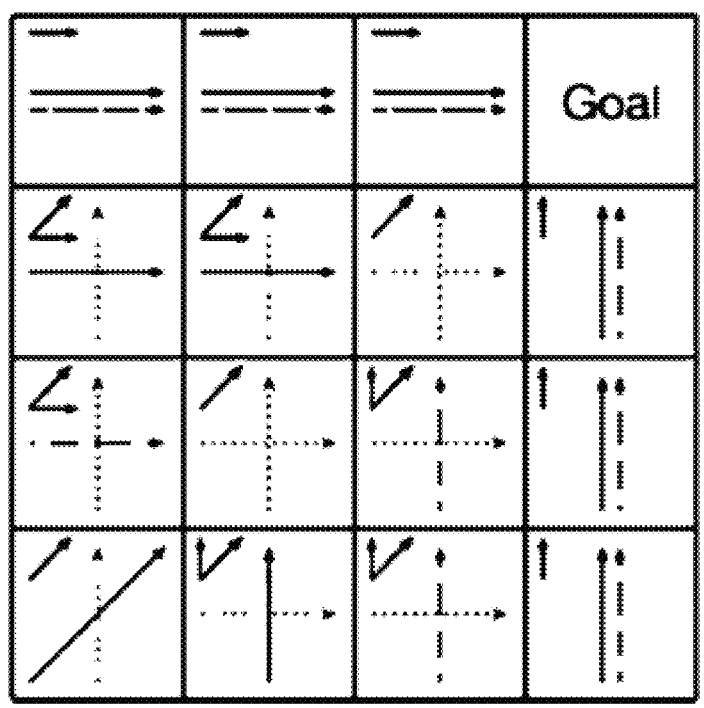
FIG. 1A shows a 4×4 grid-world with five possible actions (↗, ↑, →, ↓, ←); optimal actions for each state labeled in the upper left corner; an example of two policies (red and blue) of similar quality but different actions at 9 states.

Rationale for Diverse Exploration
Problem Formulation

Definition 1. Consider an RL problem with an initial policy, $\pi_0$, a lower bound, $\rho_-$, on policy performance, and a confidence level, $\delta(0<\delta<\frac{1}{2})$, all specified by a user. Let $\pi_1, \ldots, \pi_d$ be $d(d \geq 1)$ iterations of behavior policies and $\rho(\pi_i)$ be the performance (expected return) of $\pi_i$. Fast and Safe Improvement (FSI) aims at: $\max(\rho(\pi_d)-\rho(\pi_0))$ subject to $\forall i=1, \ldots d$, $\rho(\pi_i) \geq \rho_-$, with probability at least $(1-\delta)$ per iteration.

FSI requires that in each iteration of policy improvement, a behavior policy (the policy that gets deployed) $\pi_i$'s expected return is no worse than a bound $\rho_-$, with probability at least $1-\delta$. Policy $\pi_i$ is called a safe policy. Both $\delta$ and $\rho_-$ can be adjusted by the user to specify how much risk is reasonable for the application at hand. $\rho$ can be the performance of $\pi_0$ or $\pi_{i-1}$. Furthermore, FSI aims at maximally improving the behavior policy within a limited number of policy improvement iterations. This objective is what distinguishes FSI from the safe policy improvement (SPI) problem that enforces only the safety constraint on behavior policies (Petrik, Ghavamzadeh, and Chow 2016; Thomas, Theocharous, and Ghavamzadeh 2015b).

To achieve exploration within the safety constraint, one could resort to a stochastic safe policy. However, this is often ineffective for fast improvement because the randomness of the policy and hence the exploratory capacity must be limited in order to achieve good performance. Alternatively, DE is proposed, which strives for behavior diversity and performs exploration in the space of stochastic policies.

Advantage of DE Over SPI Solutions

DE can be thought of as a generalized version of any solution to the SPI problem. DE learns and deploys a diverse set of safe policies instead of a single safe policy (as is typical in SPI) during each policy improvement iteration. The high confidence policy improvement method in (Thomas, Theocharous, and Ghavamzadeh 2015b) is an SPI method that applies HCOPE (reviewed earlier) to provide lower bounds on policy performance. For simplicity, SPI is used to refer to a solution to the SPI problem that uses this safety model. The safety guarantees in HCOPE are the result of importance sampling based estimates. A problem with SPI, which has not been previously discussed in the literature, stems from a property of importance sampling: data from a single behavior policy can result in very different variances in the estimates for different candidate policies that SPI evaluates for safety. Specifically, variance will be low for policies that are similar to the behavior policy. Thus, deploying a single behavior policy results in an implicit bias (in the form of a lower variance estimate, and hence a better chance of confirming as a safe policy) towards a particular region of policy space with policies similar to the deployed policy. This does not allow SPI to fully explore the space of policies which may obstruct fast policy improvement.

To overcome this limitation of SPI and address the FSI challenge, sufficient exploration must be generated while maintaining safety. DE achieves this, and DE theory explains why deploying a population of safe policies achieves better exploration than a single safe policy. Informally, in the context of HCOPE by importance sampling, when diverse behavior policies are deployed (i.e., by multiple importance sampling) DE leads to uniformity among the variances of estimators, which gives an equal chance of passing the safety test to different candidate policies/target distributions. Such uniformity in turn promotes diversity in the behavior policies in subsequent iterations. While iteratively doing so, DE also maintains the average of the variances of estimators (i.e., maintaining utility of the current data for confirming the next round of candidates). In contrast, SPI deploys only one safe policy among available ones (i.e., by single importance sampling), and gives a heavily biased chance towards the policy that is most similar to the behavior policy, which leads to a limited update to the data. These theoretical insights are consistent with the intuition that for a population, diversity promotes diversity, while homogeneity tends to stay homogeneous.

Environments with Diverse Safe Policies

The behavior diversity needed to realize the synergistic circle of diversity to diversity naturally exists. Consider a 4×4 grid-world environment in FIG. 1A. The goal of an agent is to move from the initial (bottom left) state to the terminal (top right) state in the fewest steps. Immediate rewards are always −1. Compared to the standard grid-world problem, an additional diagonal upright action is introduced to each state that significantly increases the size of the policy search space and also serves to expand and thicken the spectrum of policy quality. From a deterministic point of view, in the standard grid-world, there are a total of 29 optimal policies (which take either up or right in the 9 states outside of the topmost row and rightmost column). All of these policies become sub-optimal at different levels of quality in this extension.

As shown in FIG. 1A, two policies of similar quality can differ greatly in action choices due to: (1) they take different but equally good actions at the same state; and (2) they take sub-optimal actions at different states. As a result, there exists significant diversity among policies of similar quality within any small window in the spectrum of policy quality.

Figure 1B:
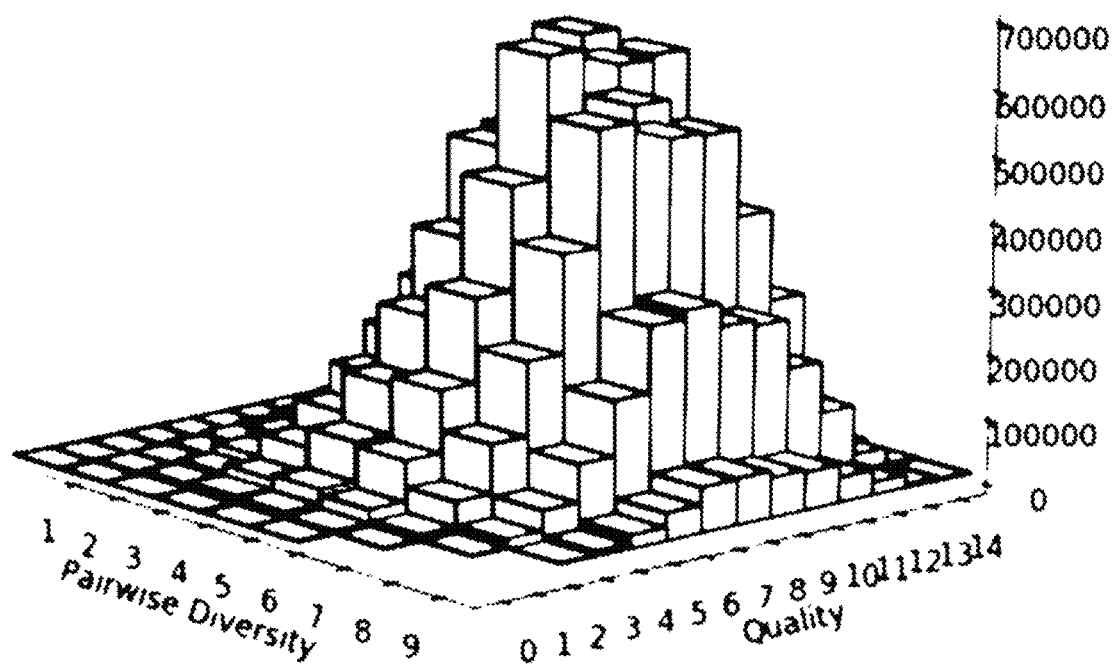
FIG. 1B shows a partial view of the distribution of pair-wise diversity (i.e., no. of states two policies differ) across a range of policy quality (i.e., total extra steps to Goal than optimal over all states).

This effect is demonstrated by FIG. 1B. To manage the space of enumeration, the policies considered are limited in this illustration to the 59 policies that take the diagonal, the policies considered in this illustration are limited to the $5^9$ policies that take the diagonal, up, left, down, or right action in the 9 states outside of the topmost row and rightmost column and take the optimal action in other states. The quality of a policy is measured in terms of the total extra steps to Goal starting from each state, compared to the total steps to Goal by an optimal policy. Besides the existence of significant diversity, another interesting observation from FIG. 1B is that as policy quality approaches optimal (extra steps approaches 0), both the total number of policies at a given quality level and the diversity among them decrease.

In domains with large state and action spaces and complex dynamics, it is reasonable to expect some degree of diversity among safe policies at various levels of quality and the existence of multiple exploratory paths for policy improvement. It is worth noting that in simple domains where there is significant homogeneity in the solution paths of better policies towards an optimal solution, DE will not be very effective due to limited diversity in sub-optimal policies. (For example, a Markov chain domain with two actions (left or right), and the goal state is at one end of the chain.) In complex domains, the advantage from exploiting diversity among safe policies can also diminish as the quality of safe policies approaches near optimal. Nevertheless, DE will not lose to a safe policy improvement algorithm when there is little diversity to explore, since it will follow the safe algorithm by default. When there is substantial diversity to exploit, DE theory formally explains why it is beneficial to do so.

Theory on Diverse Exploration

This section provides justification for how deploying a diverse set of behavior policies, when available, improves uniformity among the variances of policy performance estimates, while maintaining the average of the variances of estimators. This theory section does not address how to effectively identify diverse safe policies.

Importance sampling aims to approximate the expectation of a random variable X with a target density p(x) on D by sampling from a proposal density q(x).

$$\mu = E_P[X] = \int_D f(x)p(x)\frac{q(x)}{q(x)}dx = E_q\left[\frac{f(x)p(x)}{q(x)}\right] \quad (2)$$

Let $\{p_1, p_2, \ldots, p_r\}$ be a set of $r \geq 2$ target distributions and $\{q_1, q_2, \ldots, q_m\}$ a set of $m \geq 2$ proposal distributions (which correspond to candidate policies, $\pi_p$, and behavior policies, $\pi_q$, in the RL setting, respectively). Note this problem setting is different from traditional single or multiple importance sampling because multiple target distributions ($r \geq 2$) are considered. All target and proposal distributions are assumed distinct. For $1 \leq j \leq r$, $1 \leq t \leq m$, $$X_{j,t,i} = \frac{p_j(x_i)f(x_i)}{q_t(x_i)}$$

is the importance sampling estimator for the $j^{th}$ target distribution using the $i^{th}$ sample generated by the $t^{th}$ proposal distribution.

The sample mean of $X_{j,t,i}$ is $$\mu_{j,t} = \frac{1}{n}\sum_{i=1}^{n} X_{j,t,i} \quad (3)$$

Then, the variance of $\mu_{j,t}$ is $$\text{var}(\mu_{j,t}) = \text{var}\left(\frac{1}{n}\sum_{i=1}^{n} X_{j,t,i}\right) = \frac{\text{var}(X_{j,t,i})}{n} \quad (4)$$

Where $\text{var}(X_{j,t,i}) < \infty$

In the context of multiple importance sampling, the sample mean of $X_{j,t,i}$; $1 \leq t \leq m$ is defined as $$\mu_{j,k} = \frac{1}{n}\sum_{t=1}^{m}\sum_{i=1}^{k_t} X_{j,t,i} \quad (5)$$

where $k = (k_1, k_2, \ldots, k_m)$, $k_t \geq 0$ $\sum_{t=1}^{m} k_t = n$.

The vector k describes how a total of n samples are selected from the m proposal distributions. $k_t$ is the number of samples drawn from proposal distribution $q_t(x)$. The second subscript of the estimator μ has been overloaded with the vector k to indicate that the collection of n samples has been distributed over the m proposal distributions. There are special vectors of the form $k=(0, \ldots, n, \ldots, 0)$ where $k_t = n$, $k_l = 0$ $\forall l \neq t$, which correspond to single importance sampling. These special vectors are denoted as $k^{(t)}$ where $y=(y_1, y_2, \ldots, y_m)$, $y_t \geq 0$, $y_t = n$. When $k = k^{(t)}$, $\mu_{j,k}$ reduces to $\mu_{j,t}$ because all n samples are collected from the $t^{th}$ proposal distribution.

$\mu_{j,k}$ has variance $$\text{var}(\mu_{j,t}) = \text{var}\left(\frac{1}{n}\sum_{t=1}^{m}\sum_{i=1}^{k_t} X_{j,t,i}\right) = \frac{1}{n^2}\sum_{t=1}^{m} k_t \text{ var}(X_{j,t,i}) \quad (6)$$

When $k=k^{(t)}$, var(j,k) reduces to var(j,t).

Given the FSI problem, a goal is to promote uniformity of variances (i.e., reducing variance of variances) across estimators for an unknown set of target distributions (candidate policies). This leads to the following constrained optimization problem:

$$k^* = \arg\min_k \frac{1}{r}\sum_{j=1}^{r} |\text{var}(\mu_{j,k})| \quad (7)$$

subject to $k^* = (k_1^*, k_2^*, \ldots, k_m^*)$, $k_1^* \geq 0$ $\sum_{t=1}^{m} k_t^* = n$ where $k^*$ is an optimal way to distribute n samples over m proposal distributions such that the variances of the estimates are most similar (i.e., the average distance between $\text{var}(\mu_{j,k})$ and their mean be minimized). If the set of target distributions and the set of proposal distributions are both known in advance, computing $k^*$ can be solved analytically.

However, in the FSI context, the set of promising candidate target distributions to be estimated and evaluated by a safety test are unknown before the collection of a total of n samples from the set of available proposal distributions which are already confirmed by the safety test in the past policy improvement iteration. Under such uncertainty, it is infeasible to make an optimal decision on the sample size for each available proposal distribution according to the objective function in Equation (7). Given the objective is convex, the quality of a solution vector k depends on its distance to an unknown optimal vector k*. The closer the distance, the better uniformity of variances it produces. Lemma 1 below provides a tight upper bound on the distance from a given vector k to any possible solution to the objective in Equation (7).

Lemma 1. Given any vector $k=(k_1, k_2, \ldots, k_m)$ such that $k_t \geq 0$, $\Sigma_{t=1}^{m} k_t = n$. Let $k_{min} = k_t$ where $k_t \leq k_i \forall i \neq t$. Then $$\max_y \|y - k\|_{L_1} 2n - 2k_{min}, \tag{8}$$

where $y = (y_1, y_2, \ldots, y_m)$, $y_t \geq 0$, $\sum_{t=1}^{m} y_t = n$.

In any given iteration of policy improvement, the SPI approach (Thomas, Theocharous, and Ghavamzadeh 2015b) simply picks one of the available proposal distributions and uses it to generate the entire set of n samples. That is, SPI selects with equal probability from the set of special vectors $k^{(t)}$. The effectiveness of SPI with respect to the objective in Equation (7) depends on the expectation $E[\|k^{(t)} - k^*\|]$ where the expectation is taken over the set of special vectors $k^{(t)}$ with equal probability. DE, a better, and optimal under uncertainty of target distributions, approach based on multiple importance sampling, samples according to the vector $$k^{DE} = \left(\frac{n}{m}, \frac{n}{m}, \ldots, \frac{n}{m}\right).$$

Theorem 1.
With respect to the objective in Equation (7),
(i) the solution vector $k^{DE}$ is worst case optimal; and
(ii)

$$0 \leq \|k^{DE} - k^*\|_{L_1} \leq E[\|k^{(t)} - k^*\|_{L_1}] = 2n - 2n/m \tag{9}$$

where the expectation is over all special vectors $k^{(t)}$.
Proof. (Sketch):
(i)

$$0 \leq k_{min} \leq \frac{n}{m}$$

can be shown by a straightforward pigeonhole argument. In addition, from Lemma 1, smaller $k_{min}$ gives larger upper bound. Since $k^{DE}$ has the largest value of $$k_{min} = \frac{n}{m},$$

$k^{DE}$ is worst case optimal and $$0 \leq \|k^{DE} - k^*\|_{L_1} \leq 2n - 2n/m \tag{10}$$

(ii) Follows by evaluating $$E[\|k^{(t)} - k^*\|_{L_1}] = \frac{1}{m}\sum_{t=1}^{m} \|k^{(t)} - k^*\|_{L_1} = 2n - 2\frac{n}{m} \tag{11}$$

Theorem 1 part (i) states that the particular multiple importance sampling solution $k^{DE}$ which equally allocates samples to the m proposal distributions has the best worse case performance (i.e., the smallest tight upper bound on the distance to an optimal solution). Additionally, any single importance sampling solution $k^{(t)}$ has the worst upper bound. Any multiple importance sampling solution vector k with $k_t > 0 \forall t$ has better worst case performance than $k^{(t)}$. Part (ii) states that the expectation of the distance between single importance sampling solutions and an optimal k* upper bounds the distance between $k^{DE}$ and k*. Together, Theorem 1 shows that $k^{DE}$ achieves in the worst case optimal uniformity among variances across estimators for a set of r target distributions and greater or equal uniformity with respect to the average case of $k^{(t)}$.

Theorem 2.
The average variance across estimators for the r target distributions produced by $k^{DE}$ equals the expected average variance produced by the SPI approach. That is, $$\frac{1}{r}\sum_{j=1}^{r} \text{var}(\mu_{j,k^{DE}}) = E\left[\frac{1}{r}\sum_{j=1}^{r} \text{var}(\mu_{j,k^{(t)}})\right] \tag{12}$$

where the expectation is over special vectors $k^{(t)}$.
Proof. (Sketch): It follows from rearranging the following equation:

$$\frac{1}{r}\sum_{j=1}^{r} \text{var}(\mu_{j,k^{DE}}) = \frac{1}{r}\sum_{j=1}^{r} \frac{1}{n^2} \sum_{t=1}^{m} \frac{n}{m} \text{var}(X_{j,t,i}) \tag{13}$$

In combination, Theorems 1 and 2 show that DE achieves better uniformity among the variances of the r estimators than SPI while maintaining the average variance of the system. Although DE may not provide an optimal solution, it is a robust approach. Its particular choice of equal allocation of samples is guaranteed to outperform the expected performance of SPI.

Diverse Exploration Algorithm Framework

Algorithm 1 provides the overall DE framework. In each policy improvement iteration, it deploys the most recently confirmed set of policies $\mathcal{P}$ to collect n trajectories as uniformly distributed over the $\pi_i \in \mathcal{P}$ as possible. That is, if $|\mathcal{P}|=m$, according to $$k^{DE} = \left(\frac{n}{m}, \frac{n}{m}, \ldots, \frac{n}{m}\right).$$

For each trajectory, it maintains a label with the $\pi_i$ which generated it in order to track which policy is the behavior policy for importance sampling later on. For each set of trajectories $\mathcal{D}_i$ collected from $\pi_i$, partition $\mathcal{D}_i$ and append to $\mathcal{D}_{train}$ and $\mathcal{D}_{test}$ accordingly. Then, from $\mathcal{D}_{train}$ a set of candidate policies is generated in line 8 after which each is evaluated in line 9 using $\mathcal{D}_{test}$. If any subset of policies are confirmed they become the new set of policies to deploy in the next iteration. If no new policies are confirmed, the current set of policies are redeployed.

In choosing a lower bound ρ for each iteration, the EvalPolicies function performs a t-test on the normalized returns of $\mathcal{D}_{test}$ without importance sampling. It treats the set of deployed policies as a mixture policy that generated $\mathcal{D}_{test}$. In this way, ρ_ reflects the performance of the past policies, and naturally increases per iteration as deployed policies improve and $|\mathcal{D}_{test}|$ increases.

A set of trajectories $\mathcal{D}_{train}$ is assumed to have collected by deploying an initial policy $\pi_0$. The question remains how to learn a set of diverse and good policies which requires a good balance between the diversity and quality of the resulting policies. Inspired by ensemble learning (Dietterich 2001), our approach learns an ensemble of policy or value functions from $\mathcal{D}_{train}$. The function GenCandidatePolicies can employ any batch RL algorithm such as a direct policy search algorithm as in (Thomas, Theocharous, and Ghavamzadeh 2015b) or a fitted value iteration algorithm like Fitted Q-Iteration (FQI) (Ernst et al. 2005). A general procedure for GenCandidatePolicies is given in Algorithm 2.

---

Algorithm 1 DIVERSEEXPLORATION ($\pi_0$, r, d, n, δ)

Input: $\pi_0$ Starting policy, r: number of candidates to generate, d: number of iterations of policy improvement, n: number of trajectories to collect per iteration, δ: confidence
1:    $\mathcal{P} \leftarrow \{\pi_0\}$
2:    $\mathcal{D}_{train}, \mathcal{D}_{test} = \emptyset$
3:    for j = 1 to d do
4:        for $\pi_i \in \mathcal{P}$ do
5:            generate $\frac{n}{|\mathcal{P}|}$ trajectories from $\pi_i$ and append a fixed portion to $\mathcal{D}_{train}$ and the rest to $\mathcal{D}_{test}$
6:        end for
7:        ρ_ = t-test ($\mathcal{D}_{test}$, δ, $|\mathcal{D}_{test}|$)
8:        $\{\pi_1, \ldots \pi_r\}$ = GenCandidatePolicies ($\mathcal{D}_{train}$, r)
9:        passed = EvalPolicies ($\{\pi_1, \ldots \pi_r\}, \mathcal{D}_{test}$, δ, ρ_)
10:      if |passed| > 0 then
11:          $\mathcal{P}$ = passed
12:      end if
13:    end for

---

Algorithm 2 GENCANDIDATEPOLICIES ($\mathcal{D}_{train}$, r)

Input: $\mathcal{D}_{train}$: set of training trajectories, r: number of candidates to generate
Output: set of r candidate policies
1:    $\mathcal{C} = \emptyset$
2:    $\pi_1$ = LearnPolicy ($\mathcal{D}_{train}$)
3:    $\mathcal{C} \leftarrow$ append ($\mathcal{C}, \pi_1$)
4:    for i = 2 to r do
5:        $\mathcal{D}'$ = bootstrap ($\mathcal{D}_{train}$)
6:        $\pi_i$ = LearnPolicy ($\mathcal{D}'$)
7:        $\mathcal{C} \leftarrow$ append ($\mathcal{C}, \pi_i$)
8:    end for
9:    return $\mathcal{C}$

---

A bootstrapping (sampling with replacement) method is preferably employed with an additional subtlety which fits naturally with the fact that trajectories are collected incrementally from different policies. The intention is to maintain the diversity in the resulting trajectories in each bootstrapped subset of data. With traditional bootstrapping over the entire training set, it is possible to get unlucky and select a batch of trajectories that do not represent policies from each iteration of policy improvement. To avoid this, bootstrapping within trajectories collected per iteration is performed. Training on a subset of trajectories from the original training set $\mathcal{D}_{train}$ may sacrifice the quality of the candidate policies for diversity, when the size of $\mathcal{D}_{train}$ is small as at the beginning of policy improvement iterations. Thus, the first policy added to the set of candidate policies is trained on the full $\mathcal{D}_{train}$, and the rest are trained on bootstrapped data.

There is potential for the application of more sophisticated ensemble ideas. For example, one could perform an ensemble selection procedure to maximize diversity in a subset of member policies based on some diversity measure (e.g., pairwise KL divergence between member policies).

Although the proposed procedure has some similarity to ensemble learning, it is distinct in how the individual models are used. Ensemble learning aggregates the ensemble of models into one, while the present procedure will validate each derived policy and deploy the confirmed ones independently to explore the environment. As a result, only the experience data from these diverse behavior policies are assembled for the next round of policy learning.

To validate candidate policies, a set of trajectories independent from the trajectories used to generate candidate policies is needed. So, separate training and test sets $\mathcal{D}_{train}$, $\mathcal{D}_{test}$ are maintained by partitioning the trajectories collected from each behavior policy $\pi_i$ based on a predetermined ratio (1/5, 4/5) and appending to $\mathcal{D}_{train}$ and $\mathcal{D}_{test}$. GenCandidatePolicies uses only $\mathcal{D}_{train}$ whereas validation in EvalPolicies uses only $\mathcal{D}_{test}$.

Specifically, EvalPolicies uses the HCOPE method (described earlier) to obtain a lower bound p_ on policy performance with confidence 1−δ. However, since it performs testing on multiple candidate policies, it also applies the Benjamini Hochberg procedure (Benjamini and Hochberg 1995) to control the false discovery rate in multiple testing. A general procedure for EvalPolicies is outlined in Algorithm 3.

---

Algorithm 3 EVALPOLICIES ($\mathcal{C}, \mathcal{D}_{test}$, δ, ρ)

Input: $\mathcal{C}$: set of candidate policies, $\mathcal{D}_{test}$: set of test trajectories, δ: confidence, ρ: lower bound
Output: passed: candidates that pass
1:    Apply HCOPE t-test $\forall \pi_i \in \mathcal{C}$ with $\mathcal{D}_{test}$, δ, $|\mathcal{D}_{test}|$
2:    passed = $\{\pi_i | \pi_i$ deemed safe following FDR control$\}$
3:    return passed

---

Algorithm 4 DIVERSEPOLICYGRADIENT ($\pi_1$, r, β, β$\mathcal{C}$)

Input: $\mathcal{C}$: $\pi_1$: starting policy, r: number of conjugate policies to generate, β: number of steps to sample from main policy, β$\mathcal{C}$: number of steps to sample per conjugate policy
Output: passed: candidates that pass
1:    Initialize conjugate policies $\mathcal{C}_1$ as r copies of starting policy
2:    for $\{^{i\ =\ 1,2\ldots}\}$
3:        $S_i \leftarrow$ sample β steps from $\pi_i$ and β $\mathcal{C}_i$ steps from each conjugate policy $\pi \in \mathcal{C}$ (sample main and diverse policies)
4:        $\pi_{i+1} \leftarrow$ policy_improvement($S_i, \pi_i$)
5:        $\mathcal{C}_{i+1} \leftarrow$ conjugate_policies($S_i, \pi_{i+1}$) (generate diverse policies)
6:    end for

---

The Diverse Policy Gradient (DPG) algorithm is a policy gradient (PG) method for reinforcement learning (RL) that generalizes certain aspects of traditional PG methods and falls under the Diverse Exploration framework of iteratively learning and deploying diverse and safe policies to explore an environment. Traditional methods iteratively sample a single policy and use those samples to make gradient based improvements to that policy. DPG also makes gradient based improvements to a single policy but employs the novel idea of sampling from multiple conjugate policies. This novelty addresses a recognized deficiency in PG methods; a lack of exploration which causes PG methods to suffer from high sample complexity. Conjugate policies are optimally diverse with respect to a KL-divergence based diversity measure and can be safe if their distances in terms of KL divergence to a main policy are constrained.

Algorithm 4 is a general algorithmic framework for DPG. In line 3, the main policy along with each of the conjugate policies are sampled for $\beta$ and $\beta_C$ steps, respectively. In line 4, any policy gradient improvement step can be applied i.e. Natural Gradient Descent (see, e.g., Amari, Shun-ichi, Andrzej Cichocki, and Howard Hua Yang. "A new learning algorithm for blind signal separation." In Advances in neural information processing systems, pp. 757-763. 1996, expressly incorporated herein by reference in its entirety), Trust Region Policy Optimization (see, Schulman, John, Sergey Levine, Pieter Abbeel, Michael Jordan, and Philipp Moritz. "Trust region policy optimization." In Proceedings of the 32nd International Conference on Machine Learning (ICML-15), pp. 1889-1897. 2015, expressly incorporated herein by reference in its entirety) to generate a new policy $\pi_{i+1}$.

In line 5, conjugate policies with respect to $\pi_{i+1}$ are generated to be deployed in the next iteration of sampling. Generation of conjugate policies is discussed in the following section.

Conjugate Policies

In the context of PG methods, a policy $\pi$ is a distribution over the action space conditioned by the current state and parameterized by a vector $\theta$. That is, an action a is drawn from the distribution a ~$\pi$(•|s, $\theta$), given state s and parameters $\theta$.

Conjugacy between two vectors $\mu_i$ and $\mu_j$ with respect to an inner product is defined as $\mu_i A_i \mu_j = 0$ if $i \neq j$.

where A is a positive definite matrix. In the current setting, A is the Fisher Information Matrix (FIM) where $$A_{ij} = \frac{\partial}{\partial \theta_i} \frac{\partial}{\partial \theta_j} \log(\pi(\cdot \mid \theta)).$$

We define two policies $\pi_1$ and $\pi_2$ as conjugate if their parameterizations are translations of an original set of parameters $\theta$ by conjugate vectors. Concretely, $\pi_1$ and $\pi_2$ are conjugate policies if their parameterizations can be written as $\theta+\mu_1$ and $\theta+\mu_2$ for two conjugate vectors $\mu_1$ and $\mu_2$.

There are a number of ways to generate conjugate vectors and, for simplicity, we use the vectors generated as a byproduct of the conjugate gradient descent algorithm. (See, Gilbert, Jean Charles, and Jorge Nocedal. "Global convergence properties of conjugate gradient methods for optimization." SIAM Journal on optimization 2, no. 1 (1992): 21-42; Nocedal, Jorge, and Stephen Wright. Numerical optimization. Springer Science & Business Media, 2006, expressly incorporated herein by reference in their entirety) which is used to compute the natural gradient descent direction in the PG algorithms. A more sophisticated but computationally expensive method is to take an eigenvector decomposition of the FIM. See, Vallisneri, Michele. "Use and abuse of the Fisher information matrix in the assessment of gravitational-wave parameter-estimation prospects." Physical Review D 77, no. 4 (2008): 042001; Louis, Thomas A. "Finding the observed information matrix when using the EM algorithm." Journal of the Royal Statistical Society. Series B (Methodological) (1982): 226-233; Yu, Hua, and Jie Yang. "A direct LDA algorithm for high-dimensional data—with application to face recognition." Pattern recognition 34, no. 10 (2001): 2067-2070; Kammer, Daniel C. "Sensor placement for on-orbit modal identification and correlation of large space structures." Journal of Guidance, Control, and Dynamics 14, no. 2 (1991): 251-259; Stoica, Petre, and Thomas L. Marzetta. "Parameter estimation problems with singular information matrices." IEEE Transactions on Signal Processing 49, no. 1 (2001): 87-90, expressly incorporated herein by reference in their entirety).

Relationship to Baseline Algorithm

Algorithm 1 reduces to the baseline algorithm SPI when the number of candidate policies to generate, r, is set to 1. In this case, GenCandidatePolicies simply returns one policy $\pi_1$ trained on the full trajectory set. The multiple comparison procedure in EvalCandidatePolicies degenerates to a single t-test on importance weighted returns. The trajectory collection phase in DiverseExploration becomes a collection of n trajectories from one policy.

In implementation, this baseline algorithm is most similar to the Daedalus2 algorithm proposed in (Thomas, Theocharous, and Ghavamzadeh 2015b) (reviewed earlier) with some technical differences. For example, the lower bound p_ is fixed for each iteration of policy improvement whereas in the present algorithm, p_ increases over iterations.

Empirical Study

As a baseline, SPI is used, which, like DE, provides a feasible solution to the FSI problem, making a more suitable candidate for comparison than either $\epsilon$-greedy or R-MAX like approaches. Comparing DE with SPI allows us to directly contrast multiple importance sampling vs. single importance sampling.

Three RL benchmark domains are used for analysis: an extended Grid World as described earlier and the classic control domains of Mountain Car and Acrobot (Sutton and Barto 1998). To demonstrate the generality of the DE framework two markedly different RL algorithms are used for learning policies. In Grid World, Covariance Matrix Adaptation, Evolution Strategies (CMA-ES) (Hansen 2006), is used, a gradient-free policy search algorithm that directly maximizes the importance sampled estimate as the objective as in (Thomas, Theocharous, and Ghavamzadeh 2015b). In Mountain Car and Acrobot, FQI, an off-policy value approximation algorithm, with Fourier basis functions of order 3 is used (Konidaris, Osentoski, and Thomas 2011) for function approximation. Following (Thomas, Theocharous, and Ghavamzadeh 2015b), $\delta=0.05$ for is set all experiments.

Candidate policies are generated as mixed policies, as in (Thomas, Theocharous, and Ghavamzadeh 2015b) and (Jiang and Li 2016), to control how different a candidate policy can be from a prior behavior policy. A mixed policy $\mu_{\alpha,\pi_0,\pi}$ is defined as a mixture of policies $\pi_0$ and $\pi$ by mixing parameter $\alpha \in [0, 1]$: $\mu_{\alpha,\pi_0,\pi}(a|s):=(1-\alpha)\pi(a|s)+\alpha\pi_0(a|s)$. A larger $\alpha$ tends to make policy confirmation easier, at the cost of yielding a more conservative candidate policy and reducing the diversity in the confirmed policies. In experiments, $\alpha=0.3$ is used for Gridworld and $\alpha=0.9$ for Mountain Car/Acrobot. For Mountain Car and Acrobot, a high value of $\alpha$ is needed because FQI does not directly maximize the importance sampled estimate objective function as with CMA-ES used for Gridworld. With smaller values of a, DE still outperforms SPI but requires significantly more iterations.

To measure how DE contributes to the diversity of the experiences collected, the joint entropy measure is used, which is calculated over the joint distribution over states and actions. Higher entropy (uncertainty) means higher diversity in experienced (s,a) pairs, which reflects more effective exploration to reduce the uncertainty in the environment.

Figure 2A:
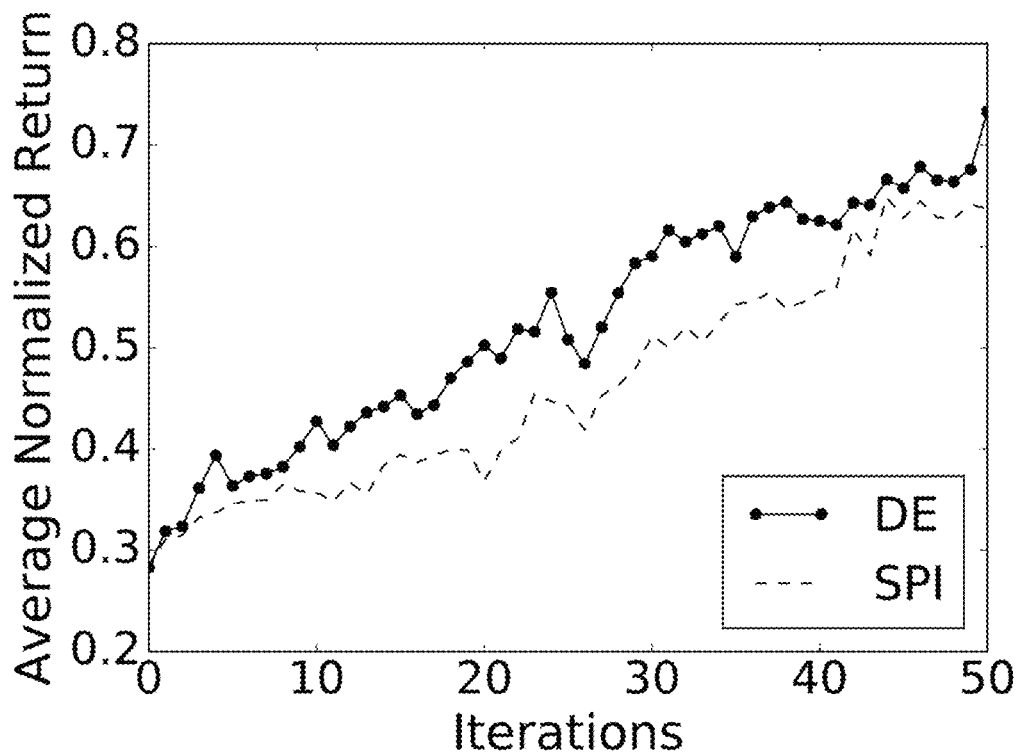
FIG. 2A shows average normalized returns over 50 runs of policy improvement.
Figure 2B:
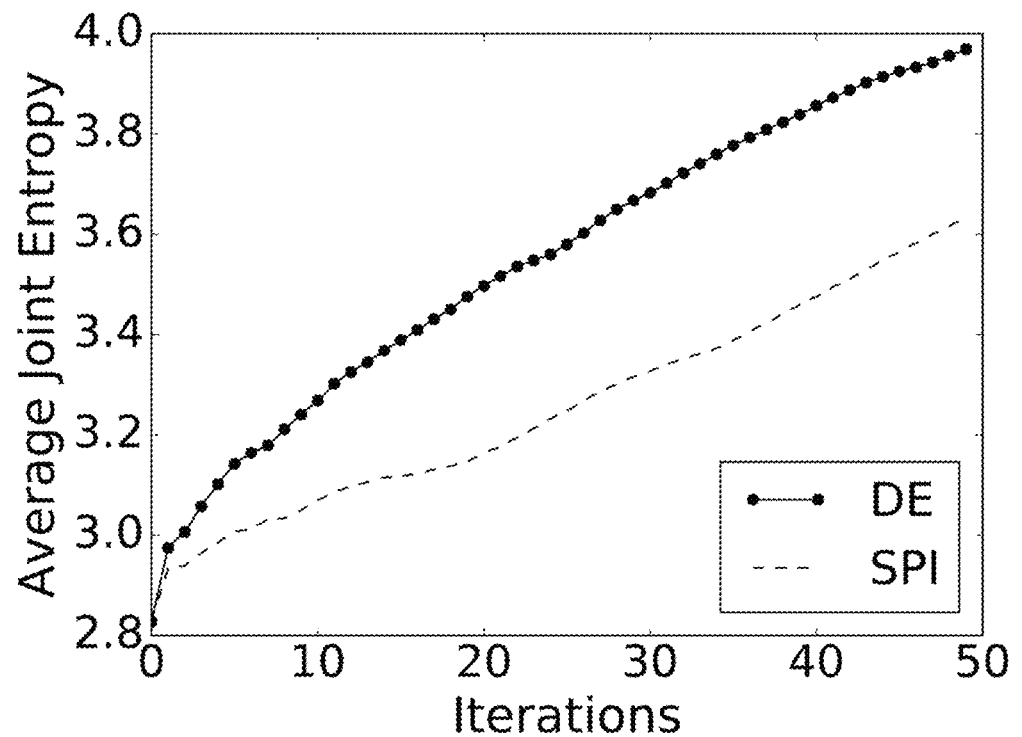
FIG. 2B shows diversity in experienced (s; a) pairs.

FIGS. 2A and 2B show the results comparing DE with SPI on Grid World. DE succeeds in the FSI objective of learning more quickly and reliably than SPI does. FIG. 2A shows average normalized returns over 50 runs of policy improvement. FIG. 2B shows diversity in experienced (s, a) pairs.

TABLE 1

Average aggregate normalized returns

| Domain | SPI | DE |
|---|---|---|
| Grid World | 604.970 | 675.562 |
| Mountain Car | 362.038 | 381.333 |
| Acrobot | 417.145 | 430.146 |

DE results are significant improvements (p ≤ .001)

DEs deployed policies obtain a higher average return from iteration 7 onward and ultimately achieve a higher return of 0.73 compared to 0.65 from SPI. To be clear, each point in the two curves shown in FIG. 2A represents the average (over 50 runs) of the average normalized return of a total of n=40 trajectories collected during a policy improvement iteration. To test the significance of the results, a two-sided paired t-test is run at each iteration and found p<0.001. Further, FIG. 2B clearly shows that DE is superior in terms of the joint-entropy of the collected sample distribution, meaning DE collects more diverse samples. DE's advantage in overall performance is attributed to the significant increase in sample diversity.

Ideally, an FSI solution will derive and confirm an optimal policy $\pi^*$ in as few iterations as possible, although determining if a given policy is optimal can be difficult in complex domains. In Grid World, this is not a difficulty as there are 64 distinct optimal policies $\pi^*$. For these experiments the average number of iterations required to confirm at least one $\pi^*$ is computed. DE achieved this after 16 iterations, whereas SPI achieved this after 22 iterations. This translates to a 240 trajectory difference on average in favor of DE. Additionally, DE was able to confirm an optimal policy in all 50 runs whereas SPI was unsuccessful in 5 runs.

For conciseness of presentation, Table 1 shows the performance results of the two methods over all three domains in the form of average aggregate normalized return. This statistic corresponds to the area under the curve for performance curves as shown in FIG. 2A. Higher values indicate faster policy improvement and more effective learning. The results show that DE succeeds in learning and deploying better performing policies more quickly than SPI.

Finally, to evaluate the safety of deployed policies, the empirical error rates (the probability that a policy was incorrectly declared safe) was computed. In all experiments the empirical error for DE is well below the 5% threshold. Combined these results demonstrate that DE can learn faster and more effectively than SPI without sacrificing safety.

A novel exploration strategy is proposed as the solution to the FSI problem and the DE theory explaining the advantage of DE over SPI. The DE algorithm framework is shown to achieve both safe and fast policy improvement and that it significantly outperforms the baseline SPI algorithm.

Other importance sampling estimators may be employed in the framework, such as (Jiang and Li 2016; Thomas and Brunskill 2016; Wang, Agarwal, and Dudik 2017). DE can also be integrated with other safe policy improvement algorithms (Petrik, Ghavamzadeh, and Chow 2016). Diverse policies may be optimally generated to fully capitalize on the benefit of DE.

The technology can be applied to autonomous systems in various domains such as smart manufacturing, industrial robots, financial trading and portfolio management, cyber system management, autonomous vehicles, and autonomous controls in power plants and smart buildings.

DE for Additive Manufacturing Design

Additive manufacturing (e.g., cold spray and powder bed manufacturing) commonly involves the deployment of a robotic agent and complex trajectory traversal by the agent to meet multifaceted objectives such as surface quality, material properties, etc. In high-precision domains (e.g., aerospace), it is very costly and time consuming to manually design an effective control policy for every specific design, manufacturing or repair task.

However, according to the present technology, the manual design effort may be replaced by a safe diverse exploration and feedback effort, which permits humans or automated agents to assess the performance of the result. For example, where surface texture serves a visual appearance function, a human observer may be used to rate the texture. The rating is then fed back, and the system will develop over various tasks and improve performance. Other criteria, such as mechanical performance, may be assessed through objective measures, and both objective and subjective inputs may be considered. While this presupposes an iterative development of the policy, in many cases, human developers will also require iterations, and in many cases, even an excess of automated trials is cost efficient as compared to human implementation.

DE for Cybersecurity

In the domain of cyber infrastructure and security management, an autonomous agent is tasked with managing the services, maintenance, and cyber defense operations of an organization's network. The agent must continuously improve and adapt a control policy that provides the necessary availability of services and achieves high efficiency of its resources as well as strong security. In this highly uncertain and dynamic domain, generic fixed policies cannot provide high efficiency or security, but the system must provide an adequately guaranteed baseline of performance.

In this case, a human operator may oversee the intelligent agent, but often, an immediate automated response to a risk is required, and therefore the human intervention is used to assess the machine performance. In this case, the safety criteria include basic rules and norms of behavior that at least meet stated or mandated policies and practices.

The adoption of the technology in this invention to these applications can enable an autonomous agent to start with a baseline control policy developed by domain experts or learned by the agent from a simulated environment, and quickly improve the performance of the current control policy online in a real-world environment while ensuring safe operations.

DE Via Conjugate Policies

We address the challenge of effective exploration while maintaining good performance in policy gradient methods. As a solution, we propose diverse exploration (DE) via conjugate policies. DE learns and deploys a set of conjugate policies which can be conveniently generated as a byproduct of conjugate gradient descent. We provide both theoretical and empirical results showing the effectiveness of DE at achieving exploration, improving policy performance, and the advantage of DE over exploration by random policy perturbations.

Variance Reduction of Parameter Perturbation Gradient Estimator

Increasing the KL divergence between perturbed policies reduces the variance of the perturbed gradient estimate. Conjugate vectors maximize pairwise KL divergence among a constrained number of perturbations.

Considering the general case where $\epsilon \sim \mathbb{P}$ where $\mathbb{P}$ is the perturbation distribution. When $\mathbb{P} = \mathcal{N}(0,\Sigma)$, we recover the gradient in Equation (1). To simplify notations in the variance analysis of the perturbed gradient estimate, E is written as shorthand for $\phi+E$ and let $\pi_\epsilon$ be the policy with parameters $\phi$ perturbed by $\epsilon$. Moreover, $$G_\epsilon := \mathbb{E}_{\tau \sim \pi_\epsilon} \sum_{t=0}^{T} \nabla_\phi \log(\pi_\epsilon(a_t \mid s_t)) R_t(\tau)]$$

is the gradient with respect to $\phi$ with perturbation $\epsilon$. The final estimate to the true gradient in Equation (1) is the Monte Carlo estimate of $G_{\epsilon_i}$ ($1 \leq i \leq k$) over k perturbations. For any $\epsilon_i$, $G_{\epsilon_i}$ is an unbiased estimate of the gradient so the averaged estimator is too. Therefore, by reducing the variance, we reduce the estimate's mean squared error. The variance of the estimate over k perturbations $\epsilon_i$ is $$\mathbb{V}\left(\frac{1}{k}\sum_{i=1}^{k} G_{\epsilon_i}\right) = \frac{1}{k^2}\sum_{i=1}^{k} \mathbb{V}_{\epsilon_i}(G_{\epsilon_i}) + \frac{2}{k^2}\sum_{i=1}^{k-1}\sum_{j=i+1}^{k} \text{Cov}_{\epsilon_i,\epsilon_j}(G_{\epsilon_i}, G_{\epsilon_j}) \quad (14)$$

where $\mathbb{V}_{\epsilon_i}(G_{\epsilon_i})$ is the variance of the gradient estimate $G_{\epsilon_i}$ and $\text{Cov}_{\epsilon_i,\epsilon_j}(G_{\epsilon_i}, G_{\epsilon_j})$ is the covariance between the gradients $G_{\epsilon_i}$ and $G_{\epsilon_j}$.

$\mathbb{V}(G_{\epsilon_i})$ is equal to a constant for all i because $G_{\epsilon_i}$ are identically distributed. So, the first term in Equation (14) approaches zero as k increases and does not contribute to the asymptotic variance. The covariance term determines whether the overall variance can be reduced. To see this, consider the extreme case when $G_{\epsilon_i}=G_{\epsilon_j}$ for $i \neq j$. Equation (14) becomes $$\mathbb{V}\left(\frac{1}{k}\sum_{i=1}^{k} G_{\epsilon_i}\right) = \mathbb{V}_{\epsilon_i}(G_{\epsilon_i})$$

because all $\text{Cov}_{\epsilon_i,\epsilon_j}(G_{\epsilon_i},G_{\epsilon_j})=\mathbb{V}(G_{\epsilon_i})$. The standard PG estimation (i.e. TRPO) falls into this extreme as a special case of the perturbed gradient estimate where all perturbations are the zero vector.

Next consider the special case where $\text{Cov}_{\epsilon_i,\epsilon_j}(G_{\epsilon_i},G_{\epsilon_j})=0$ for $i \neq j$. Then, the second term vanishes and $$\mathbb{V}\left(\frac{1}{k}\sum_{i=1}^{k} G_{\epsilon_i}\right) = O(k^{-1}).$$

The RP approach strives for this case by i.i.d. sampling of perturbations $\in$. This explains why RP was shown to outperform TRPO in some experiments (Plappert et al. 2018). However, it is important to note that i.i.d. $\in$ do not necessarily produce uncorrelated gradients $G_\in$ as this depends on the local curvature of the objective function. For example, perturbations in a flat portion of parameter space will produce equal gradient estimates that are perfectly positively correlated. Thus, $G_{\epsilon_i}$ are identically distributed but not necessarily independent. This suggests that using a perturbation distribution such as $\mathcal{N}(0, \Sigma)$ may suffer from potentially high variance if further care is not taken. This work develops a principled way to select perturbations in order to reduce the covariance.

There are two major sources of variance in the covariance terms; the correlations among $\nabla_\phi \log(\pi_{\epsilon_i})$ and $\nabla_\phi \log(\pi_{\epsilon_j})$ and correlations related to $R_t(\tau)$. The difference in performance of two policies (as measured by $R_t(\tau)$) can be bounded by a function of the average KL divergence between them (Schulman et al. 2015). So, the contribution to the covariance from $R_t(\tau)$ will be relatively fixed since all perturbations have a bounded KL divergence to the main policy. In view of this, we focus on controlling the correlation between $\nabla_\phi \log(\pi_{\epsilon_i})$ and $\nabla_\phi \log(\pi_{\epsilon_j})$.

This brings us to Theorem 3 which shows that maximizing the diversity in terms of KL divergence between two policies $\pi_{\epsilon_i}$ and $\pi_{\epsilon_j}$ minimizes the trace of the covariance between $\nabla_\phi \log(\pi_{\epsilon_i})$ and $\nabla_\phi \log(\pi_{\epsilon_j})$.

Theorem 3.

Let $\epsilon_i$ and $\epsilon_j$ be two perturbations such that $\|\epsilon_i\|_2 = \|\epsilon_j\|_2 = \delta u$. Then, (1) the trace of $\text{Cov}(\nabla \phi \log(\pi_{\epsilon_j}), \nabla \phi \log(\pi_{\epsilon_i}))$ is minimized and (2) $\frac{1}{2}(\epsilon_j-\epsilon_i)^T \hat{F}(\epsilon_i)(\epsilon_j-\epsilon_i)$ the estimated KL divergence $D_{KL}(\pi_{\epsilon_i}\|\pi_{\epsilon_j})$ is maximized, when $\epsilon_i=-\epsilon_j$ and they are along the direction of the eigenvector of $F(\epsilon_i)$ with the largest eigenvalue.

This theorem shows that, when two perturbations $\epsilon_i$ and $\epsilon_j$ have a fixed L2 norm $\delta_\epsilon$, the perturbations that maximize the KL divergence $D_{KL}(\pi_{\epsilon_i}\|\pi_{\epsilon_j})$ and also minimize the trace of the covariance $\text{Cov}(\nabla_\phi \log(\pi_{\epsilon_i}), \nabla_\phi \log(\pi_{\epsilon_j}))$ are uniquely defined by the positive and negative directions along the eigenvector with the largest eigenvalue. This provides a principled way to select two perturbations to minimize the covariance.

Conjugate Vectors Maximize KL Divergence

In domains with high sample cost, there is likely a limit on the number of policies which can be deployed per iteration. Therefore, it is important to generate a small number of perturbations which yield maximum variance reduction. Theorem 3 shows that the reduction of the covariance can be done by maximizing the KL divergence, which can be achieved using eigenvectors. Eigenvectors are a special case of what are known as conjugate vectors. Theorem 4 shows that when there is a fixed set of k perturbations, conjugate vectors maximize the sum of the pairwise KL divergences.

Since the FIM $F_\phi$ is symmetric positive definite, there exist n conjugate vectors $\mathcal{U} = \{\mu_1, \mu_2, \ldots, \mu_n\}$ with respect to $F_\phi$ where n is the length of the parameter vector $\phi$. Formally, $\mu_i$ and $\mu_j$, $i \neq j$ are conjugate if $\mu_i^T F_\phi \mu_j = 0$. i and j are defined as conjugate policies if their parameterizations can be written as $\phi+\mu_i$ and $\phi+\mu_j$ for two conjugate vectors $\mu_i$ and $\mu_j$. $\mathcal{U}$ forms a basis for $\mathbb{R}^n$ so any local perturbation $\epsilon$ to $\phi$, after scaling, can be written as a linear combination of $\mathcal{U}$, $$\epsilon = \eta_1\mu_1 + \eta_2\mu_2 + \ldots + \eta_n\mu_n \text{ where } \|\eta\| \leq 1 \quad (15)$$

For convenience, we assume that $\eta_i \geq 0$. Since the negative of a conjugate vector is also conjugate, if there is a negative $\eta_i$, we may flip the sign of the corresponding i to make it positive.

the approximation of KL divergence, provided above is $$\tilde{D}(\phi\|\phi+\epsilon)=\tfrac{1}{2}\epsilon^T F_\phi \epsilon$$

The measure of KL divergence of concern is the total divergence between all pairs of perturbed policies:

$$\sum_{i=1}^{k-1}\sum_{j=i+1}^{k} \tilde{D}_{KL}(\phi+\epsilon_j\|\phi+\epsilon_i) = \sum_{i=1}^{k-1}\sum_{j=i+1}^{k} \frac{1}{2}(\epsilon_i-\epsilon_j)^T F_\phi (\epsilon_i-\epsilon_j) \quad (16)$$

where k is the number of perturbations. Note that $\phi$ and not $\phi+\epsilon$. in the subscript of the FIM which would be more precise with respect to the local approximation. The use of the former is a practical choice which allows estimation of a single FIM and avoidance of estimating the FIM of each perturbation. Estimating the FIM is already a computational burden and, since perturbations are small and bounded, using $F_\phi$ instead of $F_{\phi+\epsilon}$ has little effect and performs well in practice as demonstrated in experiments. For the remainder of this discussion, we omit $\phi$ in the subscript of F for convenience. The constraint on the number of perturbations presents the following optimization problem that optimizes a set of perturbations $\mathcal{P}$ to maximize (16) while constraining $|\mathcal{P}|$.

$$\mathcal{P}^* = \arg\max_{\mathcal{P}} \sum_{i=1}^{k-1}\sum_{j=i+1}^{k} \tilde{D}_{KL}(\phi+\epsilon_j\|\phi+\epsilon_i) \quad (17)$$

subject to $|\mathcal{P}|=k\leq n$

We define $\|\cdot\|_F$ as the norm induced by F, that is, $\|x\|_F = x^T F x$.

Without the loss of generality, assume the conjugate vectors are ordered with respect to the F-norm, $$\|\mu_1\|_F \geq \|\mu_2\|_F \geq \ldots \geq \|\mu_n\|_F.$$

The following theorem gives an optimal solution to the Equation (17).

Theorem 4.

The set of conjugate vectors $\{\mu_1, \mu_2, \ldots, \mu_k\}$ maximize the Equation (17) among any k perturbations.

If the assumption that $\eta_i \geq 0$ is relaxed, then the set of vectors that maximize the Equation (17) simply includes the negative of each conjugate vector as well, i.e., $$\mathcal{P} = \{\mu_1, -\mu_1, \mu_2, -\mu_2, \ldots, \mu_{k/2}, -\mu_{k/2}\}.$$

Including the negatives of perturbations is known as symmetric sampling (Sehnke et al. 2010) which is discussed below.

Theorem 4 makes clear that randomly generated perturbations will be sub-optimal with high probability with respect to the Equation (17) because the optimal solution is uniquely the top k conjugate vectors. Identifying the top k conjugate vectors in each iteration of policy improvement will require significant computation when the FIM is large. Fortunately, there exist computationally efficient methods of generating sequences of conjugate vectors such as conjugate gradient descent (Wright and Nocedal 1999) (to be discussed), although they may not provide the top k. From Theorem 2, it is observed that when all conjugate vectors have the same F-norm, then any set of k conjugate vectors maximize the Equation (17). If the perturbation radius (the maximum KL divergence a perturbation may have from the main policy) is bounded as in (Plappert et al. 2018), DE achieves a computationally efficient, optimal solution to the Equation (17).

Method

Generating Conjugate Policies

Generating conjugate policies by finding the top k conjugate vectors is feasible but computationally expensive. It would require estimating the full empirical FIM of a large neural network (for which efficient approximate methods exist (Grosse and Martens 2016)) and a decomposition into conjugate vectors. This additional computational burden is avoided altogether and conjugate policies generated by taking advantage of runoff from the conjugate gradient descent (CGD) algorithm (Wright and Nocedal 1999). CGD is often used to efficiently approximate the natural gradient descent direction as in (Schulman et al. 2015).

CGD iteratively minimizes the error in the estimate of the natural gradient descent direction along a vector conjugate to all minimized directions in previous iterations. These conjugate vectors are utilized in DE to be used as perturbations. Although these are not necessarily the top k conjugate vectors, they are computed essentially for free because they are generated from one application of CGD when estimating the natural gradient descent direction. To account for the suboptimality, a perturbation radius $\delta_P$ is introduced such that for any perturbation $\epsilon$ $$\tilde{D}_{KL}(\phi\|\phi+\epsilon)\leq\gamma_P. \quad (18)$$

We can perform a line search along each perturbation direction such that $\tilde{D}_{KL}(\phi\|\phi+\epsilon)=\delta_P$. With this constraint, the use of any k vectors are optimal as long as they are conjugate and the benefit comes from achieving the optimal pairwise divergence.

For each conjugate vector, its negative (i.e., symmetric sampling) is also included as motivated by the more general form of Theorem 4 with relaxed assumptions (without $\eta_i > 0$). In methods following different gradient frameworks, symmetric sampling was used to improve gradient estimations by alleviating a possible bias due to a skewed reward distribution (Sehnke et al. 2010). Finally, $\delta_P$ is linearly reduced, motivated by the observation in (Cohen, Yu, and Wright 2018) that as a policy approaches optimal there exist fewer policies with similar performance.

Algorithm Framework

---

Algorithm 5 DIVERSE_EXPLORATION ($\pi_1$, k, $\beta$, $\beta_k$, $\delta_P$)

---

Input: $\pi_1$: starting policy, k: number of conjugate policies to generate, $\beta$: number of steps to sample from main policy, $\beta_k$: number of steps to sample per conjugate policy, $\delta_P$: perturbation radius
1: Initialize conjugate policies $\mathcal{P}_1$ as k copies of $\pi_1$
2: for i = 1, 2, ... do
3:     $S \leftarrow$ sample $\beta$ steps from $\pi_1$ and $\beta_k$ steps from each conjugate policy $\pi \in \mathcal{P}_i$
      //sample main and diverse policies
4:     $\pi_{i+1}, \mathcal{P}_{i+1} \leftarrow$ policy improvement($S_i$, $\pi_i$, k, $\delta_P$)
5: end for

---

A general framework for DE is sketched in Algorithm 5. In line 1, DE assumes a starting policy $\pi_1$ (e.g., one generated randomly) which is used to initialize conjugate policies as exact copies. The initial parameterization of $\pi_1$ is the mean vector $\phi_1$. The number of conjugate policies to be generated is user defined by an argument k. The number of samples to collect from the main and conjugate policies are specified by $\beta$ and $\beta_k$, respectively. The relative values of k, β and $β_k$ control how much exploration will be performed by conjugate policies. DE reduces to the standard PG algorithm when k=0 or $β_k$=0.

In the ith iteration, after sampling the main and conjugate policies in line 3, line 4 updates $ϕ_i$ via natural gradient descent using the perturbed gradient estimate and returns the updated policy $π_{i+1}$ parameterized by $ϕ_{i+1}$ and the set of conjugate policies $\mathcal{P}_{i+1}$ parameterized by $ϕ_{i+1}$ perturbed by conjugate vectors; policy improvement is a placeholder for any RL algorithm that accomplishes this. Computing perturbations could be done in a separate subroutine (i.e. estimating the FIM and taking an eigendecomposition). When computing the natural gradient by CGD as discussed above, the intermediate conjugate vectors are saved to be used as perturbations.

Empirical Study

The impact of DE via conjugate policies is evaluated on TRPO (Schulman et al. 2015). TRPO is state-of-the-art in its ability to train large neural networks as policies for complex problems. In its standard form, TRPO only uses on-policy data, so its capacity for exploration is inherently limited.

In experiments, three aspects of DE were investigated in comparison with baseline methods. First, the performance of all deployed policies through iterations of policy improvement. It is worth noting the importance of examining the performance of not only the main policy but also the perturbed policies in order to take the cost of exploration into account. Second, the pairwise KL divergence achieved by the perturbed policies of DE and RP, which measures the diversity of the perturbed policies. Third, the trace of the covariance matrix of perturbed gradient estimates. High KL divergence correlates with a low trace of covariance in support of the theoretical analysis. Additionally, the diminishing benefit of exploration when decreasing the number of perturbed policies is demonstrated.

Methods in Comparison

We use two different versions of TRPO as baselines; the standard TRPO and TRPO with random perturbations (RP) and symmetric sampling. The RP baseline follows the same framework as DE but with random perturbations instead of conjugate perturbations. When implementing RP, we replace learning the covariance Σ in the perturbed gradient estimate with a fixed $σ^2 I$ as in (Plappert et al. 2018) in which it was noted that the computation for learning Σ was prohibitively costly. A simple scheme is proposed to adjust σ to control for parameter sensitivity to perturbations. The adjustment ensures perturbed policies maintain a bounded distance to the main policy. This is achieved by, for both conjugate and random, searching along the perturbation direction to find the parameterization furthest from the main policy but still within the perturbation radius $δ_P$. In light of the theoretical results, the use of symmetric sampling in RP serves as a more competitive baseline.

Policies are represented by feedforward neural networks with two hidden layers containing 32 nodes and tan h activation functions. Increasing complexity of the networks did not significantly impact performance and only increased computation cost. Additionally, layer normalization (Ba, Kiros, and Hinton 2016) is used as in (Plappert et al. 2018) to ensure that networks are sensitive to perturbations. Policies map a state to the mean of a Gaussian distribution with an independent variance for each action dimension that is independent of the state as in (Schulman et al. 2015). The values of these variance parameters are significantly constrained to align with the motivation for parameter perturbation approaches discussed in the Introduction. This will also limit the degree of exploration as a result of noisy action selection. The TD(1) (Sutton and Barto 1998) algorithm is used to estimate a value function V over all trajectories collected by both the main and perturbed policies. To estimate the advantage function, the empirical return of the trajectory is used as the Q component and V as a baseline. TRPO hyperparameters are taken from (Schulman et al. 2015; Duan et al. 2016).

The results are displayed on three difficult continuous control tasks, Hopper, Walker and HalfCheetah implemented in OpenAI gym (Brockman et al. 2016) and using the Mujoco physics simulator (Todorov, Erez, and Tassa 2012). As mentioned in the discussion of Algorithm 5, the values of k, β and $β_k$ determine exploration performed by perturbed policies. TRPO is at the extreme of minimal exploration since all samples come from the main policy. To promote exploration, in DE and RP we collect samples equally from all policies. More specifically, we use k=20 perturbations for Hopper and k=40 perturbations for Walker and HalfCheetah for both DE and RP. Walker and HalfCheetah each have 3 more action dimensions than Hopper and so require more exploration and hence more agents. For a total of N (N=21000 for Hopper and N=41000 for Walker and HalfCheetah in the reported results) samples collected in each policy improvement iteration, TRPO collects β=N samples per iteration while DE and RP collect $$β = β_k = \frac{N}{k+1}$$

samples from the main and each perturbed policy. The experiments show a trend of diminishing effect of exploration on policy performance when the total samples are held constant and increases. The initial perturbation radius used in experiments is $δ_P$=0.2 for Hopper and HalfCheetah and $δ_P$=0.1 for Walker. Larger perturbation radiuses caused similar performance to the reported results but suffered from greater instability.

TABLE 2

Total pairwise KL divergence averaged over iterations of DE vs. RP. Reported values are the average over 10 runs with all p-values < 0.001.

| Domain | Hopper | Walker | HalfCheetah |
|---|---|---|---|
| DE | 53.5 | 82.7 | 192.5 |
| RP | 38.1 | 77.6 | 156.1 |

Results

The two rows of Table 2 aim to address the three points of investigation raised at the beginning of this section. The goal is to show that perturbations with larger pairwise KL divergence are key to both strong online performance and enhanced exploration.

Figure 3A:
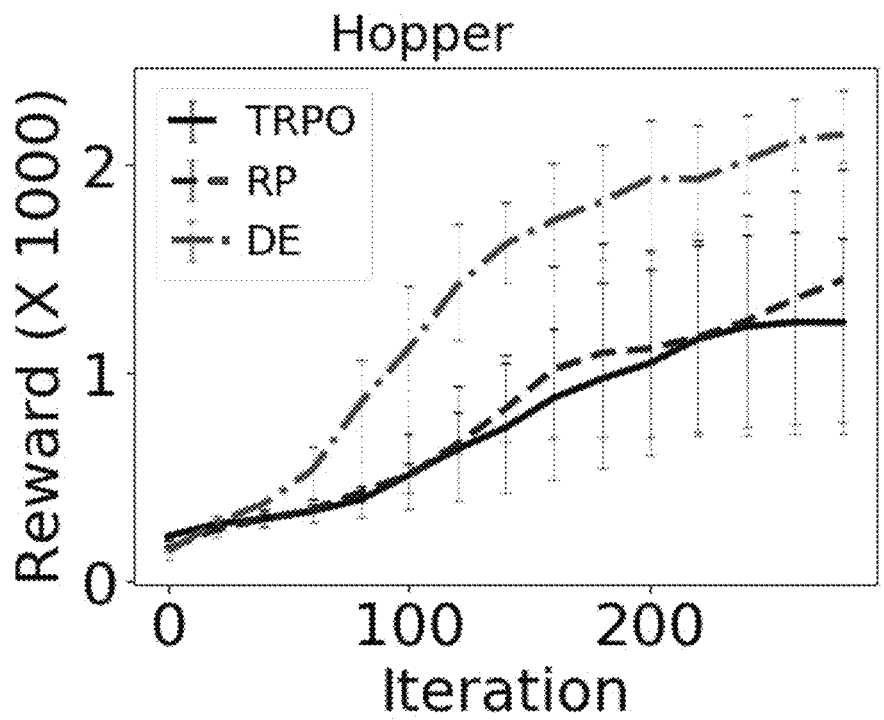
FIGS. 3A-3F show comparisons between TRPO, RP (TRPO with Random Perturbations), and DE (TRPO with Diverse Exploration) on average performance of all behavior policies and trace of the covariance matrix of perturbed gradient estimates, across iterations of learning on (FIGS. 3A, 3D) Hopper, (FIGS. 3B, 3E) Walker and (FIGS. 3C, 3F) HalfCheetah. Reported values are the average and inter-quartile range over 10 runs.

In the first column of Table 2, results are reported on the Hopper domain. FIG. 3A contains curves of the average performance (sum of all rewards per episode) attained by TRPO, RP and DE. For RP and DE, this average includes the main and perturbed policies. RP has a slight performance advantage over TRPO throughout all iterations and converges to a superior policy. DE shows a statistically significant advantage in performance over RP and TRPO; a two-sided paired t-test of the average performance at each iteration yields p<0.05. Additionally, DE converges to a stronger policy and shows a larger rate of increase over both RP and TRPO. DE also results in the smallest variance in policy performance as shown by the interquartile range (IQR) which indicates that DE escapes local optima more consistently than the baselines. These results demonstrate the effect of enhanced exploration by DE over TRPO and RP.

Figure 3B:
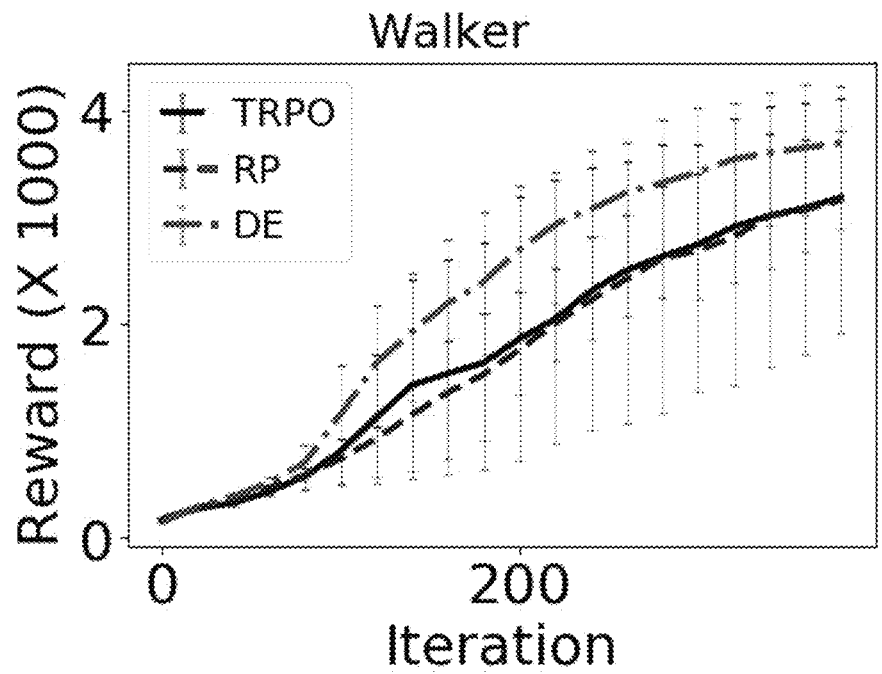
Figure 3C:
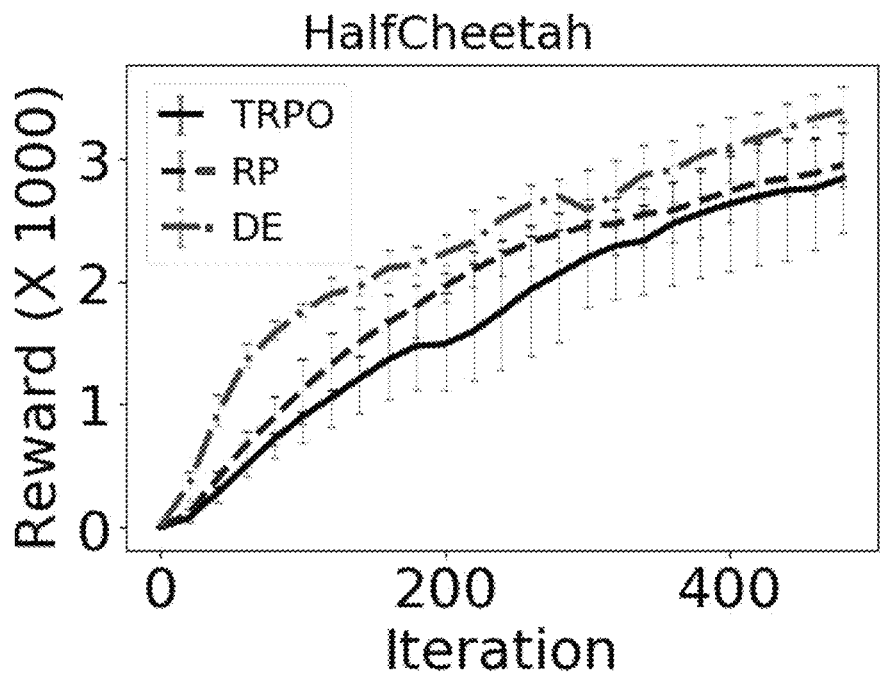
Figure 3D:
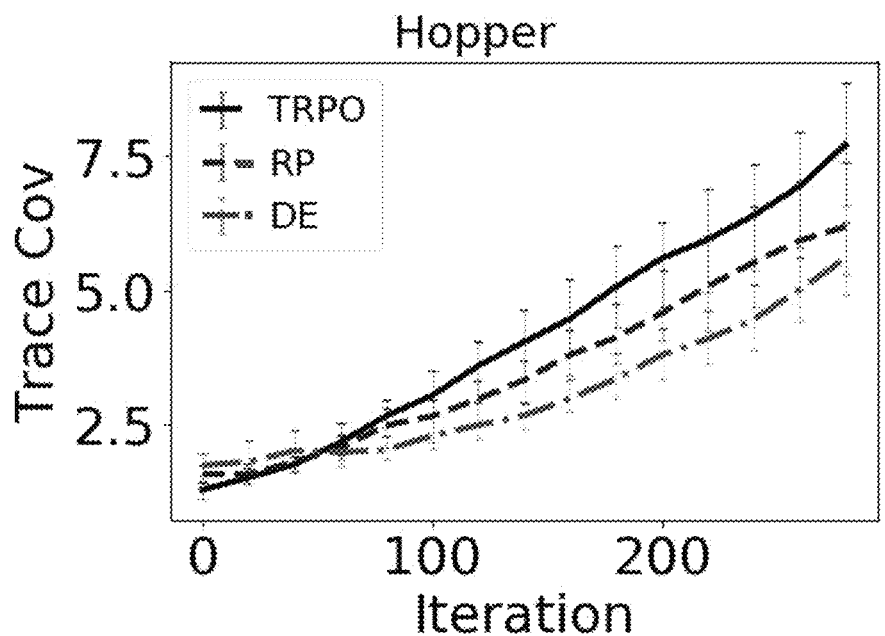

The trace of covariance of the perturbed gradient estimates are contained in FIG. 3D. Note, the covariance of TRPO gradient estimates can be computed by treating TRPO as RP but with policies perturbed by the zero vector. Interestingly, FIG. 3D shows an increasing trend for all approaches. Two possible explanations are posited for this; that policies tend to become more deterministic across learning iterations as they improve and, for DE and RP, the decreasing perturbation radius. Ultimately, both limit the variance of action selection and so yield more similar gradient estimates. Nevertheless, at any iteration, DE can significantly reduce the trace of covariance matrix due to its diversity.

Column 1 of Table 2 reports the average total pairwise KL divergence over all perturbed policies for the Hopper domain. DE's conjugate policies have significantly larger pairwise KL divergence than RP. This significant advantage in pairwise KL divergence yields lower variance gradient estimates which explain the observed superiority in performance, rate of improvement and lower IQR as discussed.

Figure 3E:
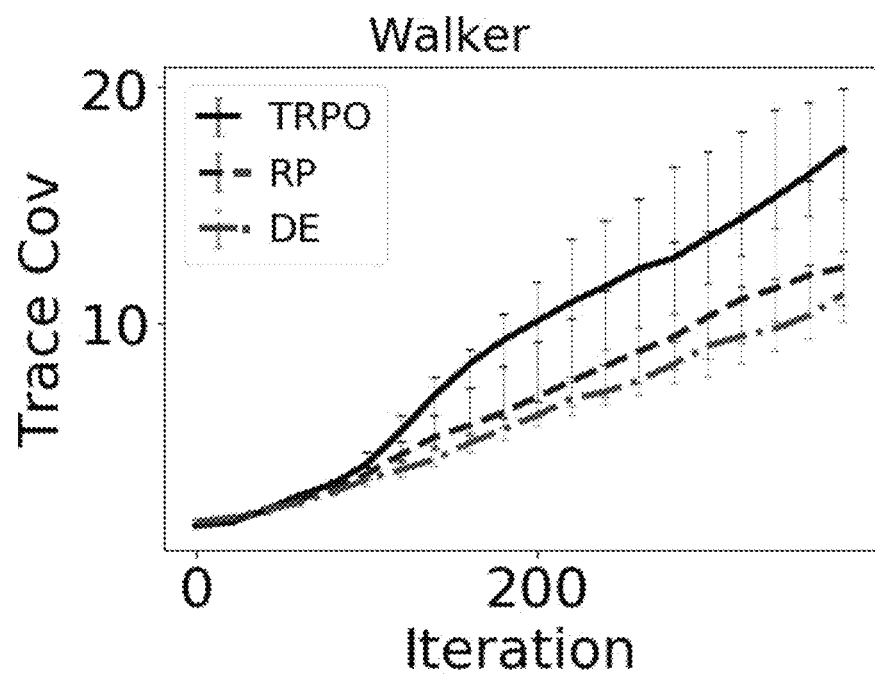
Figure 3F:
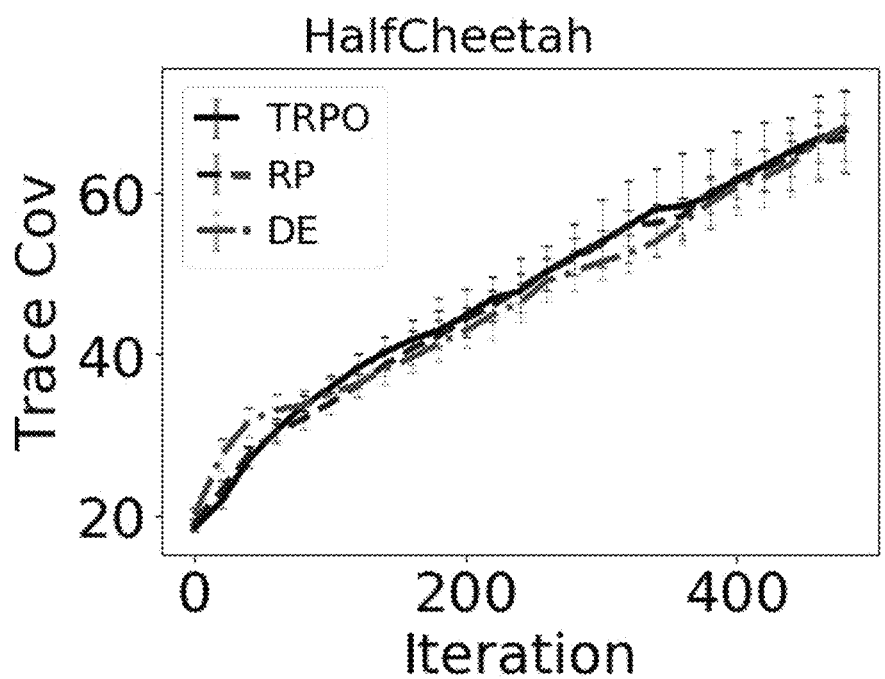

Similar trends are observed in FIGS. 3B and 3E and column 2 in Table 2 on the Walker domain. The performance of DE is clearly superior to both baselines but, due to the higher variance of the performance of the baselines, does not yield a statistically significant advantage. Despite this, DE maintains a significantly higher KL divergence between perturbed policies and significantly lower trace covariance estimates across iterations. Additionally, the same trends are observed in FIGS. 3C and 3F and column 3 in Table 2 in the HalfCheetah domain. DE shows a statistically significant advantage in terms of performance and pairwise KL divergence ($p<0.05$) over RP and TRPO despite their more similar covariance estimates.

Figure 4:
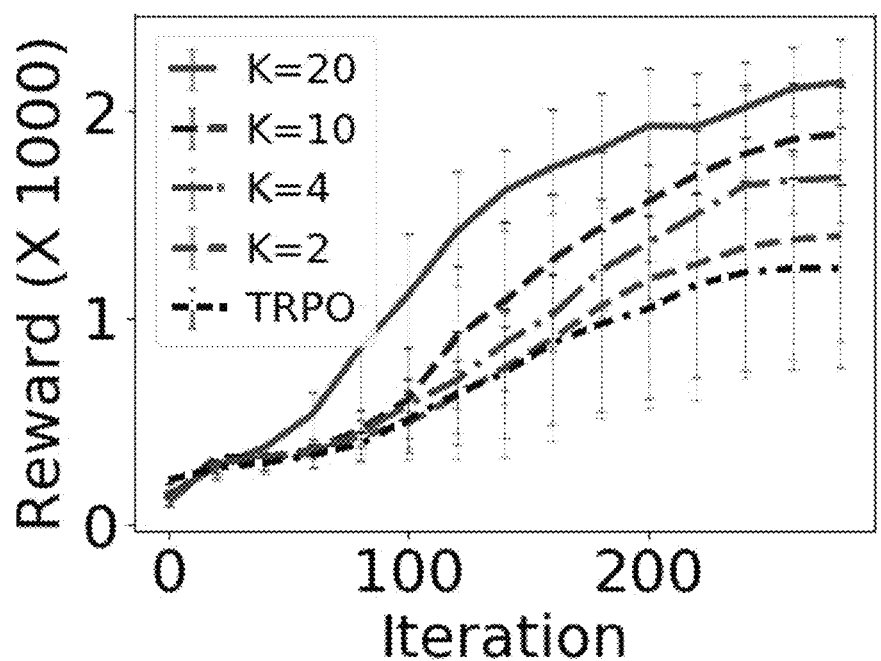
FIG. 4 shows a graph of average performance of all behavior policies for DE on Hopper with a decreasing number of perturbed policies and TRPO.
Figure 5:
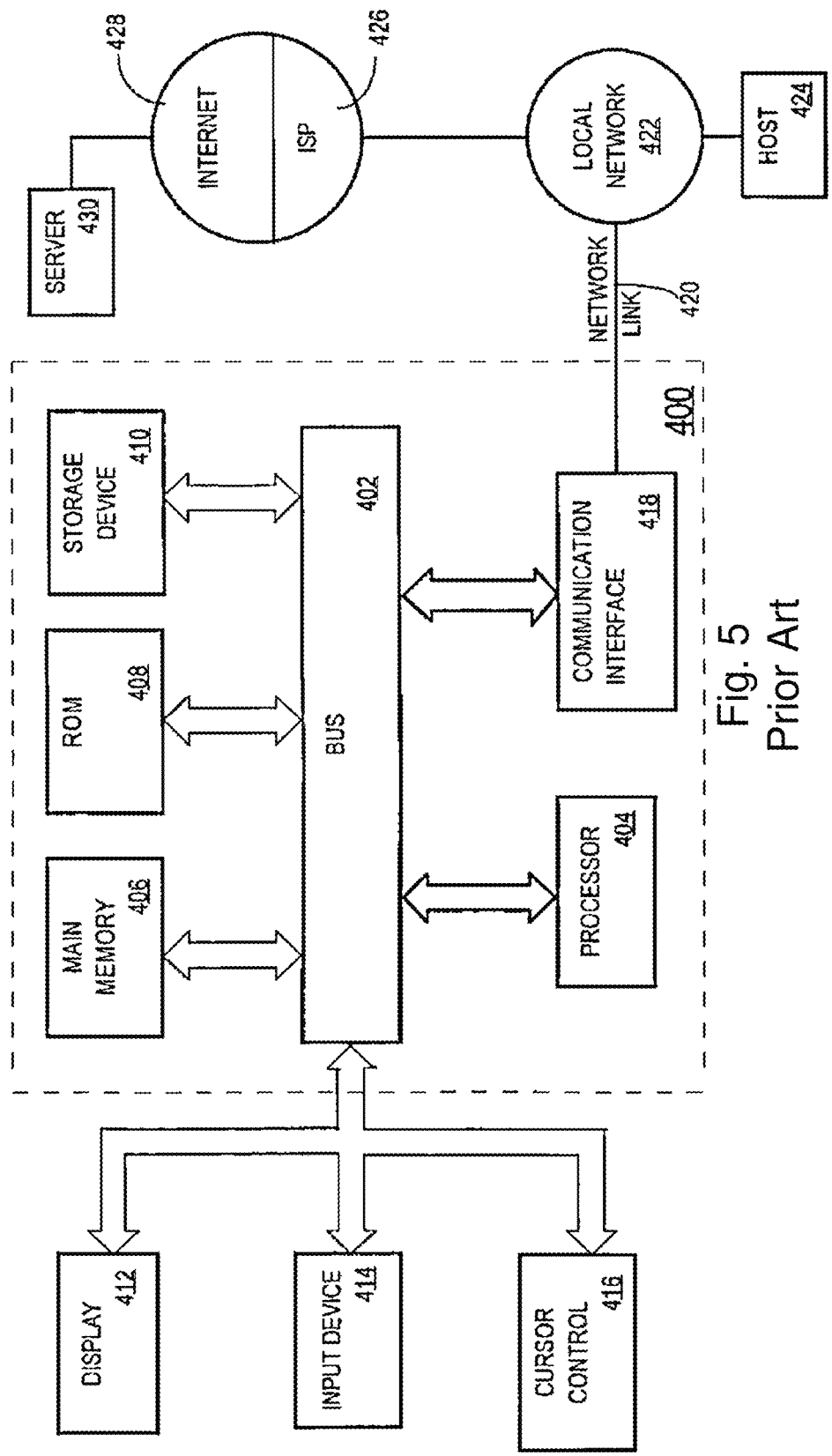
FIG. 5 shows an exemplary prior art computing platform.

Finally, the impact of decreasing the number of perturbed policies while keeping the samples collected constant on the Hopper domain is investigated. In FIG. 4, the average performance of DE for k=20, 10, 4, 2 as well as TRPO (k=0) is shown. Decreasing k leads to decreasing average performance and rate of improvement. Additionally, decreasing k leads to increasing performance variance. Both of these observations demonstrate that increasing diversity among behavior policies is key to strong online performance and exploration.

Computational Platform

The present invention may be implemented on various platforms, which may include cloud computers processing clusters, general purpose computers, general purpose graphics processing units (GPGPUs, typically SIMD parallel processors), embedded controllers, application specific integrated circuits (ASICs), programmable logic arrays (PGAs), and other type of platforms. For exemplary and non-limiting description, such a platform may be (see, U.S. Pat. No. 9,858,592, expressly incorporated herein by reference in its entirety):

FIG. 3 illustrates an example of exemplary hardware configuration, see U.S. Pat. No. 7,702,660, expressly incorporated herein by reference, which shows a block diagram of a computer system 400. Computer system 400 includes a bus 402 or other communication mechanism for communicating information, and a processor 404 coupled with bus 402 for processing information. Computer system 400 also includes a main memory 406, such as a random access memory (RAM, DDR, DDR2, DDR3, DDR4, DDR5) or other dynamic storage device, coupled to bus 402 for storing information and instructions to be executed by processor 404 (e.g., ARM, x86, i3, i5, i7, i9, Rizen, etc.). Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk or magneto-optical disk or solid state disk device, is provided and coupled to bus 402 for storing information and instructions. The computer system may also employ non-volatile memory, such as FRAM and/or MRAM.

The computer system may include a graphics processing unit (GPU), which, for example, provides a parallel processing system which is architected, for example, as a single instruction-multiple data (SIMD) processor. Such a GPU may be used to efficiently compute transforms and other readily parallelized and processed according to mainly consecutive unbranched instruction codes.

Computer system 400 may be coupled via bus 402 to a display 412, such as a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The computing architecture may also encompass so-called cloud computing, compute clusters, field programmable gate arrays, and other computational platforms.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media. Non-volatile media includes, for example, semiconductor devices, optical or magnetic disks, such as storage device 410. Volatile media includes dynamic memory, such as main memory 406. All such media are tangible to enable the instructions carried by the media to be detected by a physical mechanism that reads the instructions into a machine. Common forms of machine-readable media include, for example, hard disk (or other magnetic medium), CD-ROM, DVD-ROM (or other optical or magnetoptical medium), DVD-RW, Blueray, semiconductor memory such as RAM, PROM, EPROM, FLASH-EPROM, any other memory chip or cartridge, or any other medium from which a computer can read. Various forms of machine-readable media may be involved in carrying one or more sequences of one or more instructions to processor 404 for execution.

For example, the instructions may initially be carried on a magnetic disk of a remote computer. The remote computer can load the instructions into its dynamic memory and send the instructions over the Internet through an automated computer communication network. An interface local to computer system 400, such as an Internet router, can receive the data and communicate using an Ethernet protocol (e.g., IEEE-802.X) or wireless network interface (e.g., IEEE-802.11, or Bluetooth compatible, 3G cellular, 4G cellular, 5G cellular, WiMax, etc.) to a compatible receiver, and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be a local area network (LAN) interface to provide a data communication connection to a compatible LAN, such as 1 GBit Ethernet. In any such implementation, communication interface 418 sends and receives electrical, electromagnetic or optical signals that carry digital data streams representing various types of information. Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including memory pages, memory sub-pages, and program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution.

The CPU may be a multicore CISC processor, and may be lossely or tightly coupled with a parallel processing unit suitable for graphics processing, such as a GPU which employs SIMD technology. Advantageously, the graphics processing unit may be programmed to assist in handling parallel tasks, such as matrix transformation, linear algebra, and other tasks, especially if concurrent demand for graphics processing is low, or alternate facilities are available to produce an output display.

A GPU processor, e.g., a GPGPU such as within the nVidia CUDA architecture, may effectively be used for deep learning and generation of neural networks or deep neural networks, e.g., representing the respective policies or sets of policies, implement the diverse exploration, the safety confidence testing, and, in some cases, may themselves represent a target system for action by the policy. In other cases, a standard CISC architecture processor may be used, and/or other types of parallel processing or sequential processing. In some cases, the implementation of the algorithm for generating the diverse set of safe policies may be performed using cloud computing technology, such as using virtual machines in server racks of a data center.

The order in which operations, procedures, steps, stages, etc., are executed in processing in the apparatuses, the system, the programs and the methods described in the appended claims, the specification and the drawings is not indicated particularly explicitly by "before", "prior to" or the like. Also, it is to be noted that such process steps can be realized in a sequence freely selected except where an output from a preceding stage is used in a subsequent case. Even if descriptions are made by using "first", "next", etc., for convenience sake with respect to operation flows in the appended claims, the specification and the drawings, they are not intended to show the necessity to execute in the order specified thereby.

What has been described above includes examples of the disclosed and claimed subject matter. It is, of course, not possible to describe every conceivable combination of components and/or methodologies, but one of ordinary skill in the art may recognize that many further combinations, subcombinations, and permutations are possible, and are expressly contemplated of the various disclosures herein, including those incorporated by reference herein. Accordingly, the claimed subject matter is intended to embrace all such alterations, hybrids, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim. Unless inconsistent with the context, the word "or" shall be interpreted to include the both the conjunction and disjunction of the options.

What is claimed is:

1. A method of learning and deploying a set of behavior policies for an artificial agent selected from a a space of stochastic behavior policies,
the method comprising:
iteratively improving the set of behavior policies by:
selecting a diverse set comprising a plurality of behavior policies from the set of behavior policies for evaluation in each iteration, each respective behavior policy being ensured safe and having a statistically expected return no worse than a lower bound of policy performance, which excludes a portion of the set of behavior policies that is at least one of not ensured safe and not having an expected return no worse than a lower bound of policy performance, employing a diverse exploration strategy for the selecting which strives for behavior diversity, and
assessing policy performance of each behavior policy of the diverse set with respect to the artificial agent.

2. The method according to claim 1, wherein each behavior policy has a variance associated with the estimate of its policy performance by importance sampling, and each diverse set has a common average variance, in each of a plurality of policy improvement iterations.

3. The method according to claim 1, wherein each of the policy performance and policy behavior diversity is quantified according to a common objective function, and the common objective function is employed to assess the policy performance of the diverse set.

4. The method according to claim 1, wherein the diverse set comprises the plurality of behavior policies which are adaptively defined based on assessed policy performance within a respective single iteration.

5. The method according to claim 4, wherein the adaptation is based on a change in the lower bound of policy performance as a selection criterion for a subsequent diverse set within a respective single iteration.

6. The method according to claim 4, wherein the adaptation is based on feedback of a system state of the artificial agent received after deploying a prior behavior policy within a respective single iteration.

7. The method according to claim 1, wherein the diverse set within a respective single iteration is selected as the plurality of behavior policies generated based on prior feedback, having maximum differences from each other according to a Kullback-Leibler (KL) divergence measure.

8. The method according to claim 1, wherein the plurality of behavior policies of the diverse set within a respective iteration are selected according to an aggregate group statistic.

9. The method according to claim 1, each respective behavior policy represents a trained first artificial neural network, and each respective behavior policy controls an artificial agent comprising a second artificial neural network.

10. The method according to claim 1, wherein the plurality of behavior policies within the diverse set for each iteration is selected by importance sampling within a confidence interval.

11. The method according to claim 1, wherein in each iteration, a data set is collected representing an environment in a first number of dimensions, and the set of behavior policies have a second number of dimensions less than the first number of dimensions.

12. The method according to claim 1, wherein the statistically expected return no worse than a lower bound of policy performance is updated between iterations.

13. The method according to claim 1, wherein, in each iteration, feedback is obtained from a system controlled by the artificial agent in accordance with the respective behavior policy, and the feedback is used to improve a computational model of the system which is predictive of future behavior of the system over a range of environmental conditions.

14. The method according to claim 13, further comprising providing a computational model of the system which is predictive of future behavior of the system over a multidimensional range of environmental conditions, based on a plurality of observations under different environmental conditions having a distribution, and the diverse exploration strategy is biased to select respective behavior policies within the set of behavior policies which selectively explore portions of the multidimensional range of environmental conditions.

15. The method according to claim 1, wherein the diverse set is selected based on a predicted state of a system controlled by the artificial agent according to the respective behavior policy during deployment of the respective behavior policy.

16. The method according to claim 1, further comprising selecting the diverse set for assessment within each iteration to generate a maximum predicted statistical improvement in policy performance.

17. The method according to claim 1, wherein the diverse set in each policy improvement iteration i, is selected by deploying a most recently confirmed set of policies $\mathcal{P}$ to collect n trajectories uniformly distributed over the respective policies $\pi_i$ within the set of policies $\pi_i \in \mathcal{P}$;
further comprising for each set of trajectories $\mathcal{D}_i$ collected from a respective policy $\pi_i$, partition $\mathcal{D}_i$ and append to a training set of trajectories $\mathcal{D}_{train}$ and a testing set of trajectories $\mathcal{D}_{test}$;
said assessing policy performance comprises from $\mathcal{D}_{train}$, generating a set of candidate policies and evaluating the set of candidate policies using $\mathcal{D}_{test}$;
further comprising confirming a subset of policies as meeting predetermined criteria, and if no new policies $\pi_i$ are confirmed, redeploying the current set of policies $\mathcal{P}$.

18. The method according to claim 17, further comprising, for each iteration:
defining the lower policy performance bound $\rho_-$; and
performing a t-test on normalized returns of $\mathcal{D}_{test}$ without importance sampling, treating the set of deployed policies $\mathcal{P}$ as a mixture policy that generated $\mathcal{D}_{test}$.

19. The method according to claim 17, further comprising employing a set of conjugate policies $\mathcal{C}$ generated as a byproduct of conjugate gradient descent.

20. An apparatus for performing the method according to claim 1, comprising:
an input configured to receive data from operation of a system within an environment controlled by the artificial agent according to a respective behavior policy;
at least one automated processor configured to perform said iteratively improving; and
at least one output configured to control the system within the environment controlled by the artificial agent in accordance with a respective behavior policy of the set of behavior policies.

21. The method according to claim 1, further comprising adapting the diverse set for each iteration based on:
a change in the lower bound of policy performance as a selection criterion for a subsequent diverse set within a respective single iteration; and
feedback of a system state of a system controlled by the artificial agent received after deploying a prior behavior policy within a respective single iteration.

22. The apparatus according to claim 20, wherein each respective behavior policy represents a trained first artificial neural network and each respective behavior policy controls a second artificial neural network.

23. The method according to claim 1, further comprising controlling a physical dynamic system whose dynamics and operating statistics change over a period of policy improvement with the artificial agent.

24. A method for controlling a system within an environment, comprising:
providing an artificial agent configured to control the system, the artificial agent being controlled according to a behavioral policy;
iteratively improving a set of behavioral policies comprising the behavioral policy, by, for each iteration:
selecting a diverse set of behavior policies from a space of stochastic behavior policies for evaluation in each iteration, each respective behavior policy being ensured safe and having a statistically expected return no worse than a lower threshold of policy performance, the diverse set maximizing behavior diversity according to a diversity metric;

assessing policy performance a plurality of behavioral policies of the diverse set; and updating a selection criterion; and controlling the system within the environment with the artificial agent in accordance with a respective behavioral policy from the iteratively improved diverse set.

* * * * *